(12) United States Patent
Yamada et al.

(10) Patent No.: US 7,239,709 B1
(45) Date of Patent: Jul. 3, 2007

(54) DATA RECORDING/REPRODUCING METHOD, DATA RECORDING/REPRODUCING SYSTEM, RECORDING APPARATUS

(75) Inventors: Masazumi Yamada, Moriguchi (JP); Hiroyuki Iitsuka, Katano (JP); Shoichi Goto, Katano (JP); Hideaki Takechi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/381,996

(22) PCT Filed: Jan. 25, 1999

(86) PCT No.: PCT/JP99/00292

§ 371 (c)(1),
(2), (4) Date: Sep. 27, 1999

(87) PCT Pub. No.: WO99/38164

PCT Pub. Date: Jul. 29, 1999

(30) Foreign Application Priority Data

Jan. 26, 1998 (JP) ............................ H10-012474
Feb. 9, 1998 (JP) ............................ H10-027572

(51) Int. Cl.
*H04L 9/00* (2006.01)
*H04K 1/00* (2006.01)
*G06Q 99/00* (2006.01)
*H04L 9/38* (2006.01)

(52) U.S. Cl. .............................. 380/281; 380/4; 380/5; 380/46; 380/51; 380/10; 380/26; 380/27; 713/160; 705/54; 705/57

(58) Field of Classification Search .................... 380/4, 380/44, 5, 46, 203, 21, 48, 49, 10, 23, 25, 380/281; 713/160, 200, 201; 705/54, 57, 705/1; 235/380, 492
See application file for complete search history.

(56) References Cited

U.S. PATENT DOCUMENTS 4,928,001 A * 5/1990 Masada ....................... 235/380
4,945,563 A * 7/1990 Horton et al. ............... 380/203
5,218,638 A * 6/1993 Matsumoto et al. ........ 380/228

(Continued)

FOREIGN PATENT DOCUMENTS

CN       1159235 A       9/1997

(Continued)

OTHER PUBLICATIONS

Search Report corresponding to application No. PCT/JP99/00292 dated Apr. 27, 1999.

(Continued)

*Primary Examiner*—Ayaz Sheikh
*Assistant Examiner*—Shin-Hon Chen
(74) *Attorney, Agent, or Firm*—RatnerPrestia

(57) ABSTRACT

A data recording/reproducing method wherein encrypted digital data obtained by subjecting digital data to first encrypting by using a contents key and encrypted contents key obtained by subjecting the contents key to second encrypting are recorded on a recording medium, the encrypted digital data and the encrypted contents key, having been recorded, are reproduced, and the encrypted digital data is decrypted by using the contents key obtained by decrypting the encrypted contents key, thereby to obtain the digital data.

55 Claims, 31 Drawing Sheets

U.S. PATENT DOCUMENTS

| | | | | |
|---|---|---|---|---|
| 5,235,641 | A * | 8/1993 | Nozawa et al. | 713/193 |
| 5,640,453 | A * | 6/1997 | Schuchman et al. | 380/211 |
| 5,646,993 | A * | 7/1997 | Aizawa | 705/57 |
| 5,721,778 | A * | 2/1998 | Kubota et al. | 380/212 |
| 5,751,805 | A * | 5/1998 | Otsuki et al. | 705/54 |
| 5,790,677 | A * | 8/1998 | Fox et al. | 705/78 |
| 5,796,828 | A * | 8/1998 | Tsukamoto et al. | 380/203 |
| 5,825,879 | A * | 10/1998 | Davis | 380/216 |
| 5,857,024 | A * | 1/1999 | Nishino et al. | 713/172 |
| 5,917,910 | A * | 6/1999 | Ishiguro et al. | 705/57 |
| 5,917,915 | A * | 6/1999 | Hirose | 380/228 |
| 5,987,438 | A * | 11/1999 | Nakano et al. | 705/41 |
| 5,992,738 | A * | 11/1999 | Matsumoto et al. | 235/381 |
| 6,025,869 | A * | 2/2000 | Stas et al. | 725/28 |
| 6,097,814 | A * | 8/2000 | Mochizuki | 380/44 |
| 6,157,723 | A * | 12/2000 | Schultz | 380/273 |
| 6,223,285 | B1 * | 4/2001 | Komuro et al. | 713/160 |
| 6,345,263 | B1 * | 2/2002 | Matsumoto et al. | 705/41 |
| 6,393,128 | B1 * | 5/2002 | Rix et al. | 380/283 |
| 6,470,085 | B1 * | 10/2002 | Uranaka et al. | 380/231 |
| 2001/0053979 | A1 * | 12/2001 | Kori | 705/1 |

FOREIGN PATENT DOCUMENTS

| | | |
|---|---|---|
| EP | 0 794 496 A1 | 9/1997 |
| EP | 794496 A1 * | 9/1997 |
| JP | 7-272399 | 10/1995 |
| JP | 7-288798 | 10/1995 |
| JP | 08-016384 | 1/1996 |
| JP | 8-77706 | 3/1996 |
| JP | 9-214929 | 8/1997 |

OTHER PUBLICATIONS

English translation of Form PCT/ISA/210.

Japanese Office Action dated Jun. 18, 2002 for Japanese application No. 10-027572 (w/ partial English translation).

Chinese Office Action for Application No. 99800346.8 mailed Aug. 8, 2003 with English translation.

* cited by examiner

Fig. 6
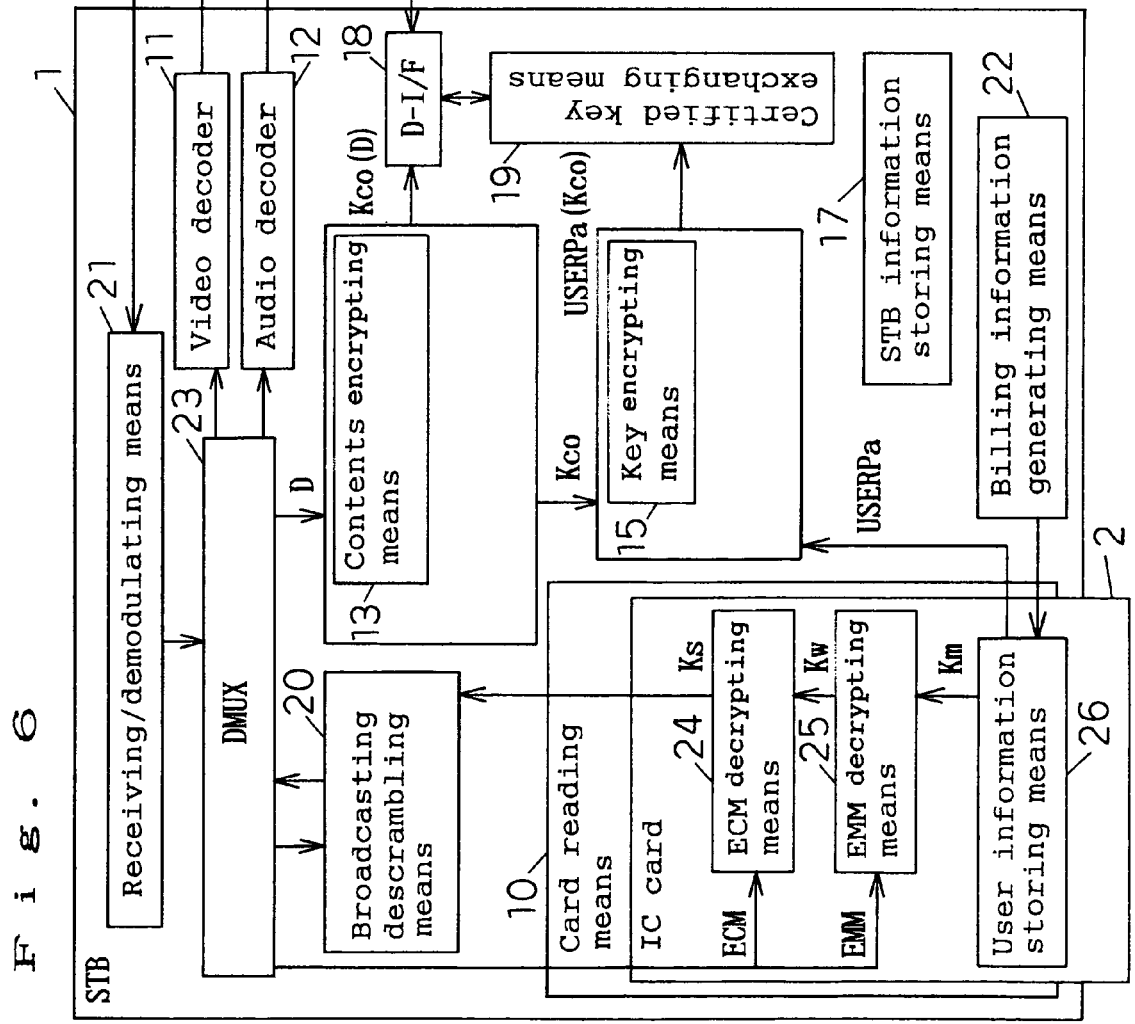
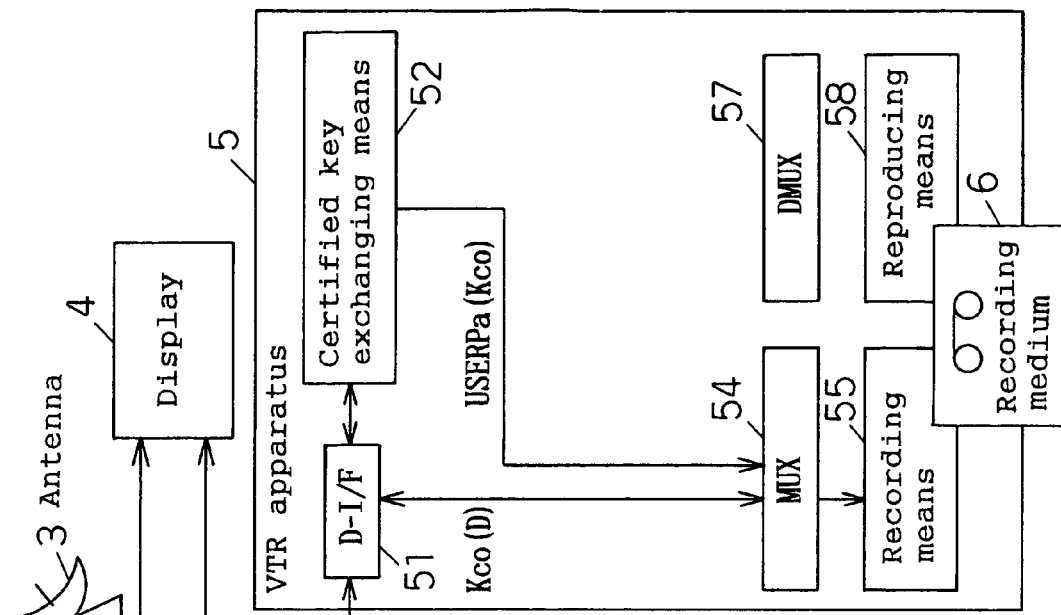

Fig. 27(a) Encrypting key Kx list   As of January 4

| No. | Encrypting key | Key generation date |
|---|---|---|
| 1 | Kx4 | January 4 |
| 2 | Kx3 | January 3 |
| 3 | Kx2 | January 2 |
| 4 | Kx1 | January 1 |
| 5 | | |
| 6 | | |
| 7 | | |

Fig. 27(b)

| No. | Encrypting key | Key generation date |
|---|---|---|
| 1 | Kx9 | January 9 |
| 2 | Kx8 | January 8 |
| 3 | Kx7 | January 7 |
| 4 | Kx6 | January 6 |
| 5 | Kx5 | January 5 |
| 6 | Kx4 | January 4 |
| 7 | Kx3 | January 3 |

DATA RECORDING/REPRODUCING METHOD, DATA RECORDING/REPRODUCING SYSTEM, RECORDING APPARATUS

This application is a U.S. national phase application of PCT international application PCT/JP99/00292.

TECHNICAL FIELD

The present invention relates to a data recording apparatus for recording digital data, a data reproducing apparatus for reproducing the digital data, a data recording/reproducing system and a data recording/reproducing method, wherein the period for reproduction or the number of reproductions of the digital data is limited on the basis of copyright and the like.

RELATED ART

At present, AV data, such as movies and music, to be protected by copyright is stored on video tapes and the like. A user can appreciate movies, music and the like by renting a video tape or the like only for a predetermined period, for example, one week, through a rental shop for renting such video tapes and the like at cost, and by reproducing it.

On the other hand, unlike the above-mentioned rental system for video tapes and the like, thanks to the progress and the like in the digital technology and the encrypting technology, it is possible to devise an apparatus capable of receiving programs for movies, music and the like from broadcasting stations via a communications satellite, contents-encrypting the programs, recording them on video tapes and the like, and reproducing them.

If it is possible for users to record and reproduce satellite broadcasting as desired, recorded programs could be supplied without limitation from a few users to an indefinite number of users; therefore, it is indispensable for providers to take measures against this. First, a procedure for receiving a desired program will be described below. When a user selects a desired program, billing information for reception regarding the charge for receiving the program is recorded on an IC card. The data of each program is scrambled as a rule; therefore, only when the billing information for receiving the program has been recorded on the IC card, STB descrambles the scrambled data, and images are output to a display in a descrambled condition. However, even if the STB descrambles the scrambled data, since a copy prevention signal (Macrovision) is included in the AV data, even if the data is recorded on a recording medium in this condition, reproduced images are disturbed at the time of reproduction.

Next, a procedure for recording/reproducing a desired program will be described below. When a user selects a desired program to be recorded, billing information for recording regarding the charge for recording the program is recorded on the IC card. Only when the billing information for recording of the program has been recorded on the IC card, the STB cancels the above-mentioned Macrovision, and undisturbed AV data is output to a VTR apparatus, and the VTR apparatus records the data on a recording medium. Since the recorded AV data does not include Macrovision, images can be output in accordance with the same reproduction method as that for ordinary AV data.

Amounts of the billing information for reception and the billing information for recording recorded on the IC card in accordance with the above-mentioned procedures, corresponding to a certain period, are transmitted to a provider via telephone lines or the like. The above-mentioned description is given with respect to a satellite broadcasting data recording/reproducing system wherein an STB apparatus and a VTR apparatus are independent from each other; however, it is possible to use a type wherein the functions of the apparatuses are integrated in a single apparatus.

However, in the case of the above-mentioned rental system for video tapes and the like, a user must visit a rental shop and rent video tapes and the like each time, even in the coming multi-channel digital broadcasting age, this being as troublesome and inconvenient for the user as ever.

The above-mentioned recording/reproducing method, however, has problems; the recording medium on which recording is carried out once can be reproduced any number of times, and the recording medium can be copied easily.

In conventional recording/reproducing apparatuses, the effective reproduction period and the effective number of reproductions for AV data to be protected by copyright, such as movies and music, become limitless. For example, if specially valuable AV data, such as a movie just released at theaters, is recorded on a recording medium by a recording/reproducing apparatus having no limitations with respect to the reproduction period and the number of reproductions as mentioned above, the value of the AV data would be lowered in half. In other words, a broadcasting station cannot broadcast such specially valuable AV data without worry.

As a measure to cope with the above-mentioned problems, a method has been proposed, wherein the IDs of the STB and/or VTR apparatuses used for recording the AV data are also recorded on a recording medium on which AV data has been recorded so that the data cannot be reproduced if an attempt is made to reproduce the data by using apparatuses having different IDs. However, if apparatuses having no ID recognition function are used, this causes a problem of making reproduction possible regardless of the coincidence of ID. Furthermore, on the assumption that all apparatuses have the ID recognition function, if such an apparatus cannot be used because of an unrepairable failure or breakdown, this causes a problem of making the reproduction of the AV data recorded on the recording medium impossible, since the ID inherent in the apparatus is used.

DISCLOSURE OF THE INVENTION

By considering the above-mentioned problems encountered in the conventional data recording/reproducing methods, as a first object, the present invention is intended to provide a data recording/reproducing method and a data recording/reproducing system, wherein, by encrypting data, only the specific object can be reproduced and the above-mentioned encrypting-related information is less likely to leak outside.

Furthermore, in addition to the above-mentioned first object, the present invention is intended to provide a data recording/reproducing method and a data recording/reproducing system capable of securely carrying out billing at the time of recording and/or reproduction.

Moreover, in addition to the above-mentioned first object, the present invention is intended to provide a data recording/reproducing system having less loss time at the time of reproduction.

Additionally, the present invention is intended to provide a recording apparatus and a reproducing apparatus, capable of recording data on a recording medium and observing limitations on an effective reproduction period and an effective number of reproductions for the data.

BRIEF DESCRIPTION OF THE DRAWINGS

FIG. 6 is a flow chart showing the flow of data at the time when the data recording/reproducing system in accordance with the third embodiment of the present invention records data;

FIG. 27 is a view showing an example of a key-encrypting key Kx list used for the recording apparatus and the reproducing apparatus in accordance with the ninth embodiment of the present invention;

BEST MODES FOR EMBODYING THE INVENTION

Figure 1:
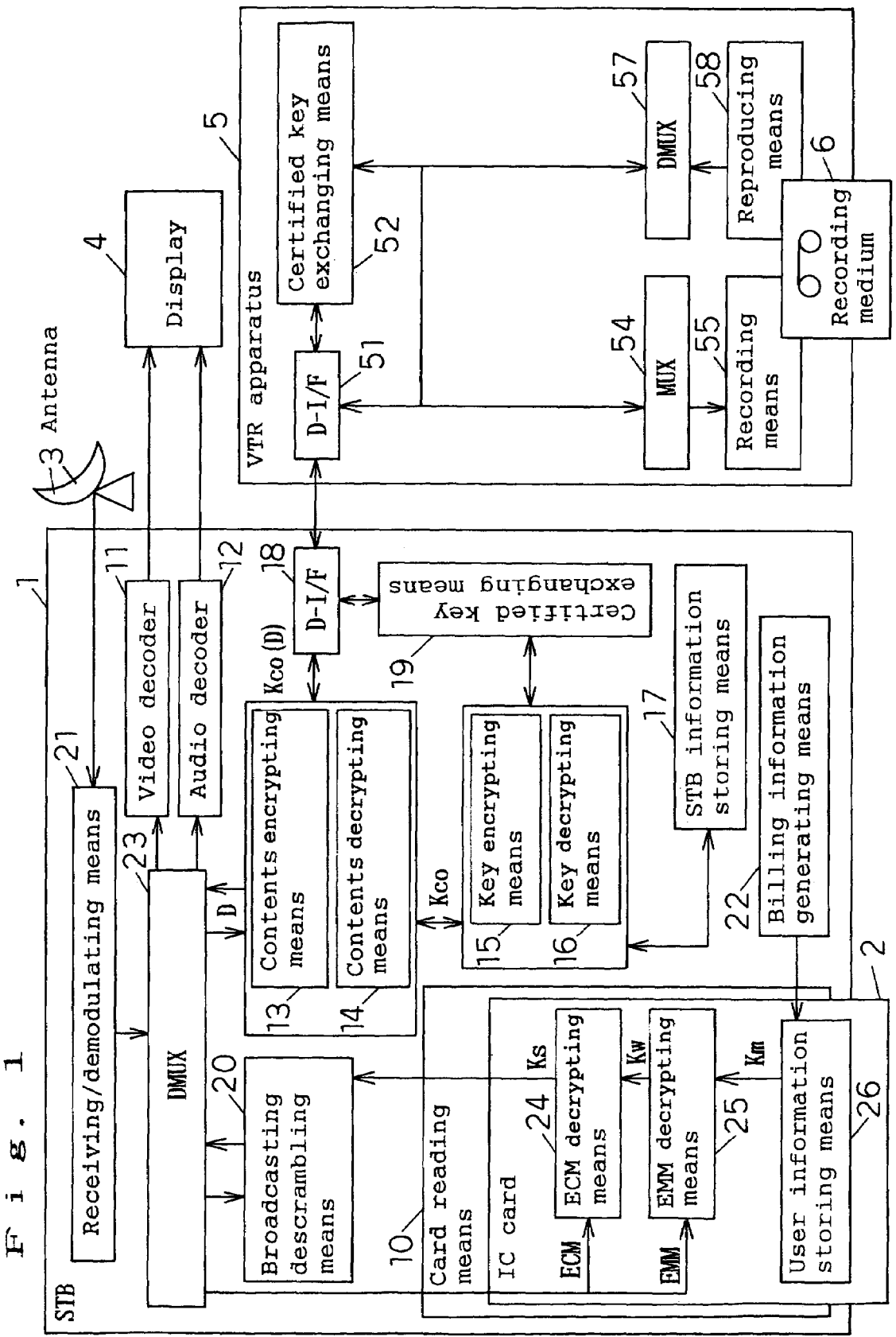
FIG. 1 is a configuration view showing the configuration of a data recording/reproducing system in accordance with a first embodiment of the present invention.

Embodiments of the present invention will be described below referring to the drawings.

First Embodiment

A first embodiment of the present invention will be described below referring to the drawings.

FIG. 1 is a configuration view showing the configuration of a data recording/reproducing system in accordance with the first embodiment of the present invention. The data recording/reproducing system in accordance with the present embodiment comprises an STB (Set Top Box: satellite broadcasting receiver) 1, an IC card 2 for providing information, such as a user ID, to the STB 1, an antenna 3 and a display 4, connected to the STB 1, and a VTR apparatus 5 corresponding to a VTR apparatus in accordance with the present invention, and a recording medium 6 on which data is recorded/reproduced by the VTR apparatus 5.

The STB 1 comprises a card reading means 10 for reading information recorded on the IC card 2 and for recording necessary information on the IC card 2, an STB information storing means 17 for storing information, such as the device ID of the STB 1, a video decoder 11 and an audio decoder 12 for outputting decrypted AV data to the display 4, a contents encrypting means 13 that generates a contents key and encrypts AV data by using the above-mentioned contents key to generate encrypted AV data, a key encrypting means 15 that carries out a second encrypting for the above-mentioned contents key to generate a encrypted contents key, a key decrypting means 16 that decrypts the above-mentioned encrypted contents key to restore the above-mentioned contents key, a contents decrypting means 14 that decrypts the above-mentioned encrypted AV data by using the above-mentioned restored contents key to obtain the above-mentioned AV data, a D-I/F (digital interface) 18 for direct data transmission to the VTR apparatus 5, a certified key exchanging means 19 that carries out certified key exchange with the VTR apparatus 5 to recognize the VTR apparatus 5, a receiving/demodulating means 21 that receives radio waves from an artificial satellite via the antenna 3 and demodulates received data to convert the data into signals for use in the STB 1, a broadcasting descrambling means 20 for decrypting broadcasting encrypts provided for the received data, and a DMUX (Demultiplexer) 23 for demultiplexing multiplexed received data. Furthermore, the STB 1 is provided with an STB control means (not shown) for controlling the whole of the STB 1, in addition to the above-mentioned means.

The VTR apparatus 5 comprises a D-I/F (digital interface) 51 for direct data transmission to the STB 1, a certified key exchanging means 52 that carries out certified key exchange with the STB 1 to recognize the STB 1, an MUX (Multiplexer) 54 for carrying out multiplexing in accordance with the format of the recording medium 6 for the above-mentioned encrypted AV data and the above-mentioned encrypted contents key, a recording means 55 for recording multiplexed data on the recording medium 6, a reproducing means 58 for reproducing the data recorded on the recording medium 6, and a DMUX (Demultiplexer) 57 for demultiplexing the multiplexed reproduced data. Furthermore, the VTR apparatus 5 is further provided with a VTR control means (not shown) for controlling the whole of the VTR apparatus 5, in addition to the above-mentioned means.

Next, the operations of the present embodiment will be described below.

Figure 2:
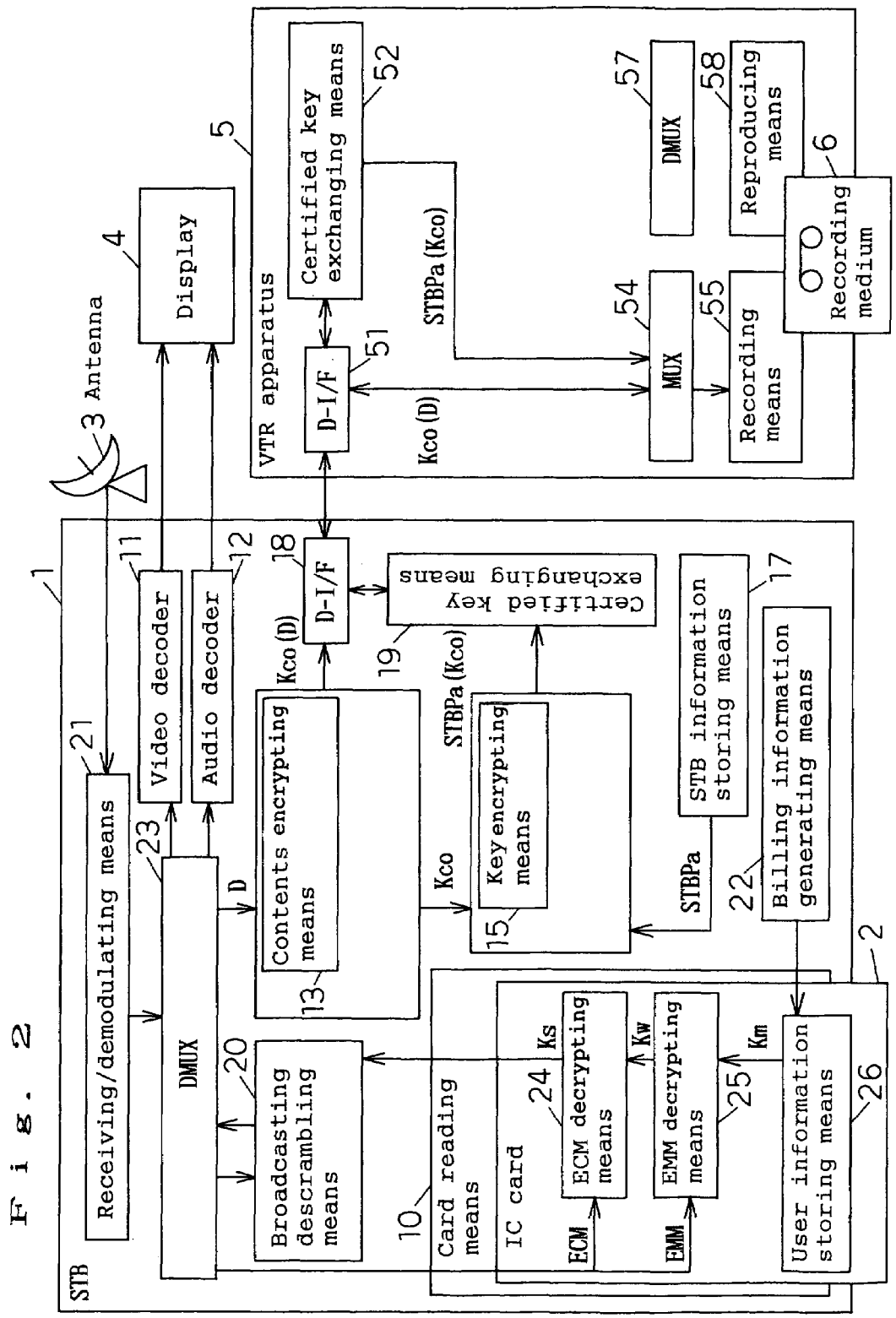
FIG. 2 is a flow chart showing the flow of data at the time when the data recording/reproducing system in accordance with the first embodiment of the present invention records data.

First, the flow of data at the time when AV data is recorded on the recording medium 6 will be described referring to FIG. 2. FIG. 2 is a flow chart showing the flow of data at the time when the data recording/reproducing system in accordance with the first embodiment of the present invention records data. Referring to FIG. 2, in the configuration shown in FIG. 1, means not required during recording are omitted as appropriate. In addition, D represents plain data of the AV data to be recorded, Kco represents a contents key used to encrypt AV data D, Kco (D) represents encrypted AV data obtained by encrypting the AV data D by using the contents key Kco, STB Pa represents a public key inherent in the STB 1 and used for encrypting the contents key Kco, and STB Pa (Kco) represents a encrypted contents key obtained by encrypting the contents key Kco by using the public key STB Pa, respectively. Furthermore, by switching the contents key Kco at regular or irregular intervals, the data recording/reproducing system in accordance with the present embodiment becomes a system wherein encrypting-related information is less likely to leak outside than in the case when the switching is not carried out.

First, the receiving/demodulating means 21 receives digital video data, audio data, EMM (individual information), ECM (program information) and encrypted broadcasting scrambling key Ks received from a broadcasting station via the antenna 3, shapes the disturbances in the signal waveforms of the video data and the audio data, and outputs the video data, audio data, EMM, ECM and encrypted broadcasting scrambling key Ks to the DMUX 23.

The EMM (individual information) is information required to generate a key referred to as a work key Kw described later.

Furthermore, the ECM (program information) is information required to restore the encrypted broadcasting scrambling key Ks.

Then, the DMUX 23 receives the video data, audio data, EMM, ECM and broadcasting scrambling key Ks from the receiving/demodulating means 21, demultiplexes them, and outputs the video data and audio data (AV data) to the broadcasting descrambling means 20. Furthermore, the means outputs the EMM to an EMM decrypting means 25, and also outputs the ECM and the encrypted broadcasting scrambling key Ks to an ECM decrypting means 24.

Next, the EMM decrypting means 25 receives a user ID key Km, also receives the EMM from the DMUX 23, decrypts the EMM by using the user ID key Km to generate the work key Kw, and outputs it to the ECM decrypting means 24.

Furthermore, the ECM decrypting means 24 receives the work key Kw from the EMM decrypting means 25, also receives the ECM and the encrypted broadcasting scrambling key Ks from the DMUX 23, decrypts the ECM by using the work key Kw to restore the encrypting of the encrypted broadcasting scrambling key Ks, and outputs it to the broadcasting descrambling means 20.

And the broadcasting descrambling means 20 receives the broadcasting scramble key Ks from the ECM decrypting means 24 and also receives scrambled AV data from the DMUX 23, and then descrambles the scrambled AV data by using the broadcasting scrambling key Ks.

The AV data D, having been scrambled for broadcasting, is descrambled by the broadcasting descrambling means 20 and demultiplexed by the DMUX 23 to become plain AV data D, and the plain AV data D is sent to the video decoder 11, the audio decoder 12 and the contents encrypting means 13. The video decoder 11 and the audio decoder 12 decode highly efficient coding and the like applied to the AV data D, and then output data to the display 4. The contents encrypting means 13 generates a contents key Kco, and encrypts the AV data D by using the generated contents key Kco to generate encrypted AV data Kco (D). The generated contents key Kco is sent to the key encrypting means 15, and the key encrypting means 15 encrypts the contents key Kco by using the public key STB Pa stored in the STB information storing means 17 and inherent in the STB 1 to generate the encrypted contents key STB Pa (Kco), The encrypted AV data Kco (D) and the encrypted contents key STB Pa (Kco) are transmitted to the VTR apparatus 5 via the D-I/F 18 and via the certified key exchanging means 19 and the D-I/F 18, respectively; however, before the transmission, the certified key exchanging means 19 and 52 corresponding to the STB 1 and the VTR apparatus 5, respectively, exchange their certified keys to each other via the D-I/Fs 18 and 51 to confirm that they are parties transmittable to each other, and the above-mentioned transmission is carried out.

The encrypted AV data Kco (D) and the encrypted contents key STB Pa (Kco), transmitted to the VTR apparatus 5, are sent to the MUX 54 via the D-I/F 51 and via the D-I/F 51 and the certified key exchanging means 52, respectively; and they are multiplexed in accordance with the format of the recording medium 6, and then recorded on the recording medium 6 by the recording means 55.

Figure 3:
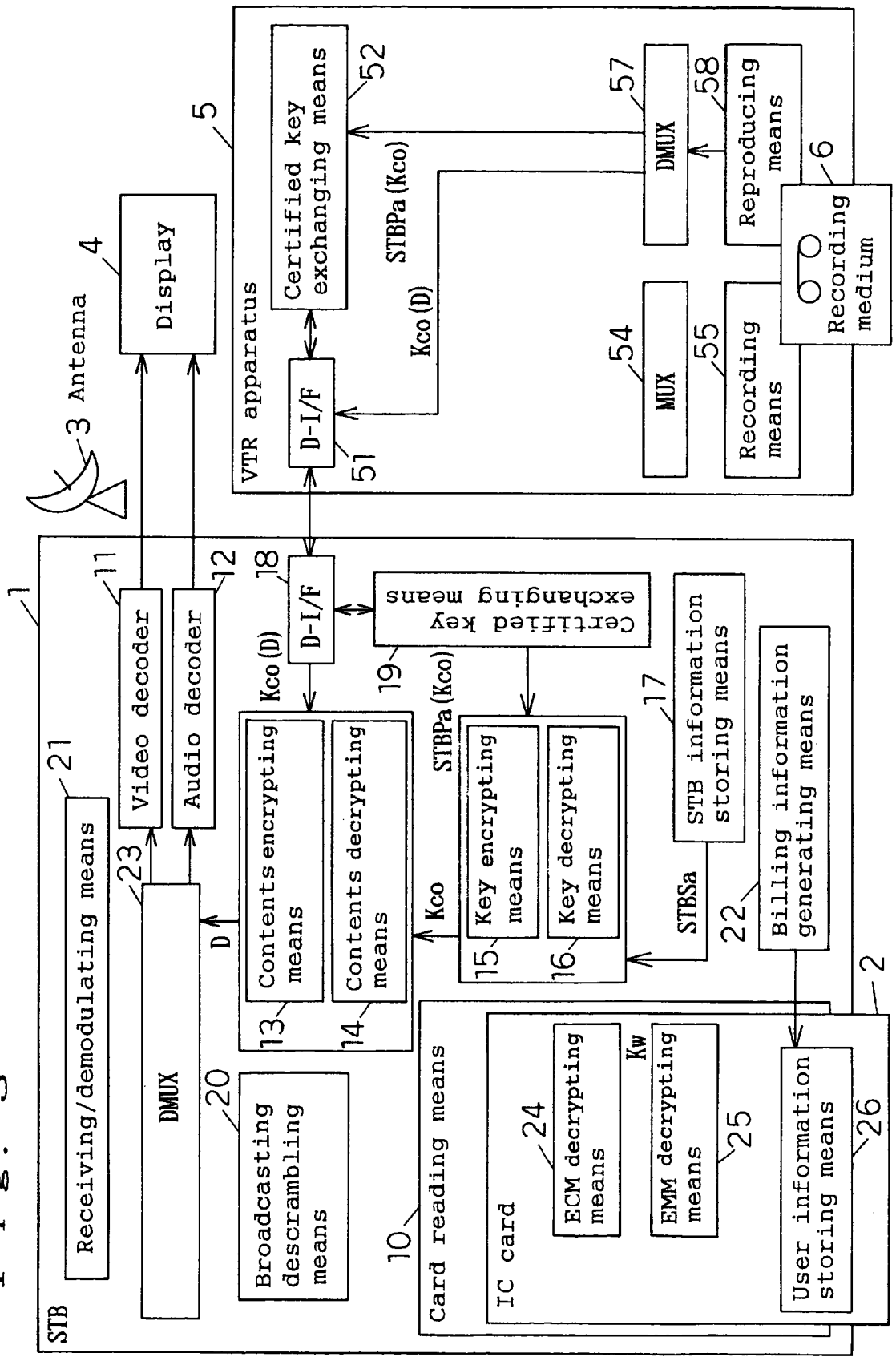
FIG. 3 is a flow chart showing the flow of data at the time when the data recording/reproducing system in accordance with the first embodiment of the present invention reproduces data.

Next, the flow of data at the time when the AV data recorded on the recording medium 6 is reproduced will be described below referring to FIG. 3. FIG. 3 is a flow chart showing the flow of data at the time when the data recording/reproducing system in accordance with the first embodiment of the present invention reproduces data. Referring to FIG. 3, in the configuration shown in FIG. 1, means not required during reproduction are omitted as appropriate. STB Sa corresponds to the public key STB Pa and represents a secret key inherent in the STB 1 and used to decrypt the encrypted contents key STB Pa (Kco) to restore the contents key Kco. The other reference encrypts in the figure are the same as those used in FIG. 2.

The encrypted AV data Kco (D) and the encrypted contents key STB Pa (Kco), multiplexed and recorded on the recording medium 6, are reproduced by the reproducing means 58 and demultiplexed by the DMUX 57.

The demultiplexed encrypted AV data Kco (D) and the demultiplexed encrypted contents key STB Pa (Kco) are transmitted to the STB 1 via the D-I/F 51 and via the certified key exchanging means 52 and the D-I/F 51, respectively; however, before the transmission, the certified key exchanging means 19 and 52 corresponding to the STB 1 and the VTR apparatus 5, respectively, exchange their certified keys to each other via the D-I/Fs 18 and 51 to confirm that they are parties transmittable to each other, and the above-mentioned transmission is carried out just as in the case of recording.

The encrypted AV data Kco (D), transmitted to the STB 1, is sent to the contents decrypting means 14 via the D-I/F 18; and the encrypted contents key STB Pa (Kco) is sent to the key decrypting means 16 via the D-I/F 18 and the certified key exchanging means 19. The key decrypting means 16 restores the encrypted contents key STB Pa (Kco) to the contents key Kco by using the secret key STB Sa stored in the STB information storing means 17 and inherent in the STB 1, and sends it to the contents decrypting means 14. The contents decrypting means 14 outputs the AV data obtained by decrypting the encrypted AV data Kco (D) by using the restored contents key Kco to the video decoder 11 and the audio decoder 12. The video decoder 11 and the audio decoder 12 decode highly efficient coding and the like applied to the AV data D and outputs data to the display 4.

By recording/reproducing AV data in accordance with the above-mentioned procedures, the contents key used to encrypt the AV data is encrypted by using the public key inherent in the STB 1, and recorded on the recording medium together with the encrypted AV data; at the time of reproduction, the encrypted contents key is restored by using the secret key inherent in the STB 1; therefore, reproduction is possible only by the system having the secret key inherent in the STB 1, in other words, by the system provided with the STB 1 itself; hence, it is understood that the data recording/reproducing system in accordance with the present embodiment can reproduce only the specific object and is a data recording/reproducing system wherein encrypting-related information is less likely to leak outside.

Next, a billing method for the data recording/reproducing system in accordance with the present embodiment will be described below. This billing method will be described referring to FIGS. 2 and 3, since billing is carried out during recording/reproduction of AV data.

First, a billing method during recording will be described. Referring to FIG. 2, the STB control means (not shown) of the STB 1 generates billing information by using a billing information generating means 22 during recording, and this is recorded on the IC card 2 via the card reading means 10. As the timing of recording, for example, the recording may be carried out in synchronization with a recording command from the user or in synchronization with a first output from the contents encrypting means 13 or the key encrypting means 15. The contents of the billing information to be recorded may be an amount of billing itself or an identifier or the like for specifying the contents of billing.

Next, a billing method during reproduction will be described below. Referring to FIG. 3, the STB control means (not shown) of the STB 1 generates billing information by using the billing information generating means 22 during reproduction, and this is recorded on the IC card 2 via the card reading means 10. As the timing of recording, for example, the recording may be carried out in synchronization with a reproduction command from the user or in synchronization with a first output from the contents decrypting means 14 or a key decrypting means 16. The contents of the billing information to be recorded are the same as those for recording.

The billing information recorded on the IC card 2 is output to a satellite broadcasting service provider at regular or irregular intervals through communications using telephone lines and the like, and the service provider collects the amount of billing from the user by a method of charging it to the user's bank account or other method on the basis of the billing information.

In the above-mentioned description, it is explained that the billing information is recorded during recording and reproduction, that is, the billing is carried out during both recording and reproduction; however, without being limited to this, the billing may be carried out during either one.

In addition, it is explained that the billing information is recorded on the IC card 2 via the card reading means 10; however, without being limited to this, the information may be recorded in the STB information storing means 17, for example. In the case when the information is recorded in the STB information storing means 17, the IC card 2 and the card reading means 10 may be omitted from the data recording/reproducing system in the configuration of the present embodiment.

Furthermore, the billing information during reproduction may be provided with a limitation on the period of reproduction and/or the number of reproductions. For example, the amount of billing may change when the period exceeds a certain period or when the number of reproductions exceeds a certain number. In the case of limiting the number of reproductions, however, information indicating the total number of reproductions is required to be written on the recording medium 6 or the like each time reproduction is carried out.

Moreover, information required for generating billing information during reproduction may be recorded during recording on the recording medium 6 so that the billing information can be generated by using the above-mentioned required information at the time when the recording medium 6 is reproduced. At this time, for example, the STB control means generates the above-mentioned required information during the recording, sends this to the recording means 55 via the D-I/Fs 18 and 51, and the recording means 55 records this in the first part of data to be recorded. During the reproduction, the above-mentioned required information is reproduced by the reproducing means 58 and sent to the STB control means via the D-I/Fs 18 and 51; and on the basis of this, the STB control means generates the billing information for reproduction by using the billing information generating means 22.

From the above-mentioned descriptions, it is understood that the data recording/reproducing system of the present embodiment is a data recording/reproducing system capable of securely carrying out billing during recording and/or reproduction.

Next, the recording area on the recording medium, for data recorded on the recording medium by the data recording/reproducing system of the present embodiment, will be described below referring to FIGS. 2 and 4.

Figure 4:
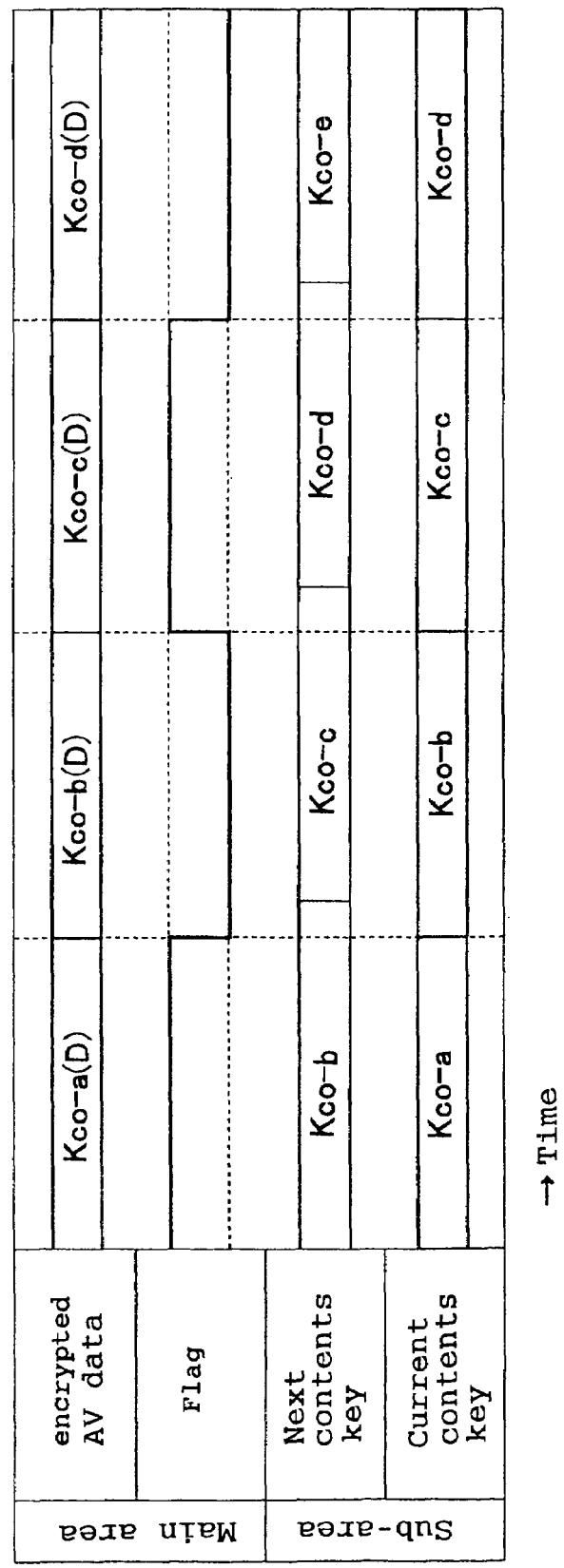
FIG. 4 is a schematic view showing the recording area on a recording medium, on which recording is carried out by using the data recording/reproducing system in accordance with the first embodiment of the present invention.

FIG. 4 is a schematic view showing the recording area on the recording medium, on which recording is carried out by using the data recording/reproducing system in accordance with the first embodiment of the present invention. The left-to-right direction of FIG. 4 indicates the recording position on the recording medium 6 with respect to time, and the up-to-down direction indicates the configuration of data recorded at the same time. Referring to FIG. 4, the recording area is divided into a main area and a sub-area. In the main area, encrypted AV data and a flag indicating the timing for changing contents key are written; and in the sub-area, at the contents keys (Kco-a, Kco-b, Kco-c, Kco-d, . . . ) used for encrypting the encrypted AV data (Kco-a (D), Kco-b (D), Kco-c (D), Kco-d (D), . . . ) recorded in the main area positions corresponding to the recording positions, encrypted contents keys (STB Pa (Kco-a), STB Pa (Kco-b), STB Pa (Kco-c), STB Pa (Kco-d), . . . ) obtained by encrypting by using the public key STB Pa are written; and at the contents keys (Kco-b, Kco-c, Kco-d, Kco-e, . . . ) for use after switching of the next contents key, encrypted contents keys (STB Pa (Kco-b), STB Pa (Kco-c), STB Pa (Kco-d), STB Pa (Kco-e), . . . ) obtained by encrypting by using the public key STB Pa are written. However, for purposes of convenience, in FIG. 4, the encrypted contents keys STB Pa (Kco-a), STB Pa (Kco-b), STB Pa (Kco-c), STB Pa (Kco-d), . . . are represented by the contents keys Kco-a, Kco-b, Kco-c, Kco-d, . . . , which are contents keys for use before encrypting.

As described above, the contents encrypting means 13 generates the contents key Kco by switching at regular or irregular intervals, and encrypts the AV data D by using the generated contents key Kco to generate the encrypted AV data Kco (D); however, the contents encrypting mean previously generates a contents key (for example, Kco-b) to be obtained by switching next to the current contents key (for example, Kco-a), and before using it, converts it into the encrypted contents key STB Pa (Kco-a) by the key encrypting means 15, and sends it to the MUX54 via the certified key exchanging means 19 and the D-I/Fs 18 and 51; and then the recording means 55 records it together with the current contents key Kco-a, the encrypted AV data Kco-a (D) encrypted thereby and the like in the recording area shown in FIG. 4. The flag indicating the timing for changing contents key is added to, for example, a packet header for transmitting AV data and then transmitted; on the basis of this, the recording means 55 determines the recording position of each piece of recording data.

As shown in FIG. 4, the encrypted contents key STB Pa (Kco-b) corresponding to a contents key for use after switching, for example, Kco-b, is recorded on the recording medium 6 so as to overlap at least a part of the encrypted AV data Kco-a (D) corresponding to the contents key Kco-a for use before switching, and the contents key Kco-a for use before switching is recorded on the recording medium 6 so as to overlap the position wherein the encrypted AV data Kco-a (D) corresponding thereto is recorded. Referring to FIG. 4, in the recording area for the encrypted contents key STB Pa (Kco-b), writing has been completed immediately before the encrypted contents key STB Pa (Kco-c) corresponding to the next contents key Kco-c is written; however, the writing should only be completed at least before the encrypted contents key STB Pa (Kco-c) is written; in other words, if recording is completed so that the recording area for the encrypted contents key STB Pa (Kco-b) in FIG. 4 overlaps at least a part of the encrypted AV data Kco-a (D), a data blank area may be present between the recording area and the starting end of the recording area for the encrypted contents key STB Pa (Kco-c).

By carrying out recording on the recording medium in accordance with the above-mentioned procedure, the next contents key can be decrypted beforehand during reproduction; therefore, it is understood that the data recording/reproducing system of the present embodiment is a data recording/reproducing system causing less loss time during reproduction.

The recording procedure for recording in the recording area on the recording medium of the present invention is not limited to the above-mentioned recording procedure of the present embodiment; for example, it may be possible to use a procedure wherein the contents encrypting means 13 does not previously generate the contents key for use after the next switching, but the VTR apparatus 5 has a means for temporarily storing data sent from the STB 1 and allows the above-mentioned temporary storing means to temporarily store the current data, and the recording area on the recording medium 6 is determined after receiving the data for use after the switching of the contents key, and then recording is carried out.

Furthermore, in addition to the above-mentioned recording procedure, information capable of specifying the key used for encrypting the contents key Kco may be recorded on the recording medium 6. More specifically, the information is the ID information of the STB 1 in the case of the present embodiment. For example, if an attempt is made to carry out reproduction by using an STB other than the STB 1, it is possible, by using this information, to deliver a warning for indicating that reproduction is impossible with the STB and to indicate the ID information of an STB (the STB 1 in this case) capable of reproduction.

Moreover, the encrypted contents key may be recorded in a data area on the recording medium 6, from which nothing is output outside. For example, in the case of a D-VHS system, it is recorded in the sub-code area. With this, the data recording/reproducing system becomes a system wherein encrypting-related information is less likely to leak outside.

In addition, in the present embodiment, it is explained that the encrypted digital data and the encrypted contents key are recorded at the recording positions corresponding to the timing of reproduction on the recording medium; however, without being limited to this, regardless of recording positions, reproduction should only be carried out so that the encrypted contents key corresponding to the contents key for use after switching overlaps at least a part of the encrypted digital data corresponding to the contents key for use before switching with respect to timing, or so that the encrypted contents key corresponding to one contents key overlaps the encrypted digital data corresponding thereto with respect to timing.

In the case of using a conventional procedure instead of the billing method and/or the recording procedure for recording in the recording area on the recording medium of the above-mentioned present embodiment, the above-mentioned respective effects are not obtained; however, it is possible to satisfy the first object of the present invention, that is, to provide a data recording/reproducing method and a data recording/reproducing system, wherein reproduction is possible for only the specific object, and encrypting-related information is less likely to leak outside.

Second Embodiment

A second embodiment in accordance with the present invention will be described below referring to the drawings. The present embodiment differs from the above-mentioned first embodiment in that the public key/secret key for encrypting/decrypting the contents key are keys inherent in the device model of the tuner apparatus of the present invention. For this reason, the same components as those used for the first embodiment are represented by the same reference codes, and the explanations of these components are omitted. Furthermore, components not described specifically are the same as those of the first embodiment.

The configuration of the data recording/reproducing system in accordance with the present embodiment is the same as that of the data recording/reproducing system in accordance with the first embodiment.

The operations of the present embodiment will be described below.

The configuration in accordance with the present embodiment is the same as that of the data recording/reproducing system in accordance with the first embodiment, except that a public key STBU Pa inherent in the device model of the STB 1 is used to encrypt the contents key Kco, and that a secret key STBU Sa inherent in the device model of the STB 1 is used to decrypt the contents key Kco. Therefore, the operations of the present embodiment are indicated by using a configuration wherein the public key STB Pa, the secret key STB Sa and the encrypted contents key STB Pa (Kco) shown in FIGS. 2 and 3 are replaced with the public key STBU Pa, the secret key STBU Sa and the encrypted contents key STBU Pa (Kco), respectively; therefore, detailed explanation is omitted since the explanation is similar to that given referring to in FIGS. 2 and 3.

Figure 5:
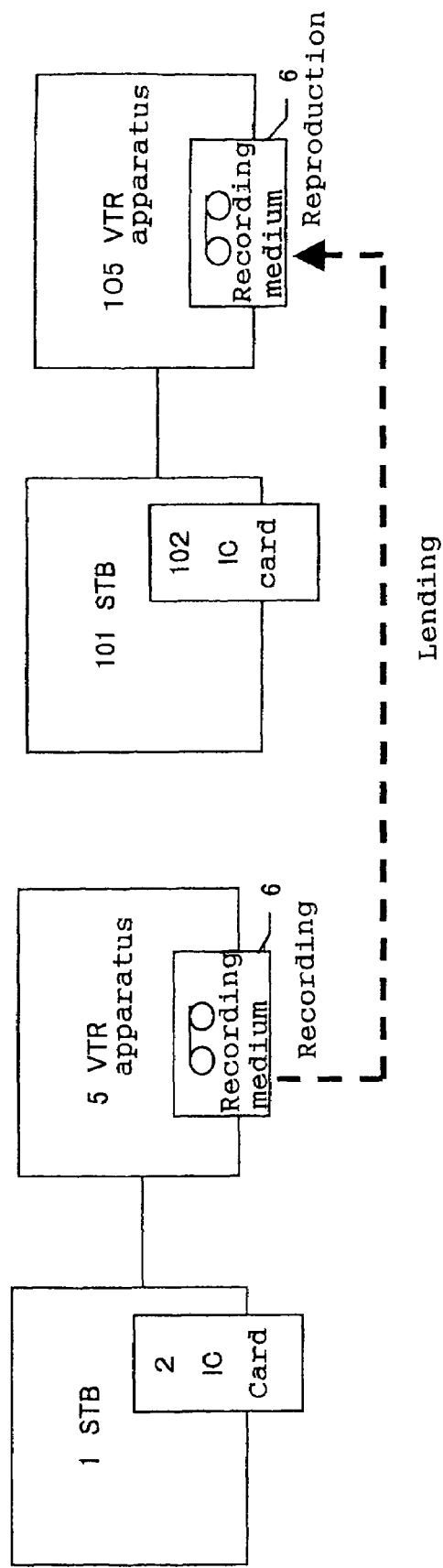
FIG. 5 is a flow chart showing the flow of a recording medium on which recording is carried out by using the data recording/reproducing system in accordance with the second embodiment of the present invention at the time of lending/borrowing.

By recording/reproducing AV data in accordance with the above-mentioned procedure, in the present embodiment, in addition to the effects obtained in accordance with the first embodiment, it is understood that the recording medium 6 can be lent to or borrowed from the user having an STB 101 being the same model as the STB 1 as shown in FIG. 5, and furthermore that even if the STB 1 cannot be used because of an unrepairable failure or breakdown, continuous use is possible by replacing it with the STB of the same device model.

Third Embodiment

A third embodiment in accordance with the present invention will be described below referring to the drawings. The present embodiment differs from the above-mentioned first embodiment in that the public key/secret key for encrypting/decrypting the contents key are keys inherent in the user ID recorded on the IC card of the present invention. For this reason, the same components as those used for the first embodiment are represented by the same reference codes, and the explanations of these components are omitted. Furthermore, components not described specifically are the same as those of the first embodiment.

The configuration of the data recording/reproducing system in accordance with the present embodiment is the same as that of the data recording/reproducing system in accordance with the first embodiment.

The operations of the present embodiment will be described below.

Figure 7:
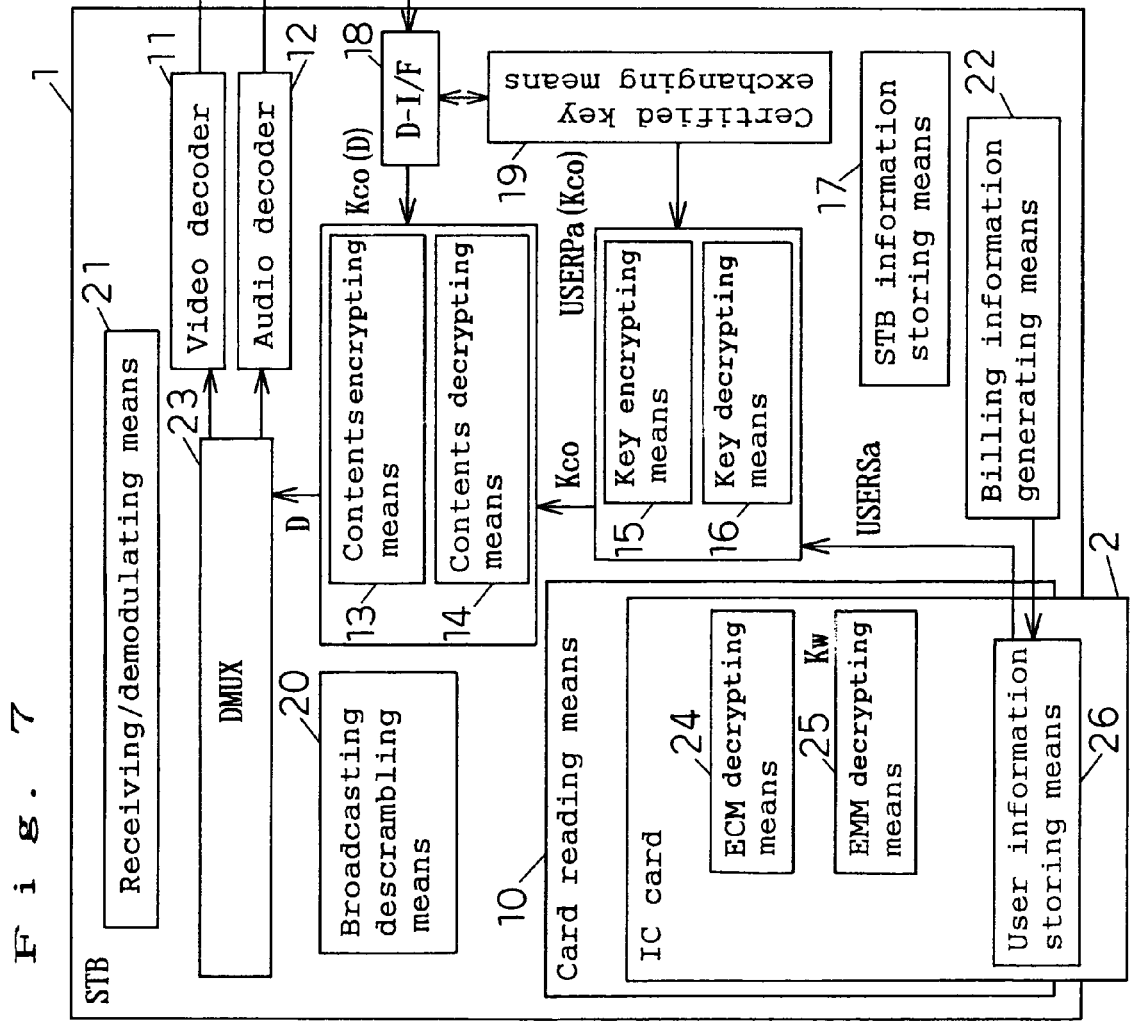
FIG. 7 is a flow chart showing the flow of data at the time when the data recording/reproducing system in accordance with the third embodiment of the present invention reproduces data.

FIG. 6 is a flow chart showing the flow of data at the time when the data recording/reproducing system in accordance with the second embodiment of the present invention records data; and FIG. 7 is a flow chart showing the flow of data at the time when the data recording/reproducing system in accordance with the second embodiment of the present invention reproduces data. As shown in FIGS. 6 and 7, the configuration in accordance with the present embodiment is the same as that of the data recording/reproducing system in accordance with the first embodiment, except that a public key USER Pa inherent in the user ID recorded on the IC card 2 is used to encrypt the contents key Kco, and that a secret key USER Sa inherent in the user ID is used to decrypt the contents key Kco.

By recording/reproducing AV data in accordance with the above-mentioned procedure, in the configuration of the present embodiment, in addition to the effects obtained in accordance with the first embodiment, it is understood that even if the STB 1 cannot be used because of an unrepairable failure or breakdown, continuous use is possible by replacing it with another STB (a device model other than the same device model can be used), and furthermore that another user can use the system through lending or borrowing of the recording medium 6 together with the IC card 2.

Furthermore, in the present embodiment, provided that, in order to encrypt the contents key Kco as described above, the encrypted contents key USER Pa (Kco) is generated by using the public key USER Pa inherent in the user ID recorded on the IC card 2, and the encrypted contents key USER1 Pa (Kco) is also generated by using the public key USER1 Pa inherent in another user ID recorded on the IC card 2, and that these are recorded on the recording medium 6 together with the encrypted contents key USER Pa (Kco), a specific user having the secret key USER1 Sa corresponding to the public key USER1 Pa can restore the encrypted contents key USER1 Pa (Kco) by using the USER1 Sa; therefore, the recording medium 6 can be lent only to the specific user. The number of the public key USER1 Pa is not limited to one, but plural public keys, such as USER1 Pa to USERn Pa, may be available. In other words, the user can simply lend the medium to another user, in the case when he wishes to borrow and use it, by having the other user record the public key USERn Pa corresponding thereto on the IC card 2 in accordance with a predetermined procedure.

As understood from the above-mentioned operations, in the present embodiment, the STB storing means 11 may be omitted from the configuration of the data recording/reproducing system in accordance with the first embodiment shown in FIG. 1.

Fourth Embodiment

A fourth embodiment in accordance with the present invention will be described below referring to the drawings. The present embodiment differs from the above-mentioned first embodiment in that the public key/secret key for encrypting/decrypting the contents key are keys inherent in the service recorded on the IC card of the present invention. For this reason, the same components as those used for the first embodiment are represented by the same reference codes, and the explanations of these components are omitted. Furthermore, components not described specifically are the same as those of the first embodiment.

The configuration of the data recording/reproducing system in accordance with the present embodiment is the same as that of the data recording/reproducing system in accordance with the first embodiment.

The operations of the present embodiment will be described below.

Figure 8:
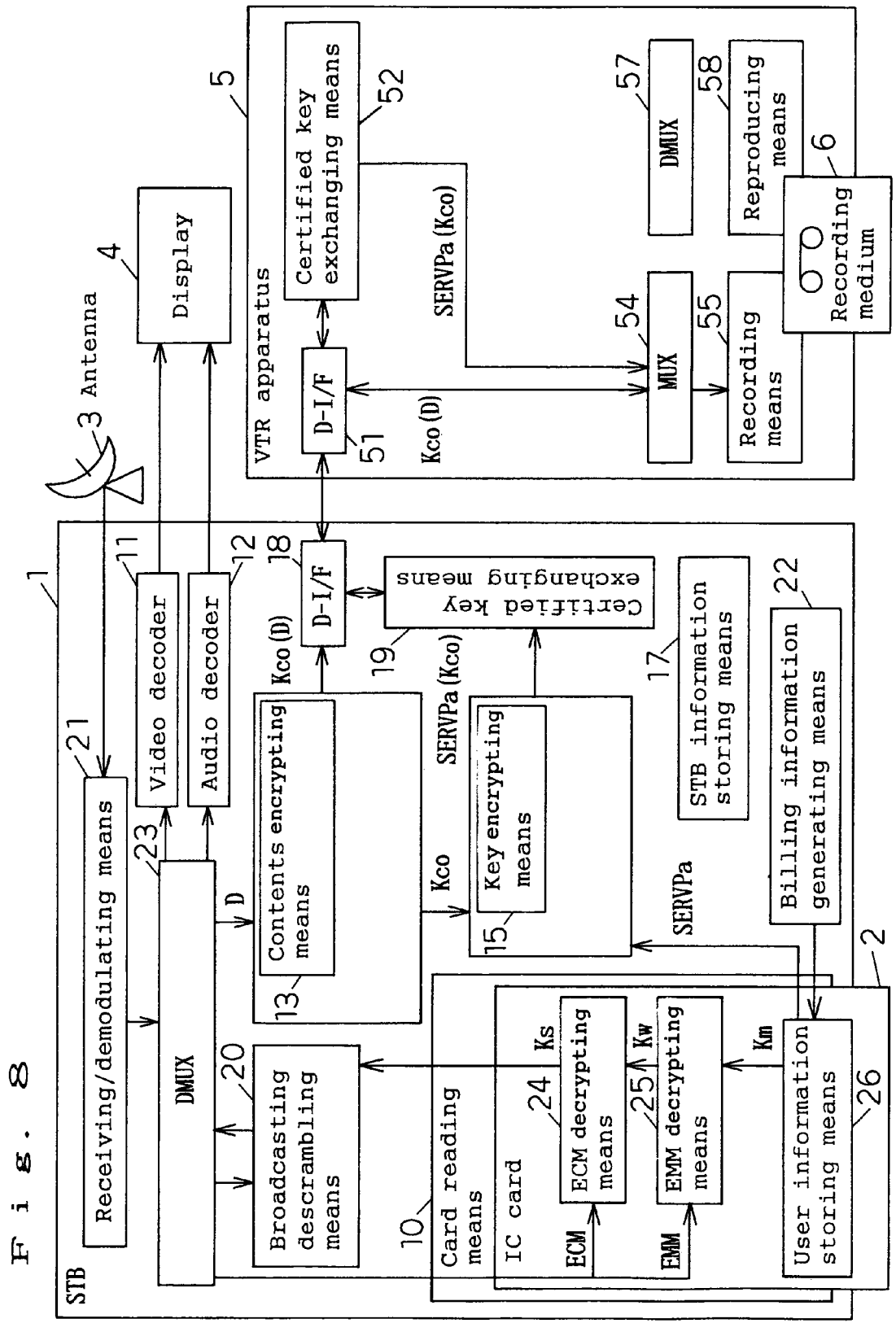
FIG. 8 is a flow chart showing the flow of data at the time when the data recording/reproducing system in accordance with the fourth embodiment of the present invention records data.
Figure 9:
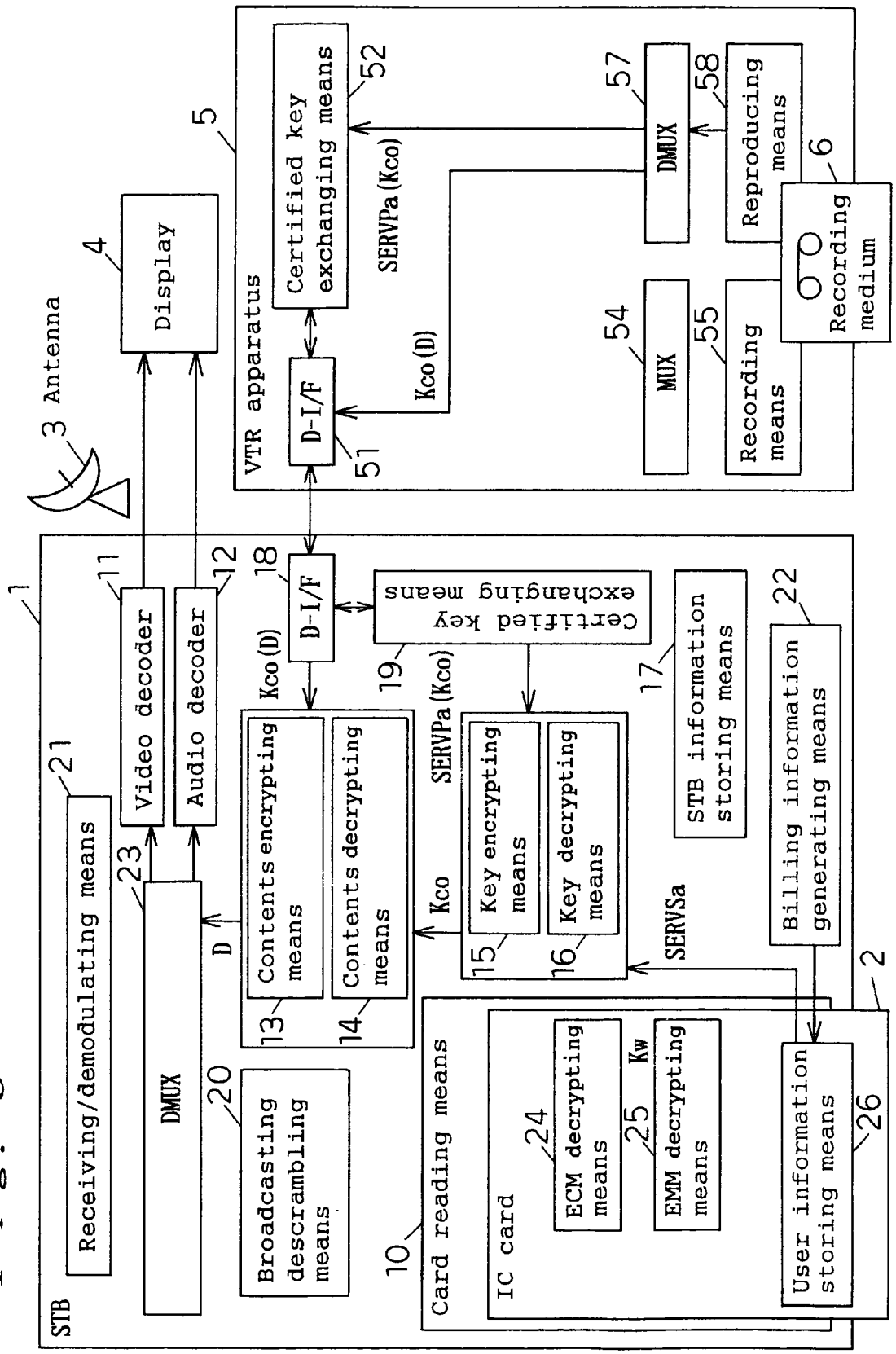
FIG. 9 is a flow chart showing the flow of data at the time when the data recording/reproducing system in accordance with the fourth embodiment of the present invention reproduces data.

FIG. 8 is a flow chart showing the flow of data at the time when the data recording/reproducing system in accordance with the fourth embodiment of the present invention records data; and FIG. 9 is a flow chart showing the flow of data at the time when the data recording/reproducing system in accordance with the fourth embodiment of the present invention reproduces data. As shown in FIGS. 8 and 9, the configuration in accordance with the present embodiment is the same as that of the data recording/reproducing system in accordance with the first embodiment, except that a public key SERV Pa inherent in the service recorded on the IC card 2 is used to encrypt the contents key Kco, and that a secret key SERV Sa inherent in the device model of the STB 1 is used to restore the contents key Kco. More specifically, the key inherent in the service includes keys inherent in a specific program only, inherent in programs of a specific genre only, inherent in programs in a specific channel only, inherent in a specific satellite broadcasting provider only, and the like.

For example, by previously paying the charge for the recording/reproduction of a specific program, the public key SERV Pa and the secret key SERV Sa inherent in the program are allowed to be stored in the IC card 2, whereby the above-mentioned specific program can be recorded/reproduced. In this case, if the public key SERV Pa and the secret key SERV Sa are not stored on the IC card 2, the STB 1 is required to take a measure to prevent recording. In the case of a program other than the specific program requiring the public key SERV Pa and the secret key SERV Sa, the public key and the secret key used for one of the first to third embodiments are selected and used; these methods can be used in combination.

By recording/reproducing AV data in accordance with the above-mentioned procedure, in the configuration of the present embodiment, in addition to the effects obtained in accordance with the first embodiment, it is understood that, even if the STB 1 cannot be used because of an unrepairable failure or breakdown, continuous use is possible by replacing it with another STB (a device model other than the same device model can be used), and furthermore that only the specific user permitted to receive specific service corresponding to recorded AV data can lend/borrow the recording medium 6.

As understood from the above-mentioned operations, in the present embodiment, the STB storing means 11 may be omitted from the configuration of the data recording/reproducing system in accordance with the first embodiment shown in FIG. 1.

Fifth Embodiment

A fifth embodiment in accordance with the present invention will be described below referring to the drawings. The present embodiment differs from the above-mentioned first embodiment in that the key encrypting means of the present invention is provided for the VTR apparatus, and accordingly that the tuner apparatus of the present invention has a second key encrypting means for encrypting the contents key by using a common key, and that the VTR apparatus of the present invention has a second key decrypting means for decrypting the above-mentioned contents key encrypted by using the above-mentioned common key. For this reason, the same components as those used for the first embodiment are represented by the same reference codes, and the explanations of these components are omitted. Furthermore, components not described specifically are the same as those of the first embodiment.

Figure 10:
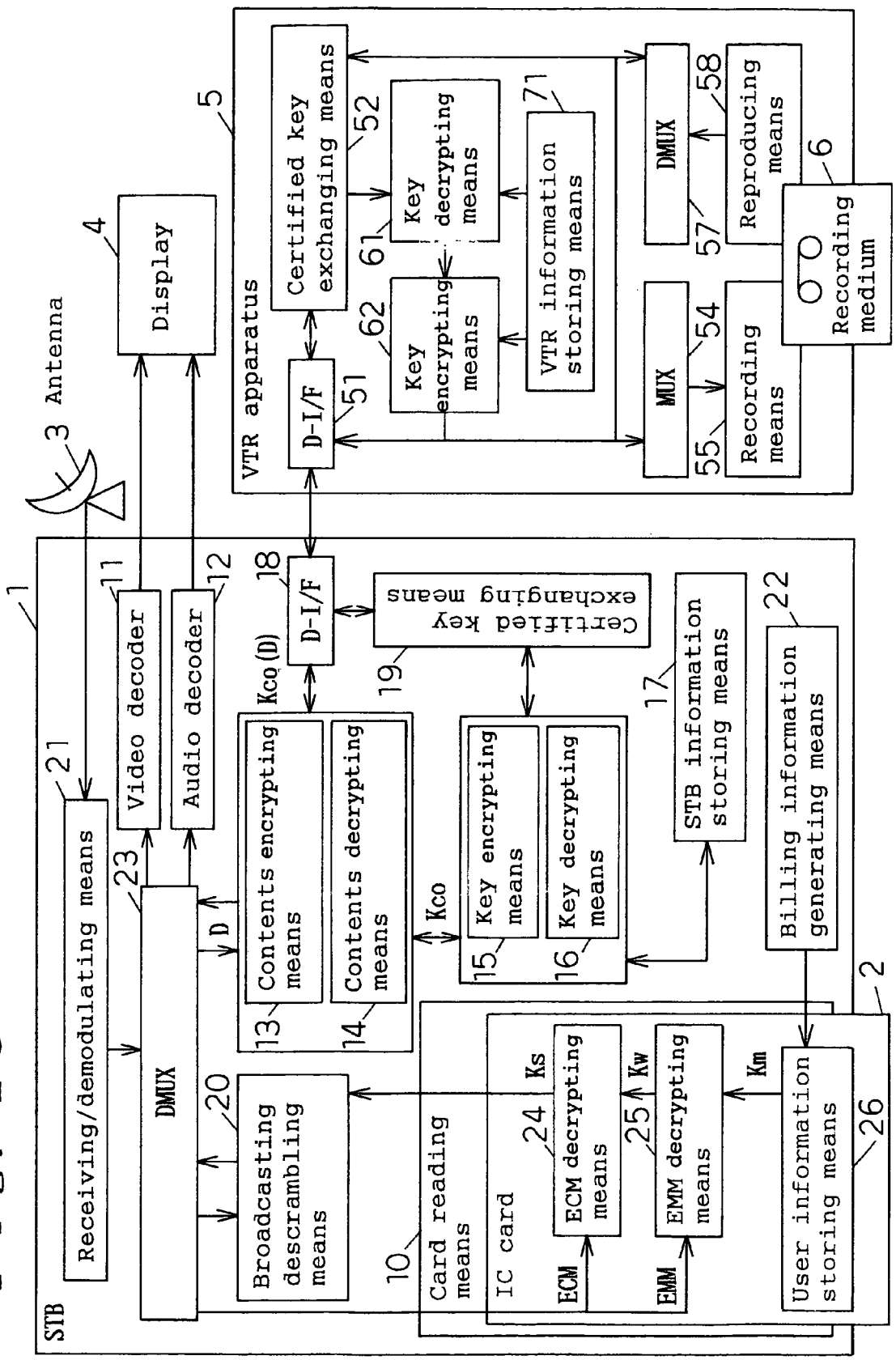
FIG. 10 is a configuration view showing the configuration of a data recording/reproducing system in accordance with a fifth embodiment of the present invention.

FIG. 10 is a configuration view showing the configuration of the data recording/reproducing system in accordance with the fifth embodiment of the present invention. The configuration of the data recording/reproducing system of the present embodiment differs from the data recording/reproducing system of the first embodiment in that a key encrypting means 62 corresponding to the key encrypting means of the present invention is provided for the VTR apparatus 5 instead of the STB 1; accordingly, the STB 1 has a key decrypting means 31 corresponding to the second key encrypting means of the present invention; and the VTR apparatus 5 has a key decrypting means 61 corresponding to the second key decrypting means of the present invention, and a VTR information storing means 71 for storing information regarding the common key, public key and the like used by the key decrypting means 61 and the key encrypting means 62. Furthermore, the STB information storing means 17 holds the information regarding the common key that is used when the key encrypting means 31 encrypts the contents key, in addition to the information held in the case of the first embodiment.

In the case when the billing information is stored in the STB information storing means 17, for example, just as in the case of the first embodiment, the IC card 2 and the card reading means 10 may be omitted from the data recording/reproducing system in the configuration of the present embodiment.

The operations of the present embodiment will be described below.

Figure 11:
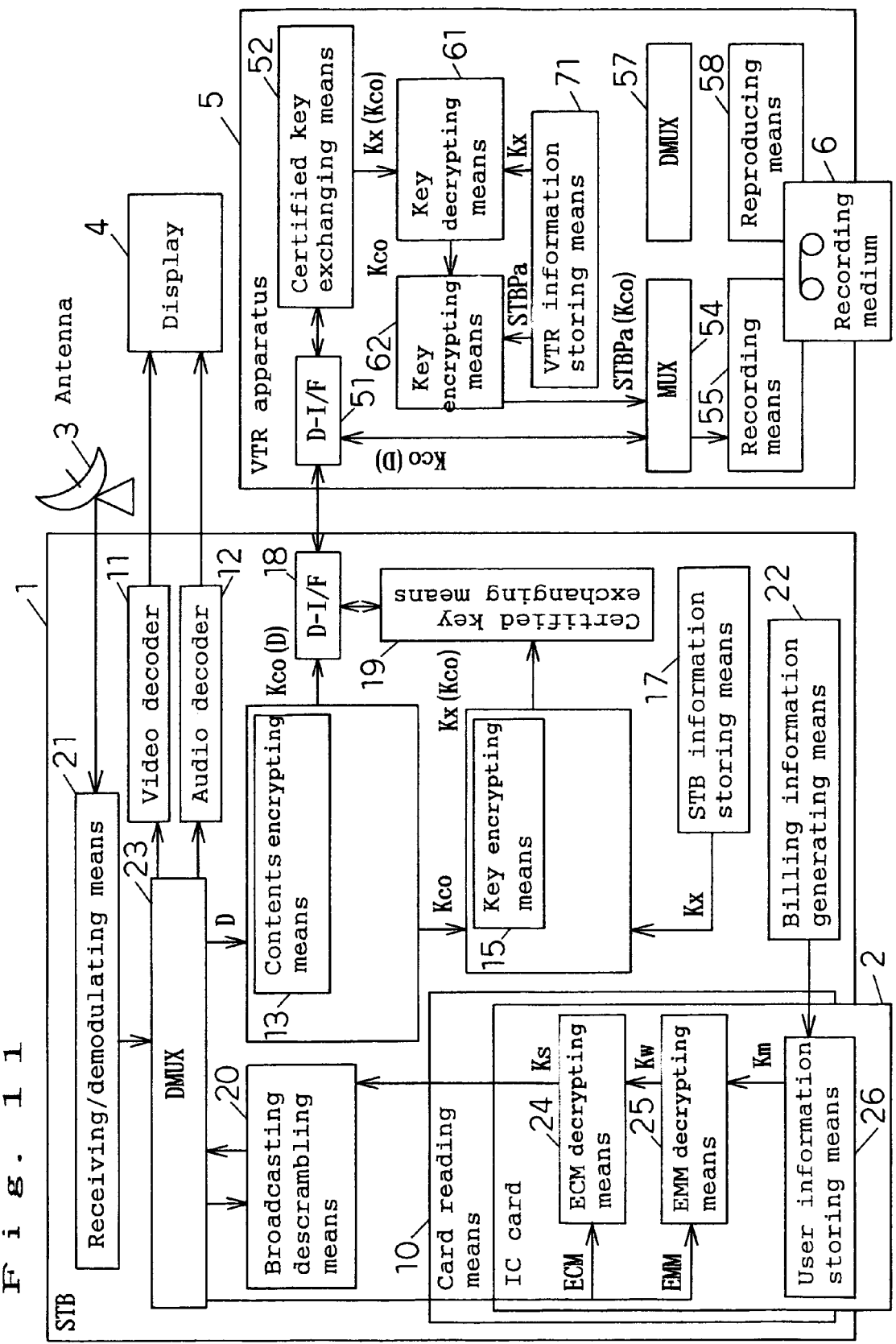
FIG. 11 is a flow chart showing the flow of data at the time when the data recording/reproducing system in accordance with the fifth embodiment of the present invention records data.

First, the flow of data at the time when AV data is recorded on the recording medium 6 will be described below referring to FIG. 11. FIG. 11 is a flow chart showing the flow of data at the time when the data recording/reproducing system in accordance with the fifth embodiment of the present invention records data. In FIG. 11, means and the like not required for recording are omitted as appropriate from the configuration shown in FIG. 10. Furthermore, the reference encrypts in the figure are the same as those used in FIGS. 2 and 3, except for those explained newly. Kk represents a common key that is common to the STB 1 and the VTR apparatus 5 and used to encrypt the contents key Kco, Kco represents a contents key used to encrypt AV data D, and Kk (Kco) represents a encrypted contents key obtained by encrypting the contents key Kco by using the common key Kk, respectively. Just as in the case of the first embodiment, by switching the contents key Kco at regular or irregular intervals, the data recording/reproducing system in accordance with the present embodiment becomes a system wherein encrypting-related information is less likely to leak outside, in comparison with the case wherein the switching is not carried out.

The AV data D, decrypted as broadcasting radio waves and multiplexed, is received via the antenna 3, demodulated by the receiving/demodulating means 21 and decrypted by the broadcasting descrambling means 20 with respect to encrypts for broadcasting, demultiplexed by the DMUX 23 to become plain AV data D, and then sent to the video decoder 11, the audio decoder 12 and the contents encrypting means 13. The video decoder 11 and the audio decoder 12 decode highly efficient coding and the like given to the AV data D, and output data to the display 4. The contents encrypting means 13 generates the contents key Kco, encrypts the AV data D by using the generated contents key Kco to generate encrypted AV data Kco (D). The generated contents key Kco is sent to the key encrypting means 31, and the key encrypting means 31 encrypts the contents key Kco by using the common key Kk common to the STB 1 and the VTR apparatus 5 and stored in the STB information storing means 17 to generate the encrypted contents key Kk (Kco).

The encrypted AV data Kco (D) and the encrypted contents key Kk (Kco) are transmitted to the VTR apparatus 5 via the D-I/F 18 and via the certified key exchanging means 19 and the D-I/F 18, respectively; however, before the transmission, the certified key exchanging means 19 and 52 corresponding to the STB 1 and the VTR apparatus 5, respectively, exchange their certified keys via the D-I/Fs 18 and 51 to confirm that they are parties transmittable to each other, and the above-mentioned transmission is carried out.

The encrypted AV data Kco (D) transmitted to the VTR apparatus 5 is sent to the MUX 54 via the D-I/F 51. In addition, the encrypted contents key Kk (Kco) transmitted to the VTR apparatus 5 is sent to the key decrypting means 61 via the D-I/F 51 and the certified key exchanging means 52. The key decrypting means 61 decrypts the encrypted contents key Kk (Kco) to restore the contents key Kco by using the common key Kk stored in the VTR information storing means 71, and sends it to the key encrypting means 62. The key encrypting means 62 encrypts the contents key Kco by using the public key STB Pa inherent in the STB 1 and stored in the VTR information storing means 71 to generate the encrypted contents key STB Pa (Kco), and sends it to the MUX 54. The encrypted AV data Kco (D) and the encrypted contents key STB Pa (Kco) sent to the MUX 54 are multiplexed in accordance with the format of the recording medium 6, and then recorded on the recording medium 6 by the recording means 55.

Figure 12:
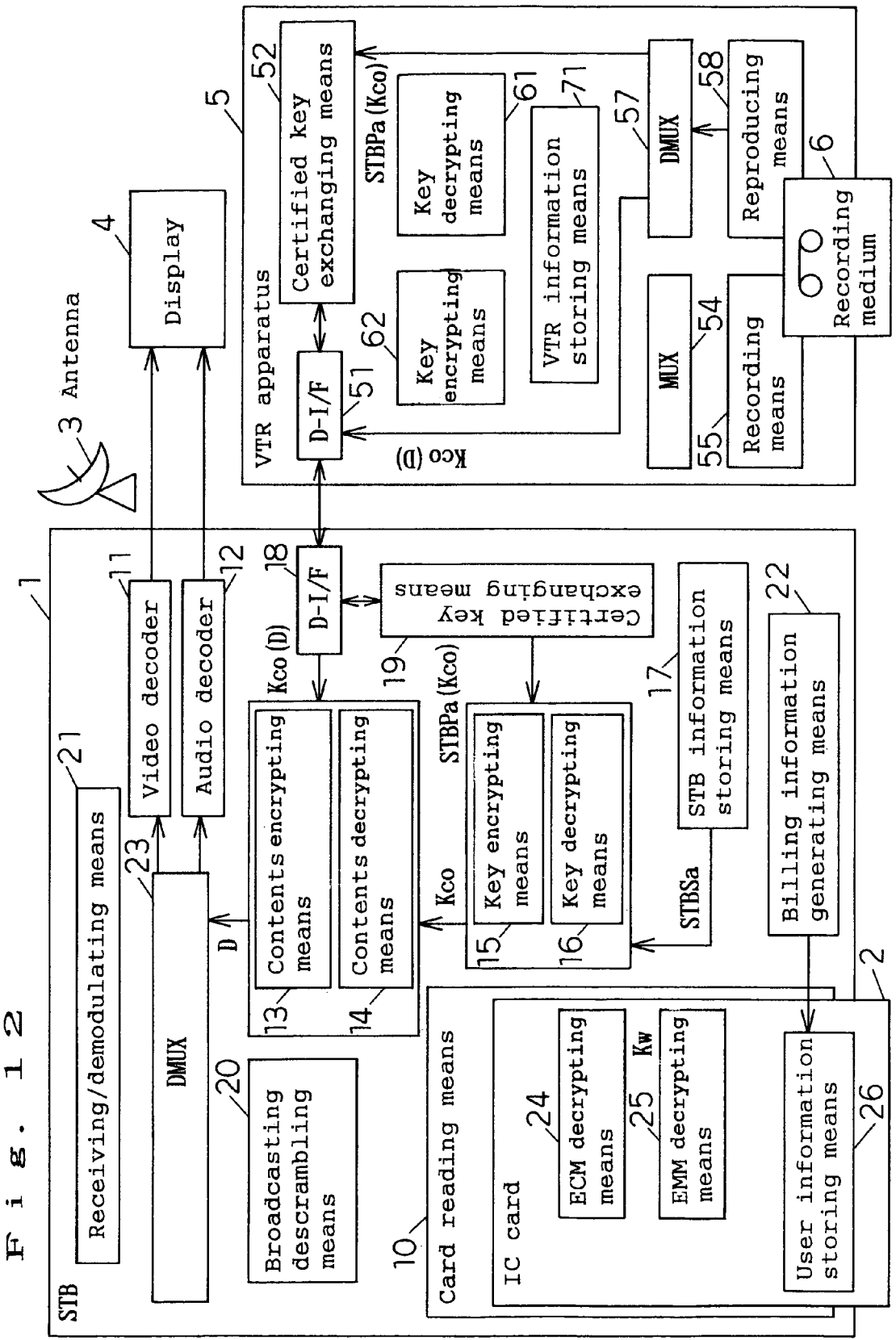
FIG. 12 is a flow chart showing the flow of data at the time when the data recording/reproducing system in accordance with the fifth embodiment of the present invention reproduces data.

Next, the flow of data at the time when AV data recorded on the recording medium 6 is reproduced will be described below referring to FIG. 12. FIG. 12 is a flow chart showing the flow of data at the time when the data recording/reproducing system in accordance with the fifth embodiment of the present invention reproduces data. As shown in FIG. 12, in the present embodiment, the encrypted contents key STB Pa (Kco) having been recorded is not restored in the VTR apparatus 5 but sent to the key decrypting means 16 of the STB 1, and restored herein to the contents key Kco by using the secret key STB Sa inherent in the STB 1 and stored in the STB information storing means 17. Means and the like not required for reproduction are omitted as appropriate from the configuration shown in FIG. 1. In other words, the flow of data at the time of reproducing the AV data is the same as that of the first embodiment shown in FIG. 3.

By recording/reproducing the AV data in accordance with the above-mentioned procedure, the encrypting of the contents key at the STB 1 on the transmission side to the VTR apparatus 5 is carried out during AV data recording by using the common key which causes a less burden; therefore, the burden to the STB 1 having an increased burden due to the concurrent encrypting of the AV data and the contents key can be decreased; for this reason, it is understood that the data recording/reproducing system of the present embodiment can reproduce only the specific object, thereby becoming a data recording/reproducing system wherein encrypting-related information is less likely to leak outside, and furthermore that the system is capable of having higher recording efficiency by smoothing the burden to the STB 1 and the VTR apparatus 5, in comparison with the data recording/reproducing system of the first embodiment.

In the present embodiment, it is explained that the public key and the secret key of the present invention are keys inherent in the tuner apparatus (STB 1) of the present invention, just as in the case of the first embodiment; however, without being limited to this, just as in the case of one of the second to fourth embodiments, for example, the keys may be keys inherent in the device model of the tuner apparatus (STB 1) of the present invention, inherent in the user ID recorded on the IC card of the present invention, and inherent in the service recorded on the IC card of the present invention.

Furthermore, it is explained that the public key information of the present invention is stored in the VTR information storing means 71 in the case of the present embodiment; however, without being limited to this, the information may be sent from the STB 1 at the start of recording, for example.

Figure 13:
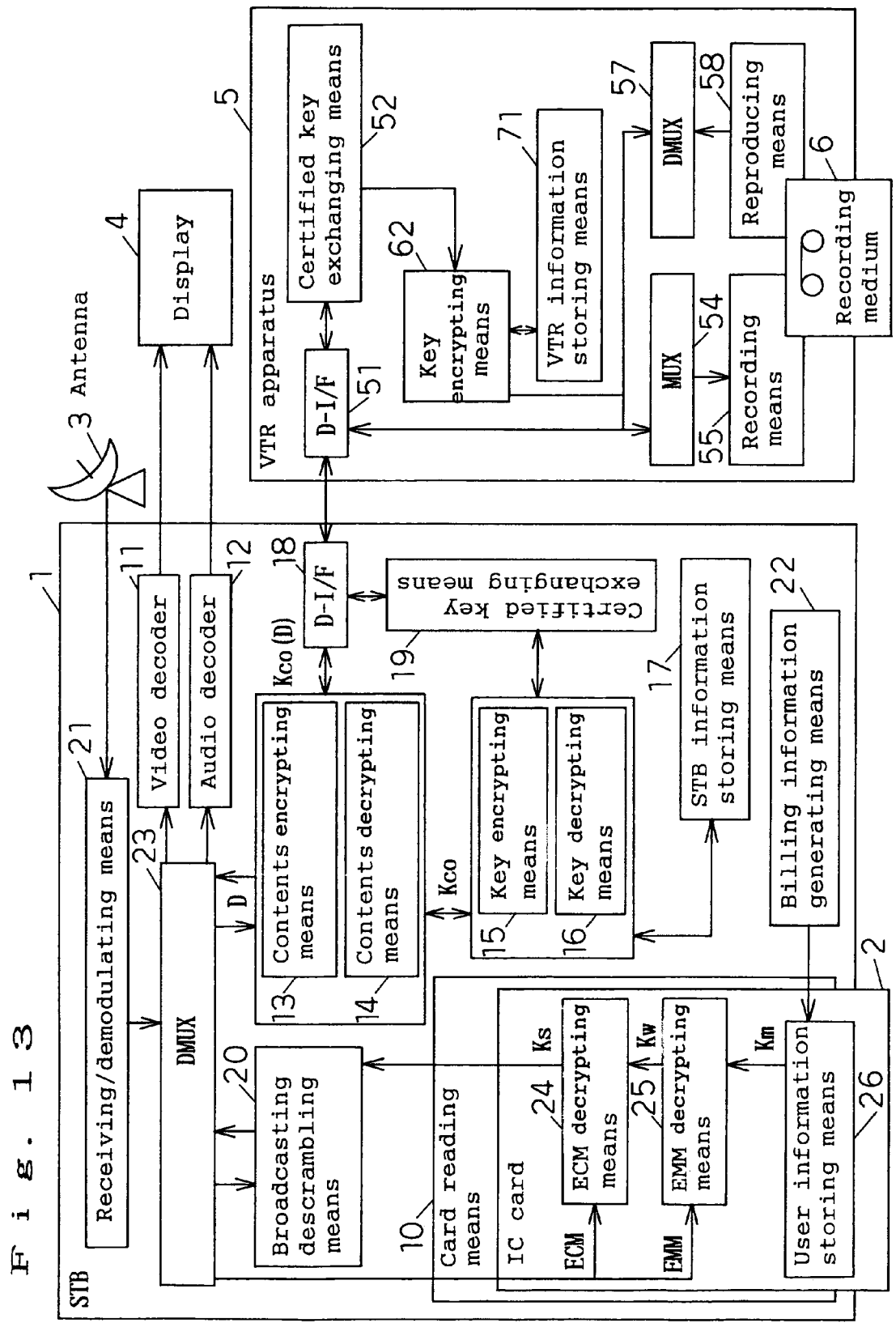
FIG. 13 is a configuration view showing the configuration of another data recording/reproducing system in accordance with the fifth embodiment of the present invention.

It is also possible to use the configuration shown in FIG. 13, wherein the key encrypting means 31 and the key decrypting means 61 are omitted from the data recording/reproducing system of the present embodiment. With this configuration, data transmission is carried out without encrypting the contents key at the time of data transmission from the tuner apparatus to the VTR apparatus of the present invention. This kind of configuration is particularly effective when applied to the data recording/reproducing system provided with an integrated STB wherein the functions of the STB and the VTR apparatus are integrated, just as in the case of an eighth embodiment described later. The data recording/reproducing system having the configuration shown in FIG. 13 will be described below.

Figure 14:
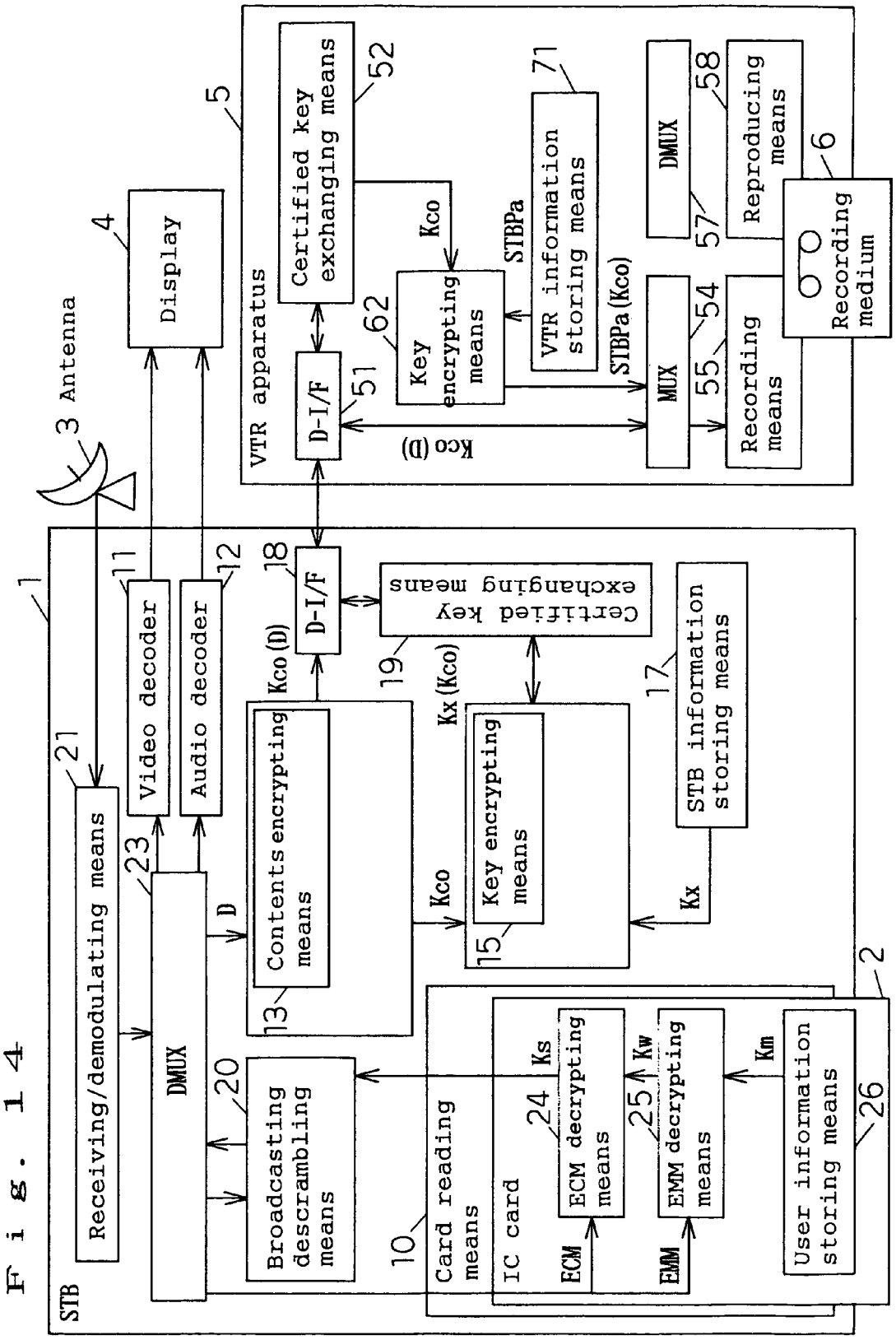
FIG. 14 is a flow chart showing the flow of data at the time when the other data recording/reproducing system in accordance with the fifth embodiment of the present invention records data.

FIG. 14 shows the flow of data at the time when AV data is recorded on the recording medium 6 in the data recording/reproducing system having the configuration shown in FIG. 13. In FIG. 14, means and the like not required for reproduction are omitted as appropriate from the configuration shown in FIG. 13. In addition, the reference encrypts in the figure are the same as those used in FIGS. 11 and 12.

The AV data D, decrypted as broadcasting radio waves and multiplexed, is received via the antenna 3, demodulated by the receiving/demodulating means 21 and decrypted by the broadcasting descrambling means 20 with respect to encrypts for broadcasting, demultiplexed by the DMUX 23 to become plain AV data D, and then sent to the video decoder 11, the audio decoder 12 and the contents encrypting means 13. The video decoder 11 and the audio decoder 12 decode highly efficient coding and the like given to the AV data D, and output data to the display 4. The contents encrypting means 13 generates contents key Kco, and encrypts the AV data D by using the generated contents key Kco, thereby to generate encrypted AV data Kco (D).

The encrypted AV data Kco (D) and the contents key Kco are transmitted to the VTR apparatus 5 via the D-I/F 18 and via the certified key exchanging means 19 and the D-I/F 18, respectively; however, before the transmission, the certified key exchanging means 19 and 52 corresponding to the STB 1 and the VTR apparatus 5, respectively, exchange their certified keys via the D-I/Fs 18 and 51 to confirm that they are parties transmittable to each other, and the above-mentioned transmission is carried out.

The encrypted AV data Kco (D) transmitted to the VTR apparatus 5 is sent to the MUX 54 via the D-I/F 51. In addition, the contents key Kco transmitted to the VTR apparatus 5 is sent to the key encrypting means 62 via the D-I/F 51 and the certified key exchanging means 52. The key encrypting means 62 encrypts the contents key Kco by using the public key STB Pa inherent in the STB 1 and stored in the VTR information storing means 71 to generate the encrypted contents key STB Pa (Kco), and sends it to the MUX 54. The encrypted AV data Kco (D) and the encrypted contents key STB Pa (Kco) sent to the MUX 54 are multiplexed in accordance with the format of the recording medium 6, and then recorded on the recording medium 6 by the recording means 55.

The flow of data at the time of data reproduction in the data recording/reproducing system having the configuration shown in FIG. 13 is the same as the flow of data at the time of data reproduction shown in FIG. 12. Therefore, the subsequent explanation is omitted.

The STB information storing means 17 and the VTR information storing means 71 are not required to hold the information regarding the common key held in the configuration shown in FIG. 10.

By recording/reproducing the AV data in accordance with the above-mentioned procedure, the encrypting of the contents key at the STB 1 on the transmission side to the VTR apparatus 5 is not carried out during AV data recording; therefore, the burden to the STB 1 having an increased burden due to the concurrent encrypting of the AV data and the contents key can be further decreased; for this reason, it is understood that the data recording/reproducing system having the configuration shown in FIG. 13 is capable of having higher recording efficiency by further smoothing the burden to the STB 1 and the VTR apparatus 5, in comparison with the data recording/reproducing system having the configuration shown in FIG. 10. However, in comparison with the data recording/reproducing system shown in FIG. 10, the present system is low in security for data transmission from the STB 1 to the VTR apparatus 5. This kind of configuration is particularly effective when applied to the data recording/reproducing system provided with an integrated STB wherein the functions of the STB and the VTR apparatus are integrated, just as in the case of an eighth embodiment described later.

Sixth Embodiment

A sixth embodiment in accordance with the present invention will be described below referring to the drawings. The present embodiment differs from the above-mentioned first embodiment in that the key encrypting means and the key decrypting means of the present invention are provided for the VTR apparatus, and that the public key/secret key for encrypting/decrypting the contents key are keys inherent in the VTR apparatus of the present invention. For this reason, the same components as those used for the first embodiment are represented by the same reference codes, and the explanations of these components are omitted. Furthermore, components not described specifically are the same as those of the first embodiment.

Figure 15:
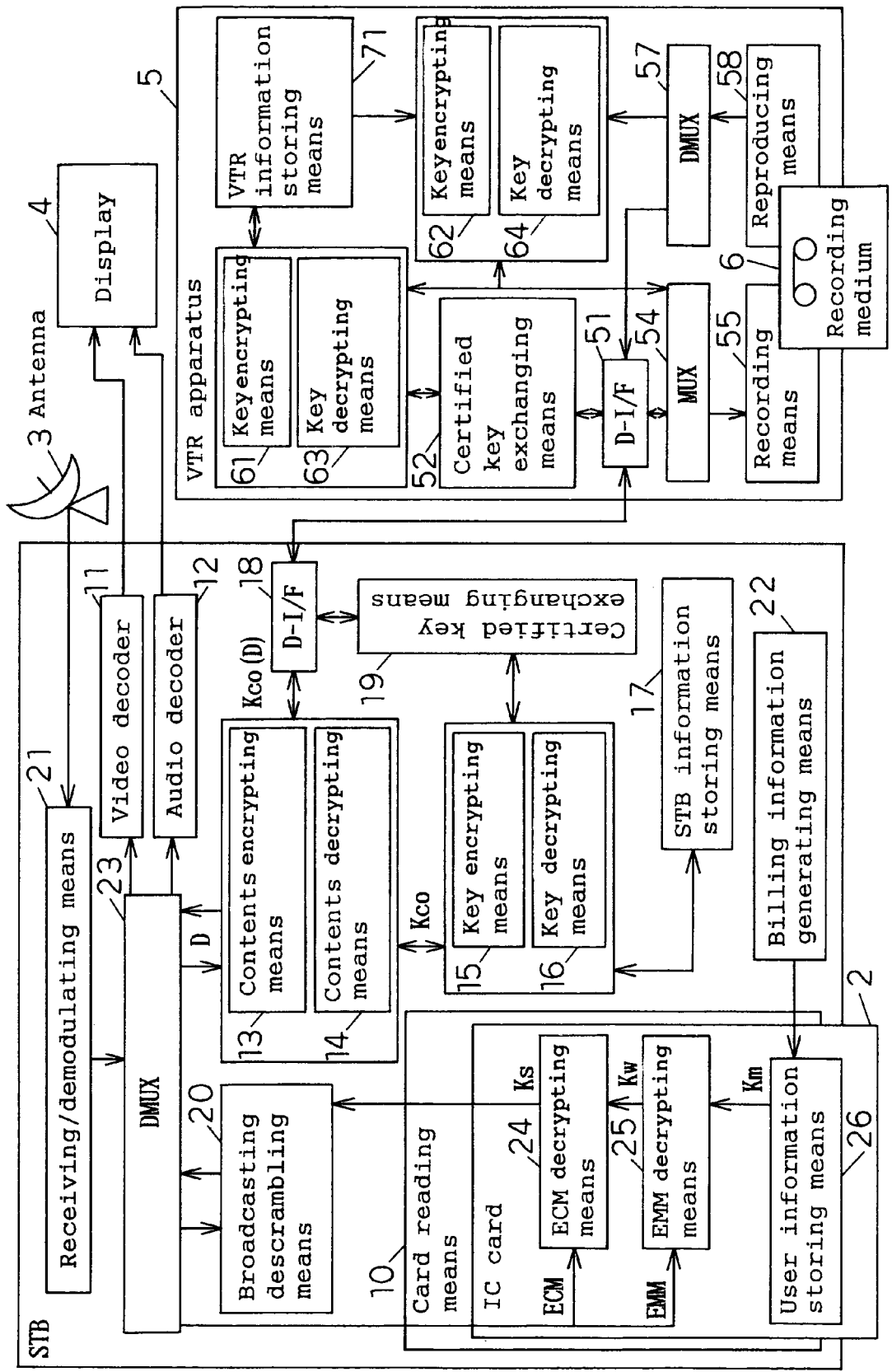
FIG. 15 is a configuration view showing the configuration of a data recording/reproducing system in accordance with a sixth embodiment of the present invention.

FIG. 15 is a configuration view showing the configuration of the data recording/reproducing system in accordance with the sixth embodiment of the present invention. The configuration of the data recording/reproducing system of the present embodiment differs from the data recording/reproducing system of the first embodiment in that the key encrypting means 62 corresponding to the key encrypting means of the present invention and the key decrypting means 64 corresponding to the key decrypting means of the present invention are provided for the VTR apparatus 5 instead of the STB 1; accordingly, the STB 1 has the key encrypting means 31 corresponding to the second key encrypting means of the present invention and the key decrypting means 32 corresponding to the second key decrypting means of the present invention, and the VTR apparatus 5 has the key decrypting means 61 corresponding to the second key decrypting means of the present invention, the key encrypting means 63 corresponding to the second key encrypting means of the present invention and the VTR information storing means 71 for storing information regarding the common key, the public key and the like used by the key decrypting means 61, the key encrypting means 62, the key encrypting means 63 and the key decrypting means 64. Furthermore, the STB information storing means 17 holds the information regarding the common key, which is used when the key encrypting means 31 encrypts the contents key, in addition to the information held in the case of the first embodiment.

In the case when the billing information is recorded in the STB information storing means 17, for example, just as in the case of the first embodiment, the IC card 2 and the card reading means 10 may be omitted from the data recording/reproducing system in the configuration of the present embodiment.

Next, the operations of the present embodiment will be described below.

Figure 16:
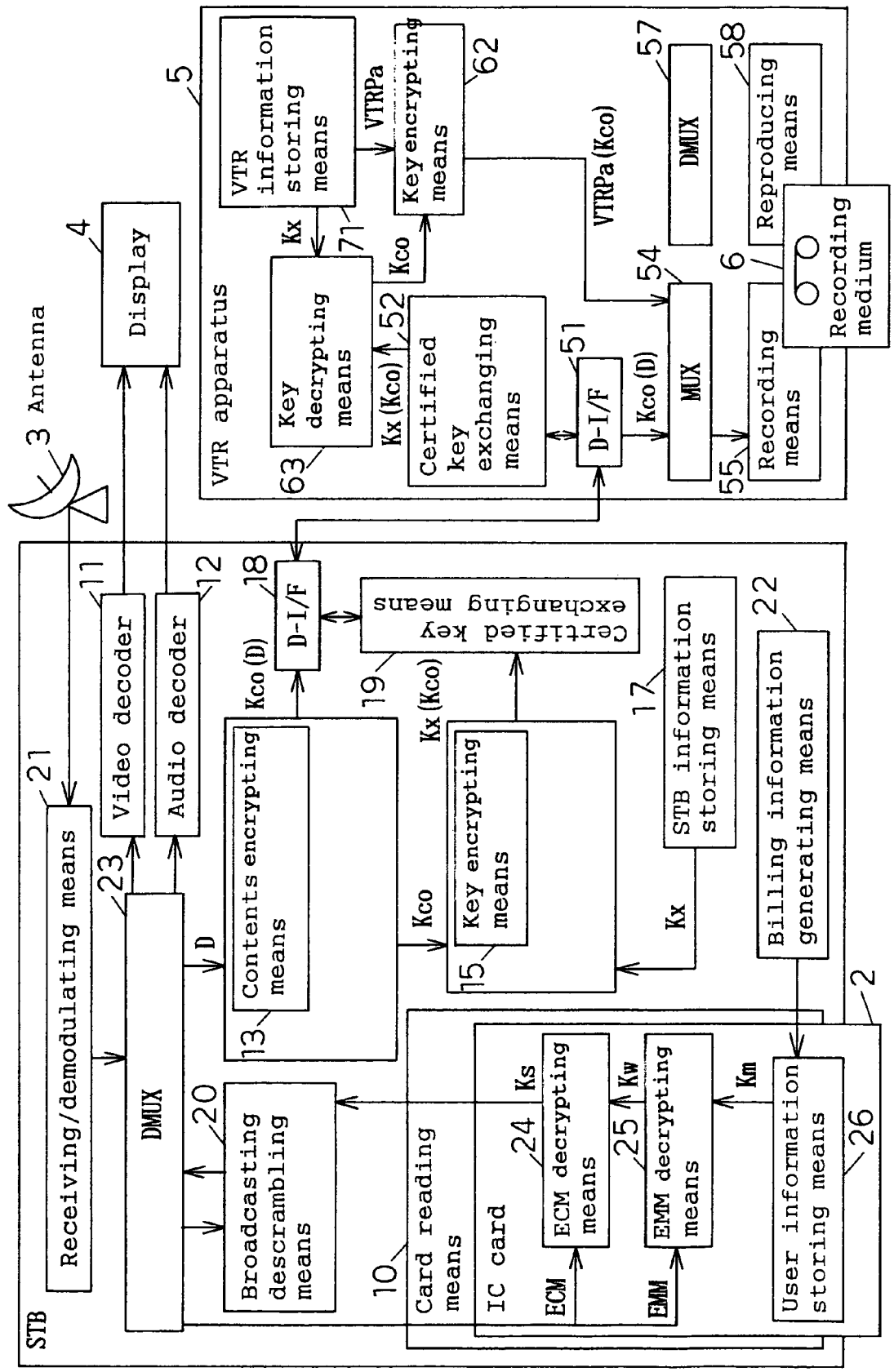
FIG. 16 is a flow chart showing the flow of data at the time when the data recording/reproducing system in accordance with the sixth embodiment of the present invention records data.

First, the flow of data at the time when AV data is recorded on the recording medium 6 will be described below referring to FIG. 14. FIG. 16 is a flow chart showing the flow of data at the time when the data recording/reproducing system in accordance with the sixth embodiment of the present invention records data. In FIG. 16, means and the like not required for recording are omitted as appropriate from the configuration shown in FIG. 15. The reference encrypts in the figure are the same as those used in FIGS. 2 and 3, except for those explained newly. Kk represents a common key that is common to the STB 1 and the VTR apparatus 5 and used to encrypt the contents key Kco, Kk (Kco) represents a encrypted contents key obtained by encrypting the contents key Kco by using the common key Kk, VTR Pa represents a public key inherent in the VTR apparatus 5 and used to encrypt the contents key Kco, and VTR Pa (Kco) represents a encrypted contents key obtained by encrypting the contents key Kco by using the public key VTR Pa, respectively. Furthermore, just as in the case of the first embodiment, by switching the contents key Kco at regular or irregular intervals, the data recording/reproducing system in accordance with the present embodiment becomes a system wherein encrypting-related information is less likely to leak outside, in comparison with the case wherein the switching is not carried out.

The AV data D, decrypted as broadcasting radio waves and multiplexed, is received via the antenna 3, demodulated by the receiving/demodulating means 21 and decrypted by the broadcasting descrambling means 20 with respect to encrypts for broadcasting, demultiplexed by the DMUX 23 to become plain AV data D, and then sent to the video decoder 11, the audio decoder 12 and the contents encrypting means 13. The video decoder 11 and the audio decoder 12 decode highly efficient coding and the like given to the AV data D, and output data to the display 4. The contents encrypting means 13 generates the contents key Kco, encrypts the AV data D by using the generated contents key Kco to generate encrypted AV data Kco (D). The generated contents key Kco is sent to the key encrypting means 31, and the key encrypting means 31 encrypts the contents key Kco by using the common key Kk common to the STB 1 and the VTR apparatus 5 and stored in the STB information storing means 17 to generate the encrypted contents key Kk (Kco).

The encrypted AV data Kco (D) and the encrypted contents key STB Pa (Kco) are transmitted to the VTR apparatus 5 via the D-I/F 18 and via the certified key exchanging means 19 and the D-I/F 18, respectively; however, before the transmission, the certified key exchanging means 19 and 52 corresponding to the STB 1 and the VTR apparatus 5, respectively, exchange their certified keys via the D-I/Fs 18 and 51 to confirm that they are parties transmittable to each other, and the above-mentioned transmission is carried out.

The encrypted AV data Kco (D) transmitted to the VTR apparatus 5 is sent to the MUX 54 via the D-I/F 51. In addition, the encrypted contents key Kk (Kco) transmitted to the VTR apparatus 5 is sent to the key decrypting means 61 via the D-I/F 51 and the certified key exchanging means 52. The key decrypting means 61 decrypts the encrypted contents key Kk (Kco) to restore the contents key Kco by using the common key Kk stored in the VTR information storing means 71 and sends it to the key encrypting means 62. The key encrypting means 62 encrypts the contents key Kco by using the public key VTR Pa inherent in the VTR apparatus 5 and stored in the VTR information storing means 71 to generate the encrypted contents key VTR Pa (Kco) and sends it to the MUX 54. The encrypted AV data Kco (D) and the encrypted contents key VTR Pa (Kco) sent to the MUX 54 are multiplexed in accordance with the format of the recording medium 6, and then recorded on the recording medium 6 by the recording means 55.

Figure 17:
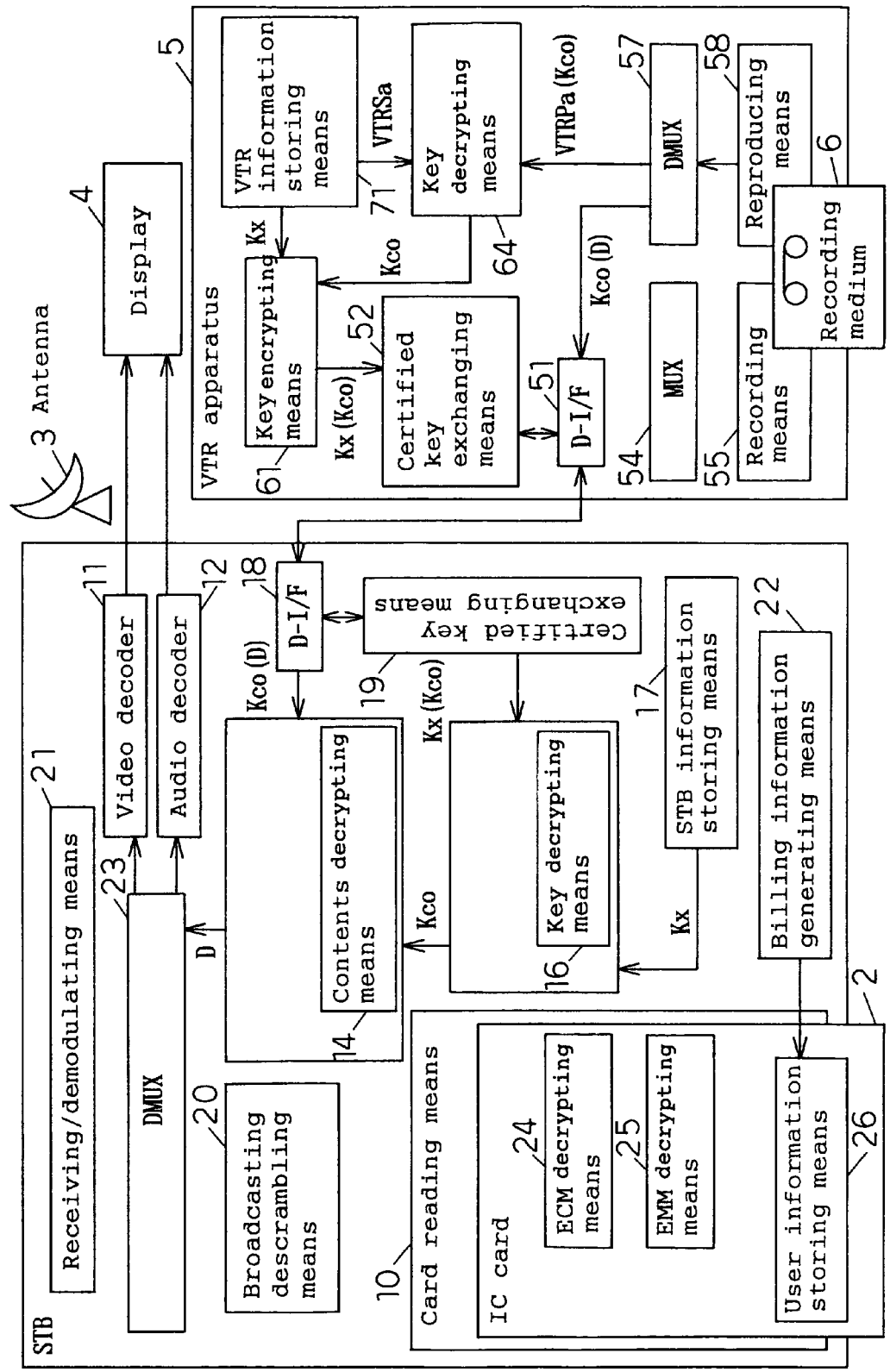
FIG. 17 is a flow chart showing the flow of data at the time when the data recording/reproducing system in accordance with the sixth embodiment of the present invention reproduces data.

Next, the flow of data at the time when AV data recorded on the recording medium 6 is reproduced will be described below referring to FIG. 17. FIG. 17 is a flow chart showing the flow of data at the time when the data recording/reproducing system in accordance with the sixth embodiment of the present invention reproduces data. In FIG. 17, means and the like not required for reproduction are omitted as appropriate from the configuration shown in FIG. 15. VTR Sa corresponds to the public key VTR Pa, and represents a secret key inherent in the VTR apparatus 5 and used to decrypt the encrypted contents key VTR Pa (Kco) to restore the contents key Kco. The other reference encrypts in the figure are the same as those used in FIG. 16.

The encrypted AV data Kco (D) and the encrypted contents key VTR Pa (Kco), multiplexed and recorded on the recording medium 6, are reproduced by the reproducing means 58, and demultiplexed by the DMUX 57. The demultiplexed encrypted contents key VTR Pa (Kco) is sent to the key decrypting means 64. The key decrypting means 64 decrypts the encrypted contents key VTR Pa (Kw) to restore the contents key Kco by using the secret key VTR Sa inherent in the VTR apparatus 5 and stored in the VTR information storing means 71, and sends it to the key encrypting means 63. The key encrypting means 63 encrypts the contents key Kco by using the common key Kk stored in the VTR information storing means 71 to generate the encrypted contents key Kk (Kco).

The demultiplexed encrypted AV data Kco (D) and the generated encrypted contents key Kk (Kco) are transmitted to the STB 1 via the D-I/F 51 and via the certified key exchanging means 52 and the D-I/F 51, respectively; however, before the transmission, the certified key exchanging means 19 and 52 corresponding to the STB 1 and the VTR apparatus 5, respectively, exchange their certified keys via the D-I/Fs 18 and 51 to confirm that they are parties transmittable to each other, and the above-mentioned transmission is carried out just as in the case of recording.

The encrypted AV data Kco (D) transmitted to the STB 1 is sent to the contents decrypting means 14 via the D-I/F 18, and the encrypted contents key Kk (Kco) is sent to the key decrypting means 32 via the D-I/F 18 and the certified key exchanging means 19. The key decrypting means 32 decrypts the encrypted contents key Kk (Kco) to restore the contents key Kco by using the common key Kk stored in the STB information storing means 17, and sends it to the contents decrypting means 14. The contents decrypting means 14 outputs the AV data D obtained by decrypting the encrypted AV data Kco (D) by using the restored contents key Kco to the video decoder 11 and the audio decoder 12. The video decoder 11 and the audio decoder 12 decode highly efficient coding and the like given to the AV data D, and output data to the display 4.

By recording/reproducing the AV data in accordance with the above-mentioned procedure, the contents key, used to encrypt the AV data, is encrypted by using the public key inherent in the VTR apparatus 5, and recorded together with the encrypted AV data on the recording medium; and during reproduction, the encrypted contents key is restored by using the secret key inherent in the VTR apparatus 5; for this reason, only the system having the secret key inherent in the VTR apparatus 5, that is, only the system provided with the VTR apparatus 5 itself can carry out reproduction; therefore, it is understood that the data recording/reproducing system of the present embodiment can reproduce only the specific object, thereby becoming a data recording/reproducing system wherein encrypting-related information is less likely to leak outside.

Figure 18:
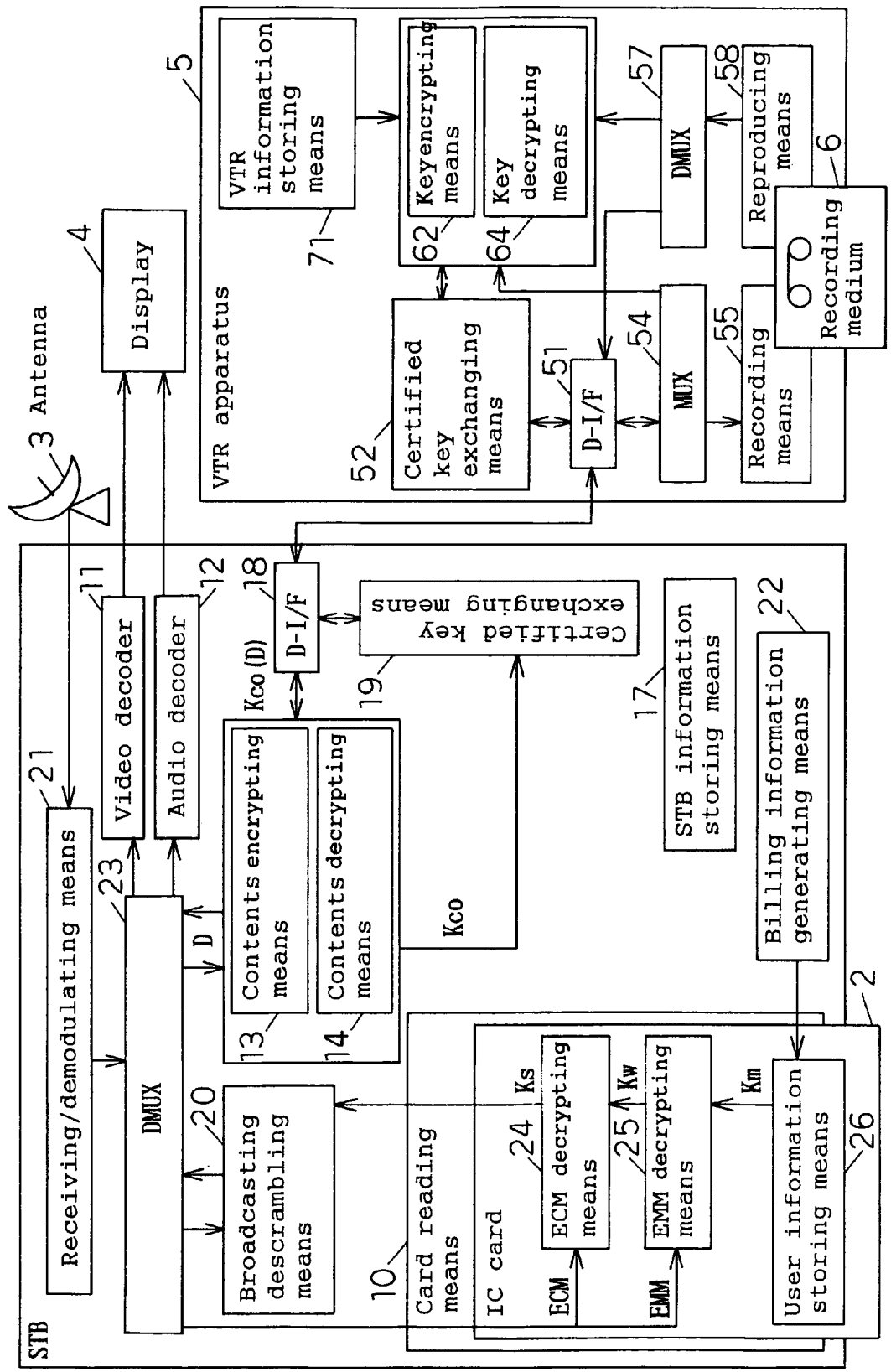
FIG. 18 is a configuration view showing the configuration of another data recording/reproducing system in accordance with the sixth embodiment of the present invention.

Furthermore, as shown in FIG. 18, it is possible to have a configuration wherein the key encrypting means 31, the key decrypting means 32, the key decrypting means 61 and the key encrypting means 63 are omitted from the data recording/reproducing system of the present embodiment. With this configuration, the data transmission between the tuner apparatus and the VTR apparatus of the present invention can be carried out without encrypting the contents key. The data recording/reproducing system having the configuration shown in FIG. 13 will be described below.

Figure 19:
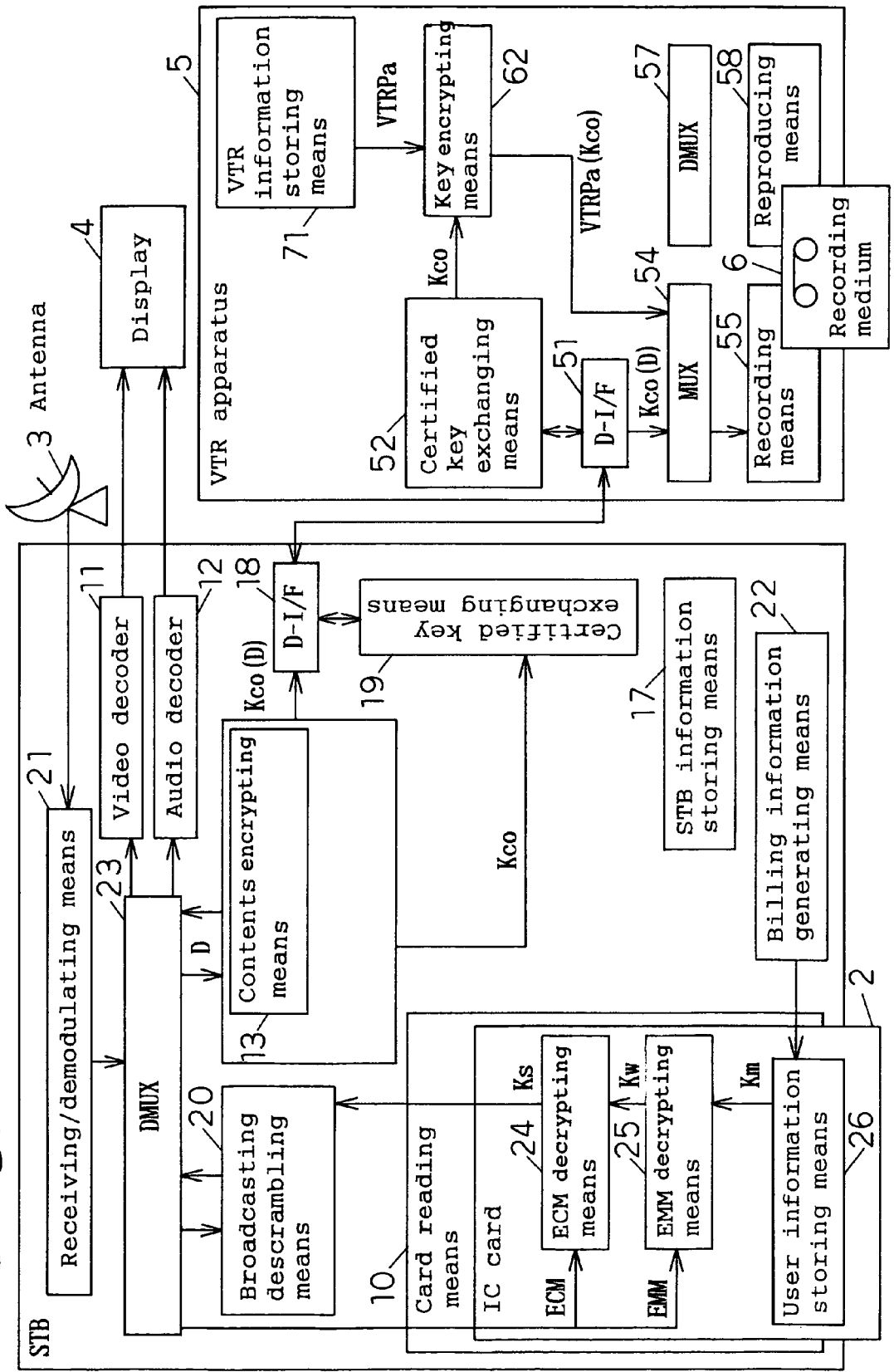
FIG. 19 is a flow chart showing the flow of data at the time when the other data recording/reproducing system in accordance with the sixth embodiment of the present invention records data.

FIG. 19 shows the flow of data at the time when AV data is recorded on the recording medium 6 in the data recording/reproducing system having the configuration shown in FIG. 18. In FIG. 19, means or the like not required for reproduction are omitted as appropriate from the configuration shown in FIG. 18. Reference encrypts in the figure are the same as those used in FIGS. 16 and 17.

The AV data D, encrypted as broadcasting radio waves and multiplexed, is received via the antenna 3, demodulated by the receiving/demodulating means 21 and decrypted by the broadcasting descrambling means 20 with respect to encrypts for broadcasting, demultiplexed by the DMUX 23 to become plain AV data D, and then sent to the video decoder 11, the audio decoder 12 and the contents encrypting means 13. The video decoder 11 and the audio decoder 12 decode highly efficient coding and the like given to the AV data D, and output data to the display 4. The contents encrypting means 13 generates the contents key Kco, encrypts the AV data D by using the generated contents key Kco to generate encrypted AV data Kco (D).

The encrypted AV data Kco (D) and the contents key Kco are transmitted to the VTR apparatus 5 via the D-I/F 18 and via the certified key exchanging means 19 and the D-I/F 18, respectively; however, before the transmission, the certified key exchanging means 19 and 52 corresponding to the STB 1 and the VTR apparatus 5, respectively, exchange their certified keys via the D-I/Fs 18 and 51 to confirm that they are parties transmittable to each other, and the above-mentioned transmission is carried out.

The encrypted AV data Kco (D) transmitted to the VTR apparatus 5 is sent to the MUX 54 via the D-I/F 51. In addition, the contents key Kco transmitted to the VTR apparatus 5 is sent to the key encrypting means 62 via the D-I/F 51 and the certified key exchanging means 52. The key encrypting means 62 encrypts the contents key Kco by using the public key VTR Pa inherent in the VTR apparatus 5 and stored in the VTR information storing means 71 to generate the encrypted contents key VTR Pa (Kco) and sends it to the MUX 54. The encrypted AV data Kco (D) and the encrypted contents key VTR Pa (Kco) sent to the MUX 54 are multiplexed in accordance with the format of the recording medium 6, and then recorded on the recording medium 6 by the recording means 55.

Figure 20:
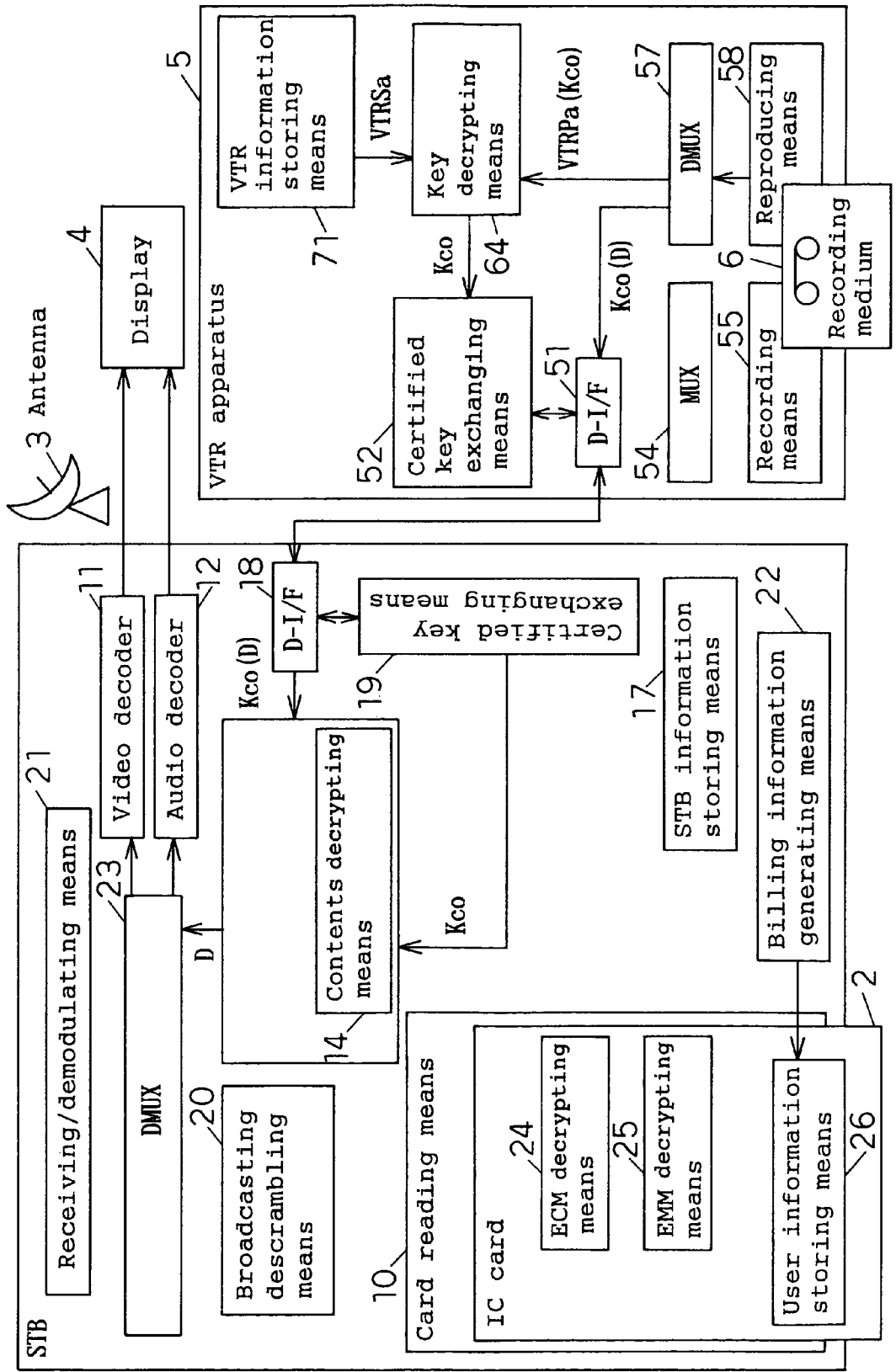
FIG. 20 is a flow chart showing the flow of data at the time when the other data recording/reproducing system in accordance with the sixth embodiment of the present invention reproduces data.

Next, the flow of data at the time when AV data recorded on the recording medium 6 in the data recording/reproducing system having the configuration shown in FIG. 18 is reproduced will be described below referring to FIG. 20. In FIG. 20, means and the like not required for reproduction are omitted as appropriate from the configuration shown in FIG. 18. Furthermore, the reference encrypts in the figure are the same as those used in FIGS. 16 and 17.

The encrypted AV data Kco (D) and the encrypted contents key VTR Pa (Kco), multiplexed and recorded on the recording medium 6, are reproduced by the reproducing means 58, and demultiplexed by the DMUX 57. The demultiplexed encrypted contents key VTR Pa (Kco) is sent to the key decrypting means 64. The key decrypting means 64 decrypts the encrypted contents key VTR Pa (Kco) to restore the contents key Kco by using the secret key VTR Sa inherent in the VTR apparatus 5 and stored in the VTR information storing means 71.

The demultiplexed encrypted AV data key Kco (D) and the restored contents key Kco are transmitted to the STB 1 via the D-I/F 51 and via the certified key exchanging means 52 and the D-I/F 51, respectively; however, before the transmission, the certified key exchanging means 19 and 52 corresponding to the STB 1 and the VTR apparatus 5, respectively, exchange their certified keys via the D-I/Fs 18 and 51 to confirm that they are parties transmittable to each other, and the above-mentioned transmission is carried out just as in the case of recording.

The encrypted AV data Kco (D) transmitted to the STB 1 is sent to the contents decrypting means 14 via the D-I/F 18, and the contents key Kco is sent to the contents decrypting means 14 via the D-I/F 18 and the certified key exchanging means 19, respectively. The contents decrypting means 14 outputs the AV data D obtained by decrypting the encrypted AV data Kco (D) by using the contents key Kco to the video decoder 11 and the audio decoder 12. The video decoder 11 and the audio decoder 12 decode highly efficient coding and the like given to the AV data D, and output data to the display 4.

The STB information storing means 17 and the VTR information storing means 71 are not required to hold the information of the common key held in the configuration shown in FIG. 15

By recording/reproducing the AV data in accordance with the above-mentioned procedure, the data transmission between the STB 1 and the VTR apparatus 5 can be carried out without encrypting the contents key; therefore, the burden to the STB 1 and the VTR apparatus 5 during recording/reproduction can be further decreased; for this reason, it is understood that the data recording/reproducing system having the configuration shown in FIG. 18 is capable of having higher recording efficiency in comparison with the data recording/reproducing system having the configuration shown in FIG. 15. However, in comparison with the data recording/reproducing system having the configuration shown in FIG. 15, the present system is low in security for data transmission between the STB 1 and the VTR apparatus 5. This kind of configuration is particularly effective when applied to the data recording/reproducing system provided with an integrated STB wherein the functions of the STB and the VTR apparatus are integrated, just as in the case of an eighth embodiment described later.

Seventh Embodiment

A seventh embodiment in accordance with the present invention will be described below referring to the drawings. The present embodiment differs from the above-mentioned first embodiment in that the contents key is encrypted/decrypted by using a common key instead of using the public key and the secret key. For this reason, the same components as those used for the first embodiment are designated by the same reference codes, and the explanations of these components are omitted. Furthermore, components not described specifically are the same as those of the first embodiment.

The configuration of the data recording/reproducing system in accordance with the present embodiment is the same as the configuration of the data recording/reproducing system in accordance with the first embodiment.

The operations of the present embodiment will be described below.

Figure 21:
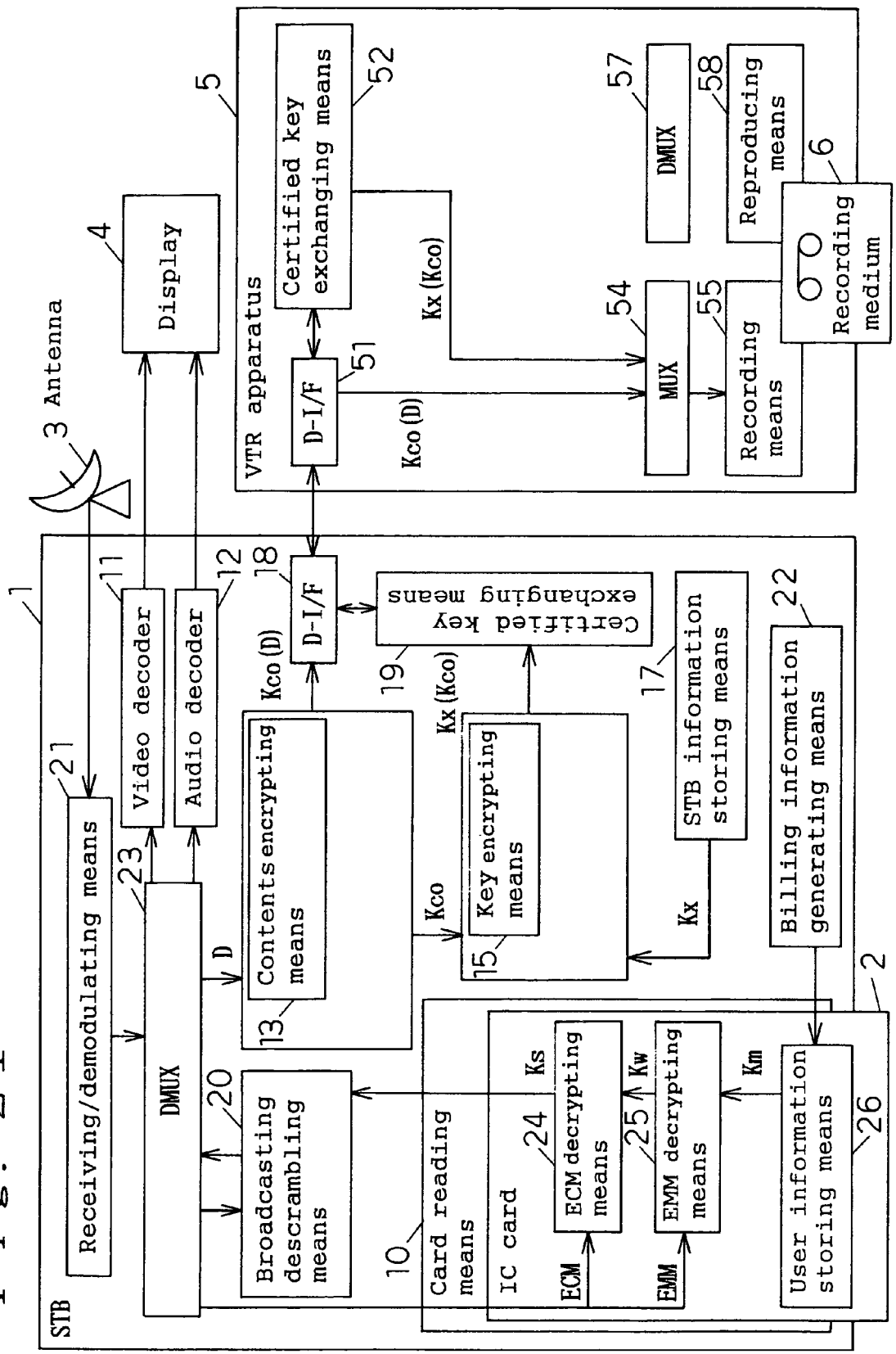
FIG. 21 is a flow chart showing the flow of data at the time when a data recording/reproducing system in accordance with a seventh embodiment of the present invention records data.
Figure 22:
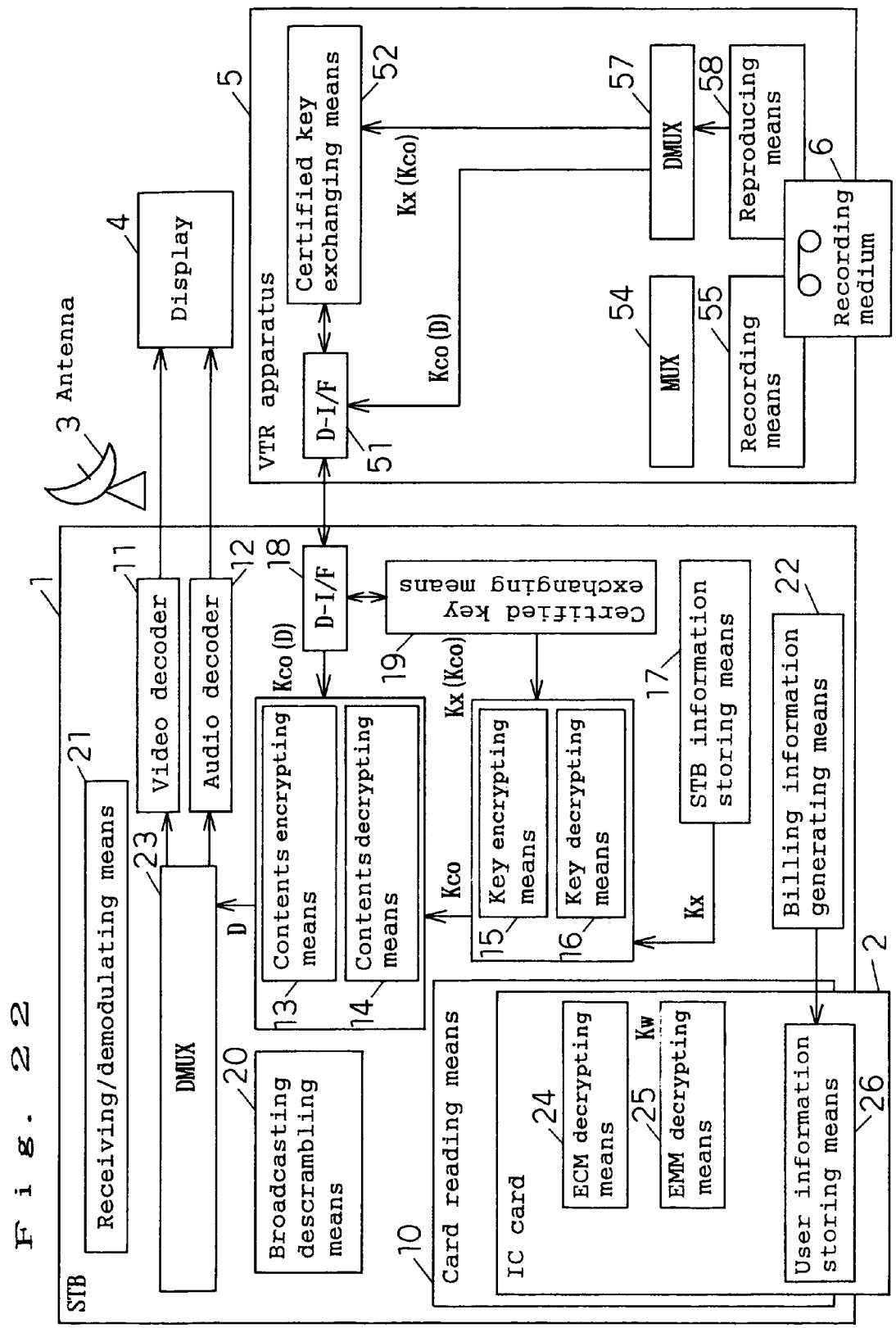
FIG. 22 is a flow chart showing the flow of data at the time when the data recording/reproducing system in accordance with the seventh embodiment of the present invention reproduces data.

FIG. 21 is a flow chart showing the flow of data at the time when the data recording/reproducing system in accordance with the seventh embodiment of the present invention records data. FIG. 22 is a flow chart showing the flow of data at the time when the data recording/reproducing system in accordance with the seventh embodiment of the present invention reproduces data. As shown in FIGS. 21 and 22, the present embodiment is the same as the data recording/reproducing system of the first embodiment except that the common key Kk stored in the STB information storing means 17 is used to encrypt and decrypt the contents key Kco. The common key Kk is a key inherent in the STB 1, the device model of the STB 1, user ID or service, for example. In addition, the common key Kk may be recorded on the IC card 2. When the common key Kk is not recorded on the IC card 2, and when billing information is recorded in the STB information storing means 17 for example, the card reading means 10 may be omitted. Furthermore, when the common key Kk is not recorded in the STB storing means 11, the STB storing means 11 may be omitted.

By recording/reproducing the AV data in accordance with the above-mentioned procedure, the public key is not used to encrypt the contents key; for this reason, it is understood that the data recording/reproducing system of the present embodiment is capable of having a shorter key data length in comparison with the data recording/reproducing system of the first embodiment, thereby being capable of attaining higher recording efficiency and smaller apparatus size.

Eighth Embodiment

An eighth embodiment in accordance with the present invention will be described below referring to the drawings. The present embodiment differs from the above-mentioned first embodiment in that, although the data recording/reproducing system of the first embodiment is provided with the tuner apparatus and the VTR apparatus of the present invention, the data recording/reproducing system of the present embodiment is provided with an apparatus having integrated functions of the above-mentioned tuner apparatus and the above-mentioned VTR apparatus. For this reason, the same components as those used for the first embodiment are represented by the same reference codes, and the explanations of these components are omitted. Furthermore, components not described specifically are the same as those of the first embodiment.

Figure 23:
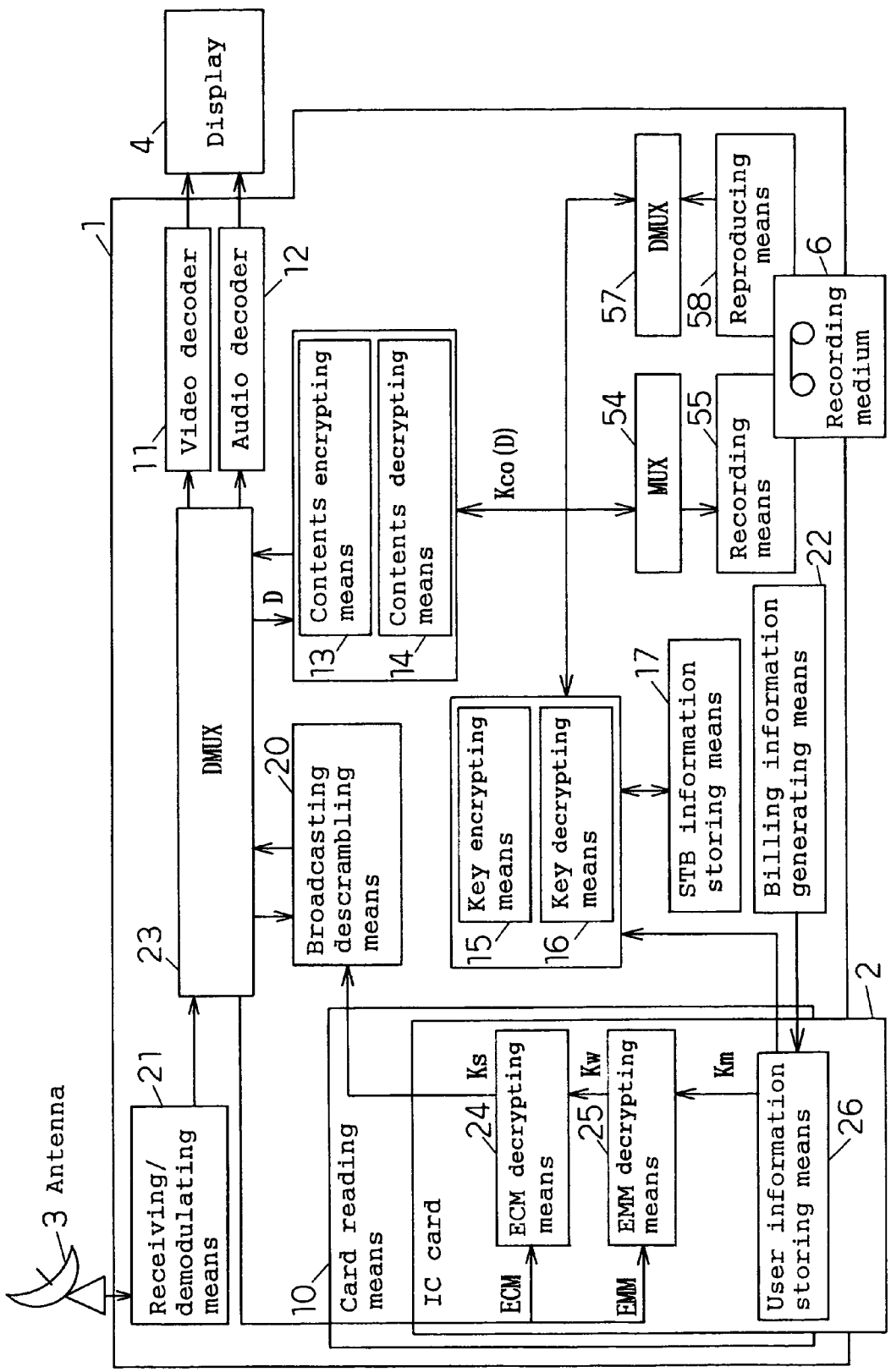
FIG. 23 is a configuration view showing the configuration of a data recording/reproducing system in accordance with an eighth embodiment of the present invention.

FIG. 23 is a configuration view showing the configuration of the data recording/reproducing system in accordance with the eighth embodiment of the present invention. The configuration of the data recording/reproducing system in accordance with the present embodiment differs from the configuration of the data recording/reproducing system in accordance with the first embodiment in that the present system is provided with an integrated STB 7 having integrated functions of the STB 1 and the VTR apparatus 5, whereby the D-I/Fs 18 and 51 provided for the data recording/reproducing system in accordance with the first embodiment are omitted.

Just as in the case of the first embodiment, when billing information is recorded in the STB information storing means 17 for example, the IC card 2 and the card reading means 10 may be omitted from the data recording/reproducing system in accordance with the present embodiment.

Next, the operations of the present embodiment will be described below.

Figure 24:
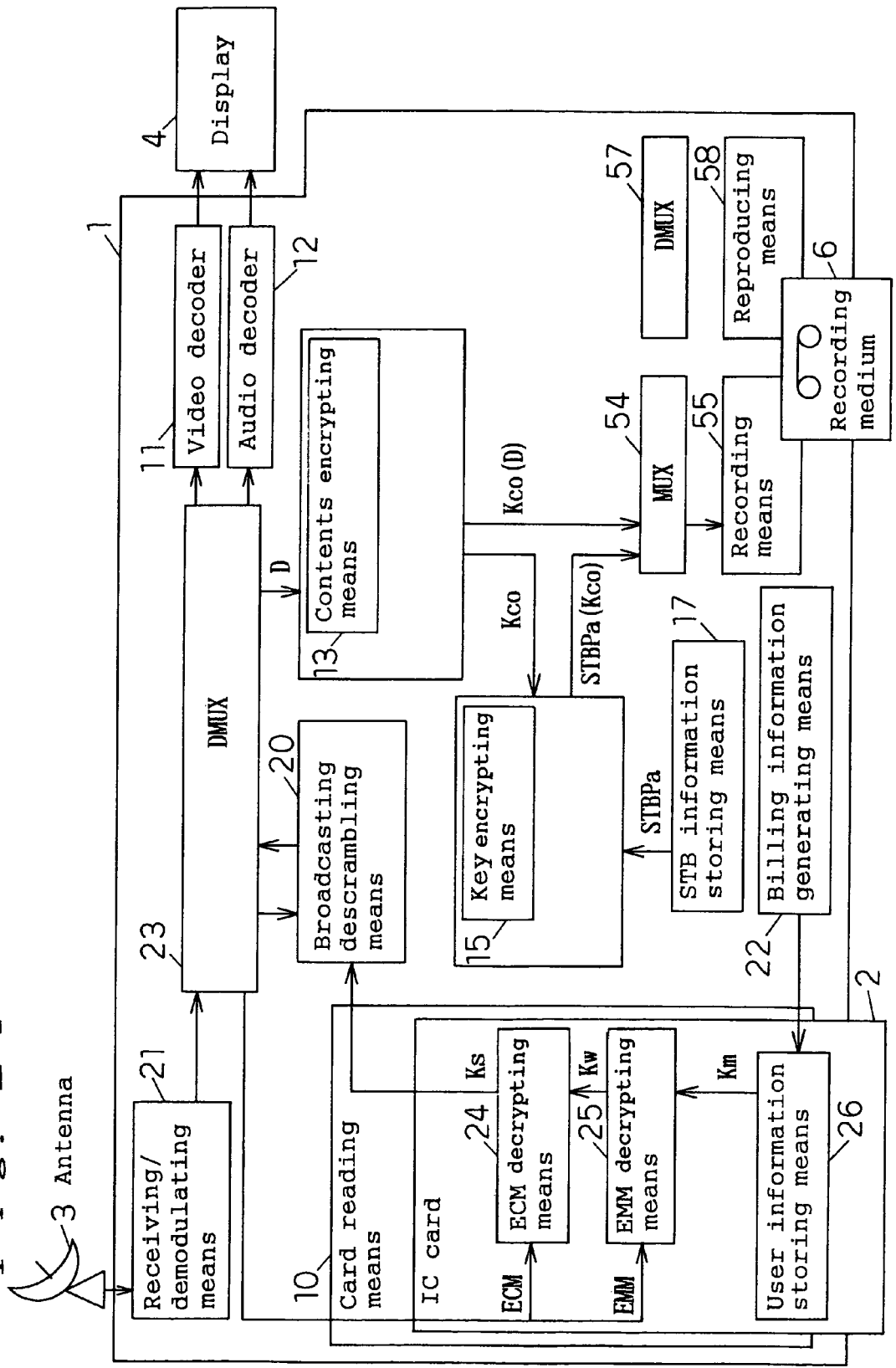
FIG. 24 is a flow chart showing the flow of data at the time when the data recording/reproducing system in accordance with the eighth embodiment of the present invention records data.

First, the flow of data at the time when AV data is recorded on the recording medium 6 will be described below referring to FIG. 24. FIG. 24 is a flow chart showing the flow of data at the time when the data recording/reproducing system in accordance with the eighth embodiment of the present invention records data. In FIG. 24, means and the like not required for recording are omitted as appropriate from the configuration shown in FIG. 23. Furthermore, the reference encrypts in the figure are the same as those used in FIGS. 2 and 3, and STB Pa represents a public key inherent in the integrated STB 7 and used to encrypt the contents key Kco. Furthermore, just as in the case of the first embodiment, by switching the contents key Kco at regular or irregular intervals, the data recording/reproducing system in accordance with the present embodiment becomes a system wherein encrypting-related information is less likely to leak outside.

The AV data D, encrypted as broadcasting radio waves and multiplexed, is received via the antenna 3, demodulated by the receiving/demodulating means 21 and decrypted by the broadcasting descrambling means 20 with respect to encrypts for broadcasting, demultiplexed by the DMUX 23 to become plain AV data D, and then sent to the video decoder 11, the audio decoder 12 and the contents encrypting means 13. The video decoder 11 and the audio decoder 12 decode highly efficient coding and the like given to the AV data D, and output data to the display 4. The contents encrypting means 13 generates the contents key Kco, encrypts the AV data D by using the generated contents key Kco to generate encrypted AV data Kco (D). The generated contents key Kco is sent to the key encrypting means 15, and the key encrypting means 15 encrypts the contents key Kco by using the public key STB Pa inherent in the integrated STB 7 and stored in the STB information storing means 17 to generate the encrypted contents key STB Pa (Kco).

The generated encrypted AV data Kco (D) and the encrypted contents key STB Pa (Kco) are respectively sent to the MUX 54 and multiplexed in accordance with the format of the recording medium 6, and then recorded on the recording medium 6 by the recording means 55.

Figure 25:
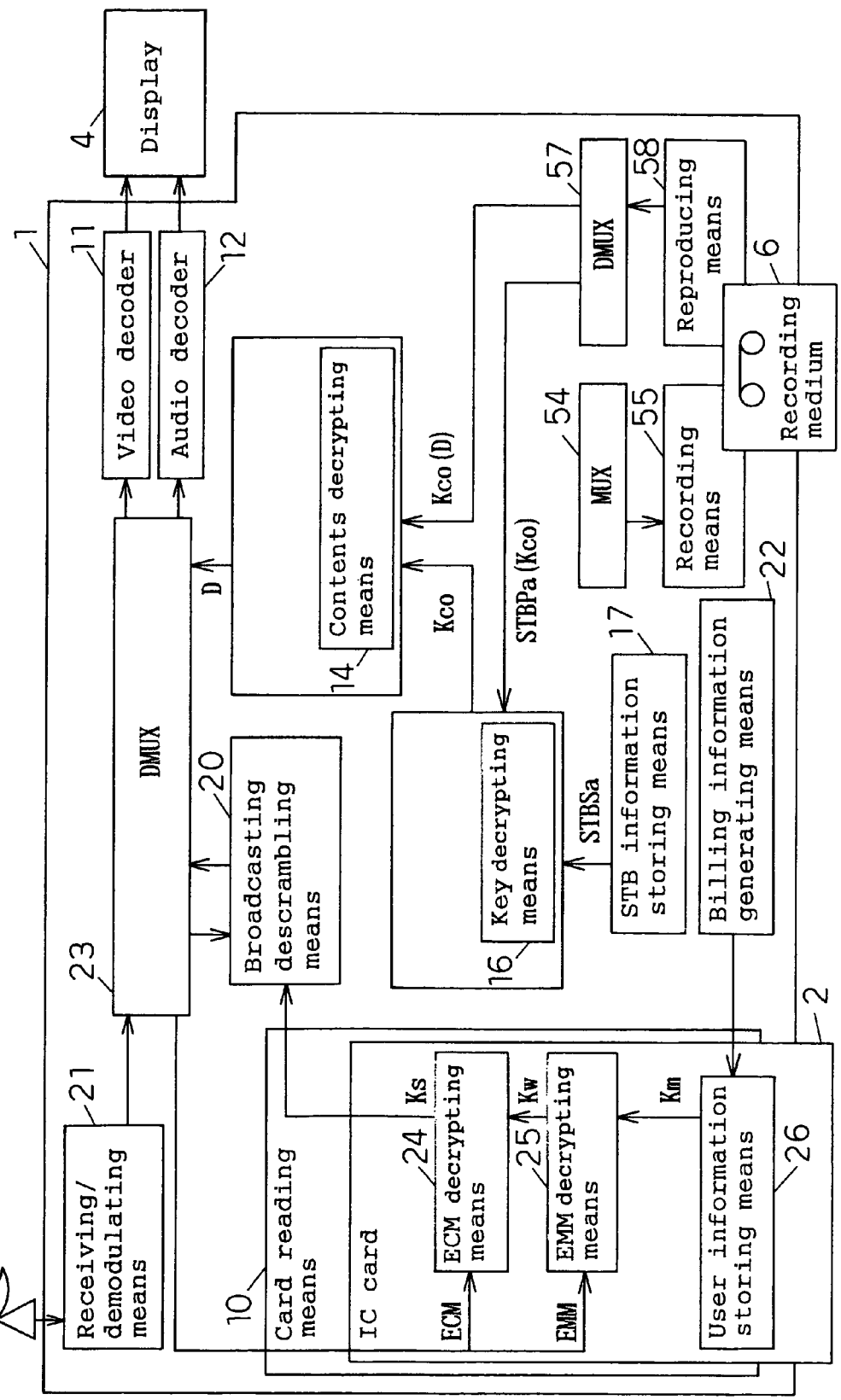
FIG. 25 is a flow chart showing the flow of data at the time when the data recording/reproducing system in accordance with the eighth embodiment of the present invention reproduces data.

Next, the flow of data at the time when AV data recorded on the recording medium 6 is reproduced will be described below referring to FIG. 25. FIG. 25 is a flow chart showing the flow of data at the time when the data recording/reproducing system in accordance with the eighth embodiment of the present invention reproduces data. In FIG. 25, means and the like not required for reproduction are omitted as appropriate from the configuration shown in FIG. 23. Although the reference encrypts in the figure are the same as those used in FIGS. 2 and 3, STB Sa corresponds to the public key STB Pa and represents a secret key inherent in the integrated STB 7 and used to decrypt the encrypted contents key STB Pa (Kco) to restore the contents key Kco.

The encrypted AV data Kco (D) and the encrypted contents key STB Pa (Kco), multiplexed and recorded on the recording medium 6, are reproduced by the reproducing means 58, and demultiplexed by the DMUX 57.

The demultiplexed AV data Kco (D) is sent to the contents decrypting means 14, and the demultiplexed encrypted contents key STB Pa (Kco) is sent to the key decrypting means 16. The key restoring means 16 decrypts the encrypted contents key STB Pa (Kco) to restore the contents key Kw by using the secret key STB Sa inherent in the integrated STB 7 and stored in the STB information storing means 17, and sends it to the contents decrypting means 14. The contents decrypting means 14 outputs the AV data D obtained by decrypting the encrypted AV data Kco (D) by using the restored contents key Kco to the video decoder 11 and the audio decoder 12. The video decoder 11 and the audio decoder 12 decode highly efficient coding and the like given to the AV data D, and output data to the display 4.

By recording/reproducing the AV data in accordance with the above-mentioned procedure, the burden to the data transmission between the apparatuses can be omitted; therefore, it is understood that the data recording/reproducing system in accordance with the present embodiment can reproduce only the specific object, that the data recording/reproducing system is a system wherein encrypting-related information is less likely to leak outside, and that the system can have higher recording efficiency in comparison with the data recording/reproducing system of the first embodiment.

In the present embodiment, it is explained that the public key and the secret key of the present invention are keys inherent in the integrated STB 7; however, without being limited to this, the keys may be keys inherent in the device model of the integrated STB 7, inherent in the user ID recorded on the IC card and inherent in the service recorded on the IC card of the present invention, just as in the case of one of the second to fourth embodiments.

Furthermore, in the first to eighth embodiments, it is explained that the contents key of the present invention is switched at regular or irregular intervals; if the same contents key is used, the encrypting-related information is more likely to leak outside than the case of the switching at regular or irregular intervals; however, it is still possible to say that the system is a system wherein the encrypting-related information is less likely to leak, in comparison with the conventional data recording/reproducing system.

Moreover, it is explained that, in the above-mentioned first to eighth embodiments, the second encrypting in accordance with the present invention is carried out by using the keys (the public key and the common key) different from the contents key used for the first encrypting in accordance with the present invention; however, without being limited to this, the second encrypting may be applied to the contents key itself by using the same algorithm as that corresponding to the contents key used for the first encrypting. In addition, the first encrypting may be carried out for digital data by using the common key as the contents key, and the second encrypting may be carried out by using the same common key as the above-mentioned common key, for example. Besides, the data recording/reproducing system of the present invention is mainly explained in the descriptions of the first to eighth embodiments, and the data recording/reproducing methods of the present invention correspond to the methods explained in the above-mentioned descriptions.

Ninth Embodiment

First, the configurations of a recording apparatus and a reproducing apparatus in accordance with a ninth embodiment of the present invention will be described.

Figure 26:
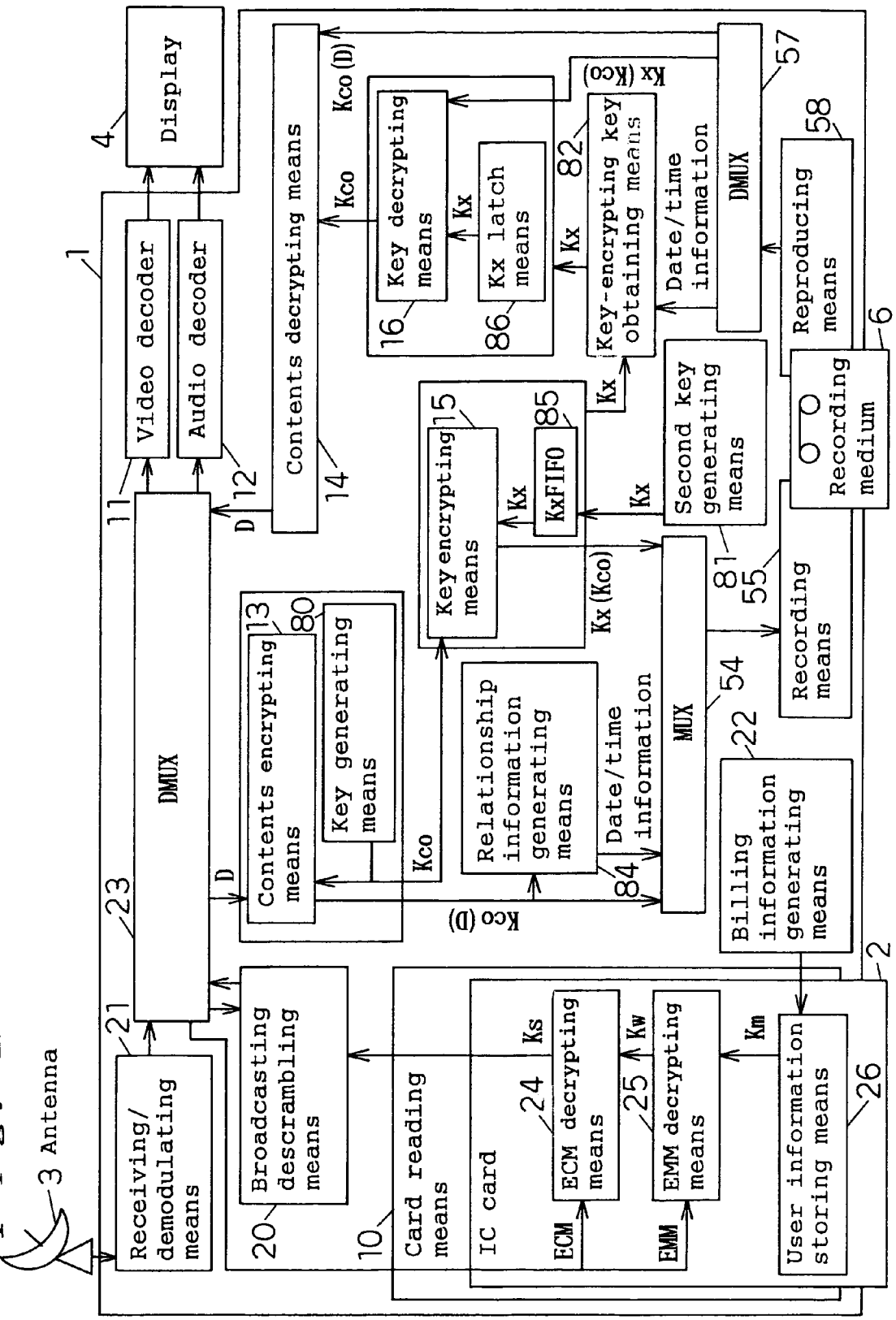
FIG. 26 is a block diagram showing a recording apparatus and a reproducing apparatus in accordance with a ninth embodiment of the present invention.

FIG. 26 is a block diagram showing the recording apparatus and the reproducing apparatus in accordance with the ninth embodiment of the present invention. The recording apparatus in accordance with the ninth embodiment of the present invention comprises a first key generating means 80, a contents encrypting means 13, a second key generating means 81, a KxFIFO 85, a key encrypting means 15, a relationship information generating means 84 and an MUX 54. Furthermore, the reproducing apparatus in accordance with the ninth embodiment of the present invention comprises a DMUX 57, a key-encrypting key obtaining means 82, a Kx latch means 86, a key decrypting means 71 and a contents decrypting means 14. Furthermore, in FIG. 26, a receiving/demodulating means 21, a DMUX 23, an EMM decrypting means 25, an ECM decrypting means 24, a broadcasting descrambling means 20, a video decoder 11 and an audio decoder 12 are also shown. Moreover, a recording medium 6 used as a recording medium and a display 4 for showing images and outputting sound are also shown.

The receiving/demodulating means 21 is a means wherein digital video data and audio data, EMM (individual information), ECM (program information) and encrypted broadcasting scrambling key Ks are input from a broadcasting station via a communications satellite, and all or parts of the signal waveforms of these are shaped.

The DMUX 23 is a means wherein the video data, audio data, EMM, ECM and encrypted broadcasting scrambling key Ks, which have been input from the receiving/demodulating means 21 and waveform-shaped are demultiplexed, and the descrambled video data and audio data having been input from the broadcasting descrambling means 20 are also demultiplexed. Furthermore, the DMUX 23 is also a means wherein the video data and audio data having been input from the contents decrypting means 14 is demultiplexed.

The EMM decrypting means 25 is a means wherein the user ID key Km is input, the EMM is input from the DMUX 23, and the EMM is decrypted by using the user ID key Km to generate the work key Kw.

The ECM decrypting means 24 is a means wherein the work key Kw is input from the EMM decrypting means 25, the ECM and the encrypted broadcasting scrambling key Ks are input from the DMUX 23, and the ECM is decrypted by using the work key Kw to restore the broadcasting scrambling key Ks.

The broadcasting descrambling means 20 is a means wherein the broadcasting scrambling key Ks is input from the ECM decrypting means 24, the scrambled AV data is input from the DMUX 23, and the scrambled AV data is descrambled by using the broadcasting scrambling key Ks.

The first key generating means 80 is a means wherein the contents key Kco for encrypting again the AV data descrambled by the broadcasting descrambling means 20 is generated.

The contents encrypting means 13 is a means wherein the AV data is input from the broadcasting descrambling means 20, the contents key Kco is input from the first key generating means 80, and the AV data D is encrypted by using the contents key Kco. In the following descriptions, the AV data D encrypted by using the contents key Kco is referred to as Kco (D).

The second key generating means 81 is a means wherein a key-encrypting key Kx for encrypting the contents key Kco generated by the first key generating means 80 is generated. It is supposed that the second key generating means 81 generates different key-encrypting keys Kx, on every day, and that these different keys Kx are referred to as Kx1, Kx2, Kx3, . . . , respectively. Furthermore, it is supposed that the key-encrypting keys Kx1, Kx2, Kx3, . . . are each discarded in a week.

The KxFIFO 85 is a means wherein the key-encrypting keys Kx1, Kx2, Kx3, . . . are input from the second key generating means 81 and stored, and also a means having a first-in first-out function, wherein a timer is provided, and the key-encrypting keys Kx, having passed one week after input, are discarded by using the timer.

The key encrypting means 15 is a means wherein the contents key Kco is input from the first key generating means 80, the key-encrypting key Kx is input from the KxFIFO 85, and the contents key Kco is encrypted by using the key-encrypting key Kx. In the following descriptions, the contents key Kco encrypted by using the key-encrypting key Kx is referred to as Kx (Kco).

The relationship information generating means 84 is a means wherein information regarding the date/time of the generation of the key-encrypting key Kx 4 is generated as information for establishing the relationship between the AV data Kco (D) encrypted by the contents key Kco and the key-encrypting key Kx used to encrypt the contents key Kco.

The MUX 54 is a means wherein the encrypted AV data Kco (D) is input from the contents encrypting means 13, Kx (Kco) is input from the key encrypting means 15, the date/time information is input from the relationship information generating means 84, and these are recorded on the recording medium 6.

The DMUX 57 is a means wherein the encrypted AV data Kco (D), Kx (Kco) and the date/time information, having been recorded on the recording medium 6, are input and demultiplexed.

The key-encrypting key obtaining means 82 is a means wherein the date/time information is input from the DMUX 57, the key-encrypting key Kx corresponding to the encrypted AV data Kco (D) to be reproduced is specified on the basis of the date/time information, and the specified key-encrypting key Kx is obtained from the KxFIFO 85.

The Kx latch means 86 is a means wherein the key-encrypting key Kx is input from the key-encrypting key obtaining means 82, latched and output to the key decrypting means 16.

The key decrypting means 71 is a means wherein Kx (Kco) is input from the DMUX 57, the key-encrypting key Kx is input from the Kx latch means 86, and Kx (Kco) is decrypted by using the key-encrypting key Kx to restore the contents key Kco.

The contents decrypting means 14 is a means wherein the encrypted AV data Kco (D) is input from the DMUX 57, the contents key Kco is input from the key decrypting means 16, and the AV data Kco (D) encrypted by using the contents key Kco is decrypted.

The video decoder 11 is a means wherein the video data from the DMUX 23 is decrypted.

The audio decoder 12 is a means wherein the audio data from the DMUX 23 is decrypted.

The contents encrypting means 13 is used as the contents encrypting means of claim 39 of the present invention, the second key generating means 81 is used as the key-encrypting key generating means thereof, the KxFIFO 85 is used as the storing means thereof, the key encrypting means 15 is used as the key encrypting means thereof, the relationship information generating means 84 is used as the relationship information generating means thereof, and the MUX 54 is used as the recording means thereof. Furthermore, in the present embodiment, the first key generating means 80 is used as the contents key generating means of claim 44 of the present invention. Moreover, the key-encrypting key obtaining means 82 is used as the key-encrypting key obtaining means of claim 45 of the present invention, the key decrypting means 16 is used as the key decrypting means thereof, and the contents decrypting means 14 is used as the contents decrypting means thereof.

Next, the operations of the recording apparatus in accordance with the ninth embodiment of the present invention will be described below.

First, the receiving/demodulating means 21 receives digital video data, audio data, EMM (individual information), ECM (program information) and encrypted broadcasting scrambling key Ks from a broadcasting station, shapes the disturbances in the signal waveforms of the video data and the audio data, and outputs the video data, audio data, EMM, ECM and encrypted broadcasting scrambling key Ks to the DMUX 23.

Then, the DMUX 23 receives the video data, audio data, EMM, ECM and broadcasting scrambling key Ks from the receiving/demodulating means 21, demultiplexes them, and outputs the video data and audio data (AV data) to the broadcasting descrambling means 20. Furthermore, the means outputs the EMM to the EMM decrypting means 25, and also outputs the ECM and the encrypted broadcasting scrambling key Ks to the ECM decrypting means 24.

Next, the EMM decrypting means 25 receives the user ID key Km, also receives the EMM from the DMUX 23, decrypts the EMM by using the user ID key Km to generate the work key Kw, and outputs it to the ECM decrypting means 24.

Furthermore, the ECM decrypting means 24 receives the work key Kw from the EMM decrypting means 25, also receives the ECM and the encrypted broadcasting scrambling key Ks from the DMUX 23, decrypts the ECM by using the work key Kw to restore the encrypting of the encrypted broadcasting scrambling key Ks, and outputs it to the broadcasting scrambling means 20.

And the broadcasting descrambling means 20 receives the broadcasting scramble key Ks from the ECM decrypting means 24 and also receives scrambled AV data from the DMUX 23, and then descrambles the scrambled AV data by using the broadcasting scrambling key Ks. Furthermore, the broadcasting descrambling means 20 outputs the descrambled AV data to the DMUX 23 or the contents encrypting means 13. The broadcasting descrambling means 20 outputs the AV data to DMUX 23 when the AV data is directly shown on the display 4 in real time, and outputs the AV data to the contents encrypting means 13 when the AV data is recorded on the recording medium 6. However, the AV data recorded on the recording medium 6 is not the AV data itself input from the broadcasting descrambling means 20, but data subjected to contents encrypting again.

First, the case when the broadcasting descrambling means 20 outputs the AV data to the DMUX 23 is explained.

In this case, the DMUX 23 receives the AV data from the broadcasting descrambling means 20, demultiplexes it to the video data and the audio data, outputs the video data to the video decoder 11, and outputs the audio data to the audio decoder 12. Then, the video decoder 11 and the audio decoder 12 decode the video data and the audio data input from the DMUX 23, respectively, and outputs data to the display 4. And the display 4 shows images and outputs sound.

Next, the case when the broadcasting descrambling means 20 outputs the AV data to the contents encrypting means 13 is explained. In other words, this is the case when the AV data is recorded on the recording medium 6 as described above.

First, the contents encrypting means 13 receives the descrambled AV data D from the broadcasting descrambling means 20.

The first key generating means 80 generates the contents key Kco for encrypting the AV data D input from the contents encrypting means 13, and outputs it to the contents encrypting means 13 and the key encrypting means 15.

Next, the contents encrypting means 13 receives the contents key Kco from the first key generating means 80, and encrypts the AV data D by using the contents key Kco. In other words, the Kco (D) is generated. Then, the Kco (D) is output to the relationship information generating means 84 and the MUX 54.

On the other hand, the second key generating means 81 generates the key-encrypting key Kx for encrypting the contents key Kco generated by the first key generating means 80. It is supposed that the key-encrypting key Kx generated by the second key generating means 81 differs day by day. For convenience in explanation, it is hereafter supposed that the starting date of the operation of the recording apparatus is Jan. 1, 1998, and the current date when recording is carried out is Jan. 4, 1998, three days after the starting date, and that as shown in the key-encrypting key Kx list of FIG. 27(*a*), the key-encrypting key Kx generated on January 1 is Kx1, the key-encrypting key Kx generated on January 2 is Kx2, . . . , and the key-encrypting key Kx generated on January 4 is Kx4. Furthermore, it is supposed that the key-encrypting key Kx is generated hereinafter in the same way. Besides, the operations of the recording apparatus on January 4 will be described hereinafter, unless otherwise specified.

As shown in the list of FIG. 27 (*a*), from the second key generating means 81, the KxFIFO 85 has already received and stored the key-encrypting keys Kx, one on every day, starting from January 1, the KxFIFO 85 thus has stored the key-encrypting keys, Kx1, Kx2 and Kx3 until January 3, and the KxFIFO 85 then receives and stores Kx4 on the current date, January 4. The storage is carried out so that the newest key-encrypting key Kx is placed at the top of the list of FIG. 27 (*a*) at all times, and older ones are ranked lower in sequence. The KxFIFO 85 discards the stored key-encrypting keys Kx1, Kx2, . . . , one week after the storage of each key. For example, as shown in the list of FIG. 27 (*b*), the key-encrypting keys Kx1 and Kx2 are discarded on January 9, and the KxFIFO 85 stores seven key-encrypting keys in the order of Kx9, Kx8, ..., Kx4 and Kx3. In other words, the number of the key-encrypting keys Kx stored in the KxFIFO 85 remains seven.

Next, the key encrypting means 15 receives the contents key Kco from the first key generating means 80, also receives the key-encrypting key Kx4 generated on January 4, the date of recording, from the second key generating means 81 via the KxFIFO 85, and encrypts the contents key Kco by using the key-encrypting key Kx4. In other words, Kx4 (Kco) is generated.

And the relationship information generating means 84 receives the encrypted AV data Kco (D) from the contents encrypting means 13 and the Kx4 (Kco) from the key encrypting means 15, and generates information indicating a date/time when the key-encrypting key Kx4 is generated as information for establishing the relationship between the key-encrypting key Kx4 and the AV data Kco (D) encrypted by using the contents key Kco encrypted by using the key-encrypting key Kx4. In other words, date/time information, January 4, is generated.

Hereafter, the MUX 54 receives the encrypted AV data Kco (D) from the contents encrypting means 13, the Kx4 (Kco) from the key encrypting means 15 and the date/time information, i.e., January 4, from the relationship information generating means 84, and then records them as one group.

In this way, Kxn (Kco) corresponding to the key-encrypting key Kxn (n=1, 2, ...) generated on every day, i.e., on each day, the encrypted AV data Kco (D) and the date/time information regarding the day are recorded as one group on the recording medium 6.

Next the operations of the reproducing apparatus in accordance with the ninth embodiment of the present invention will be described below.

In other words, the case of reproducing the encrypted AV data Kco (D) recorded on the recording medium 6 by the recording apparatus will be described.

For convenience in the following explanation, it is supposed that the date when the reproducing apparatus reproduces the encrypted AV data Kco (D) on the recording medium 6 is January 9. Furthermore, it is supposed that the reproducing apparatus reproduces the encrypted AV data Kco (D) recorded on the recording medium 6 on January 1 and the encrypted AV data Kco (D) recorded on the recording medium 6 on January 3.

At the start, the case when the reproducing apparatus reproduces the encrypted AV data Kco (D) recorded on the recording medium 6 on January 1 will be described.

First, from the recording medium 6, the DMUX 57 receives the encrypted AV data Kco (D), Kx1 (Kco) and the date/time information of January 1, recorded on January 1, and demultiplexes them, and then outputs the date/time information of January 1 to the key-encrypting key obtaining means 82.

Then, the key-encrypting key obtaining means 82 receives the date/time information of January 1, and specifies the key-encrypting key Kx1 on the basis of the date/time information, and retrieves the key-encrypting key Kx1 from the list of FIG. 27 (*b*) stored in the KxFIFO 85. However, since more than one week has passed since the generation of the key-encrypting key Kx1, it is discarded by the KxFIFO 85, and not present in the list of FIG. 27 (*b*). Therefore, the key-encrypting key obtaining means 82 cannot obtain the key-encrypting key Kx1. As a result, the contents decrypting means 14 cannot decrypt the encrypted AV data Kco (D) recorded on January 1, which is required to be decrypted by indirectly using the key-encrypting key Kx1; even if the AV data is output to the display 4, it cannot be decrypted, whereby the display 4 cannot output the images and sound of the original AV data.

Next, the case when the reproducing apparatus reproduces the encrypted AV data Kco (D) recorded on the recording medium 6 on January 3 will be described.

First, from the recording medium 6, the DMUX 57 receives the encrypted AV data Kco (D) recorded on January 3, Kx3 (Kco) and the date/time information of January 3, and demultiplexes them, and then outputs the date/time information of January 3 to the key-encrypting key obtaining means 14.

Next, the key-encrypting key obtaining means 14 receives the date/time information of January 3, and specifies the key-encrypting key Kx3 on the basis of the date/time information, and retrieves the key-encrypting key Kx3 from the list of FIG. 27 (*b*) stored in the KxFIFO 85, obtains the key-encrypting key Kx3, and outputs it to the Kx latch means 86.

Then, the Kx latch means 86 receives the key-encrypting key Kx3 and outputs it to the key decrypting means 16. Furthermore, the DMUX 57 outputs Kx3 (Kco) to the key decrypting means 16.

And the key decrypting means 16 receives Kx3 (Kco) from the DMUX 57 and the key-encrypting key Kx3 from the Kx latch means 86, decrypts Kx3 (Kco) by using the key-encrypting key Kx3 to restore the contents key Kco, and outputs the contents key Kco to the contents decrypting means 14. Furthermore, the DMUX 57 outputs the encrypted AV data Kco (D) to the key decrypting means 16.

Next, the contents decrypting means 14 receives the encrypted AV data Kco (D) from the DMUX 57 and the contents key Kco from the key decrypting means 16, decrypts the encrypted AV data Kco (D) by using the contents key Kco, and outputs the decrypted AV data to the DMUX 23.

Then, the DMUX 23 receives the AV data D from the contents decrypting means 14, demultiplexes it to video data and audio data, outputs the video data to the video decoder 11, and outputs the audio data to the audio decoder 12. Hereinafter, the video decoder 11 and the audio decoder 12 decode the video data and the audio data from the DMUX 23, respectively, and output data to the display 4. The display 4 then shows images and outputs sound.

In this way, each of the encrypted AV data Kco (D) recorded on the recording medium 6 cannot be reproduced as original images and sound eventually, if the recording has not been carried out within one week.

Figure 28:
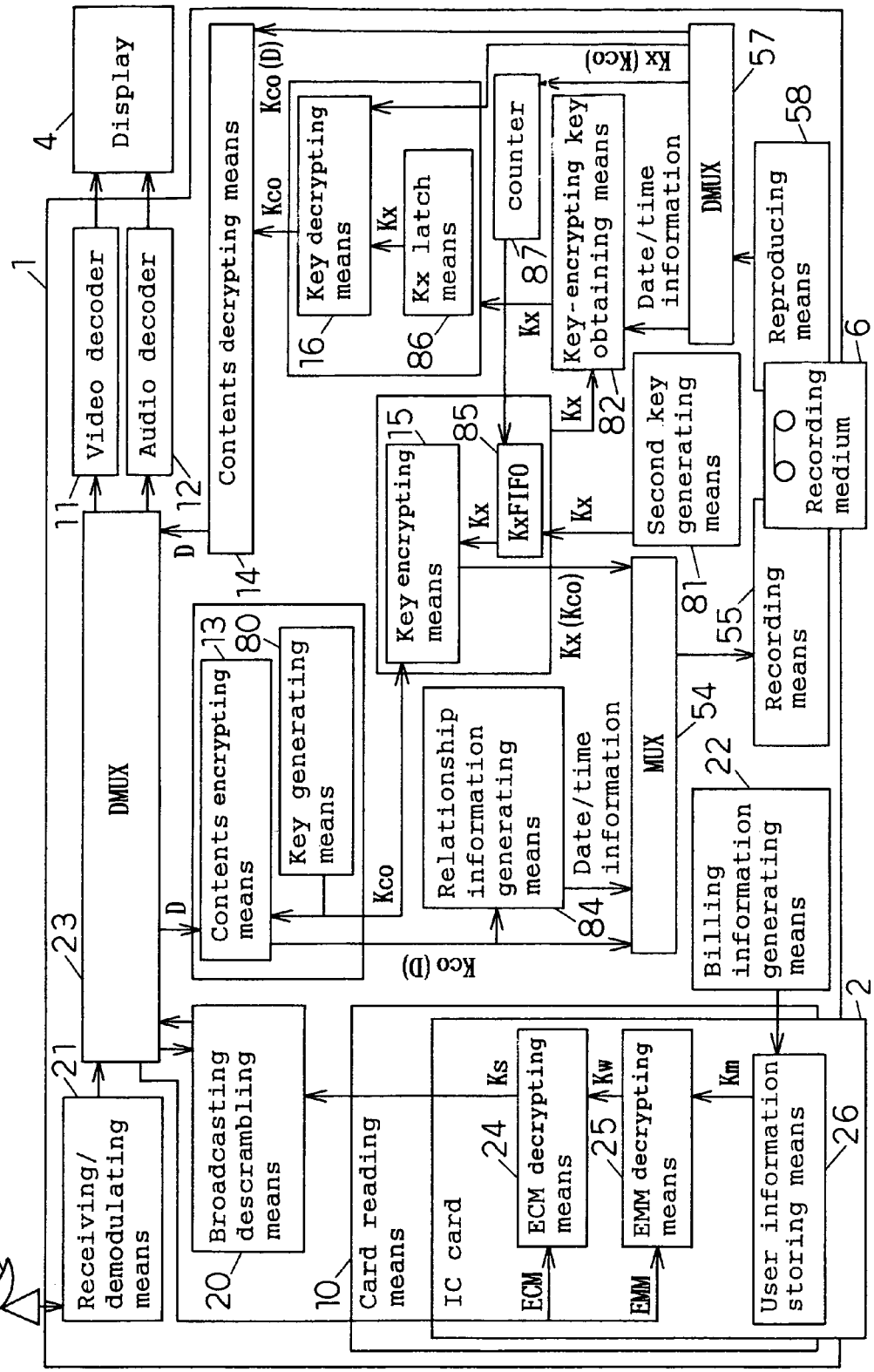
FIG. 28 is a block diagram showing a recording apparatus and a reproducing apparatus in accordance with the present invention, different from FIG. 26.

In the above-mentioned ninth embodiment, each of the encrypted AV data Kco (D) recorded on the recording medium 6 can be reproduced, if the recording has been carried out within one week; however, instead of limiting the period to one week or less, the number of reproductions for each of the encrypted AV data Kco (D) may be limited to once or three times, for example, so that reproduction cannot be carried out if the number of reproductions is not within the limited number of reproductions. In other words, as shown in FIG. 28, in the case when the reproducing apparatus of the present invention is provided with a counter 87, when the counter 87 checks the number of reproductions of each of the encrypted AV data Kco (D), and when the number of reproductions reaches the limited reproduction number, once or three times, for example, the KxFIFO 85 may discard the key-encrypting key Kx corresponding to the encrypted AV data Kco (D). Furthermore, the above-mentioned limitation on period, such as one week or less, may be used together with the limitation on the number of reproductions.

In addition, in the above-mentioned ninth embodiment, the KxFIFO 85 discards the stored key-encrypting keys Kx after a lapse of one week. However, it may be possible that the KxFIFO 85 does not discard but keeps storing the stored key-encrypting keys Kx even after one week, that the key-encrypting key obtaining means 82 judges whether the date on which the encrypted AV data Kco (D) is to be reproduced is within one week from the generation of the key-encrypting key Kx, or whether the number of reproductions is within the limitation, and that, if the date is within one week or if the number of reproductions is within the limitation, the key-encrypting key Kx corresponding to the encrypted AV data Kco (D) to be reproduced can be obtained from the KxFIFO 85. Accordingly, in this case, the contents encrypting means 13 corresponds to the contents encrypting means of claim 46 of the present invention, the second key generating means 81 corresponds to the key-encrypting key generating means thereof, the KxFIFO 85 corresponds to the storing means thereof, the key encrypting means 15 corresponds to the key encrypting means thereof, the relationship information generating means 84 corresponds to the relationship information generating means thereof, and the MUX 54 corresponds to the recording means thereof, respectively. Furthermore, the key-encrypting key obtaining means 82 corresponds to the key-encrypting key obtaining means of claim 50 of the present invention, the key decrypting means 16 corresponds to the key decrypting means thereof, and the contents decrypting means 14 corresponds to the contents decrypting means thereof, respectively.

Figure 29:
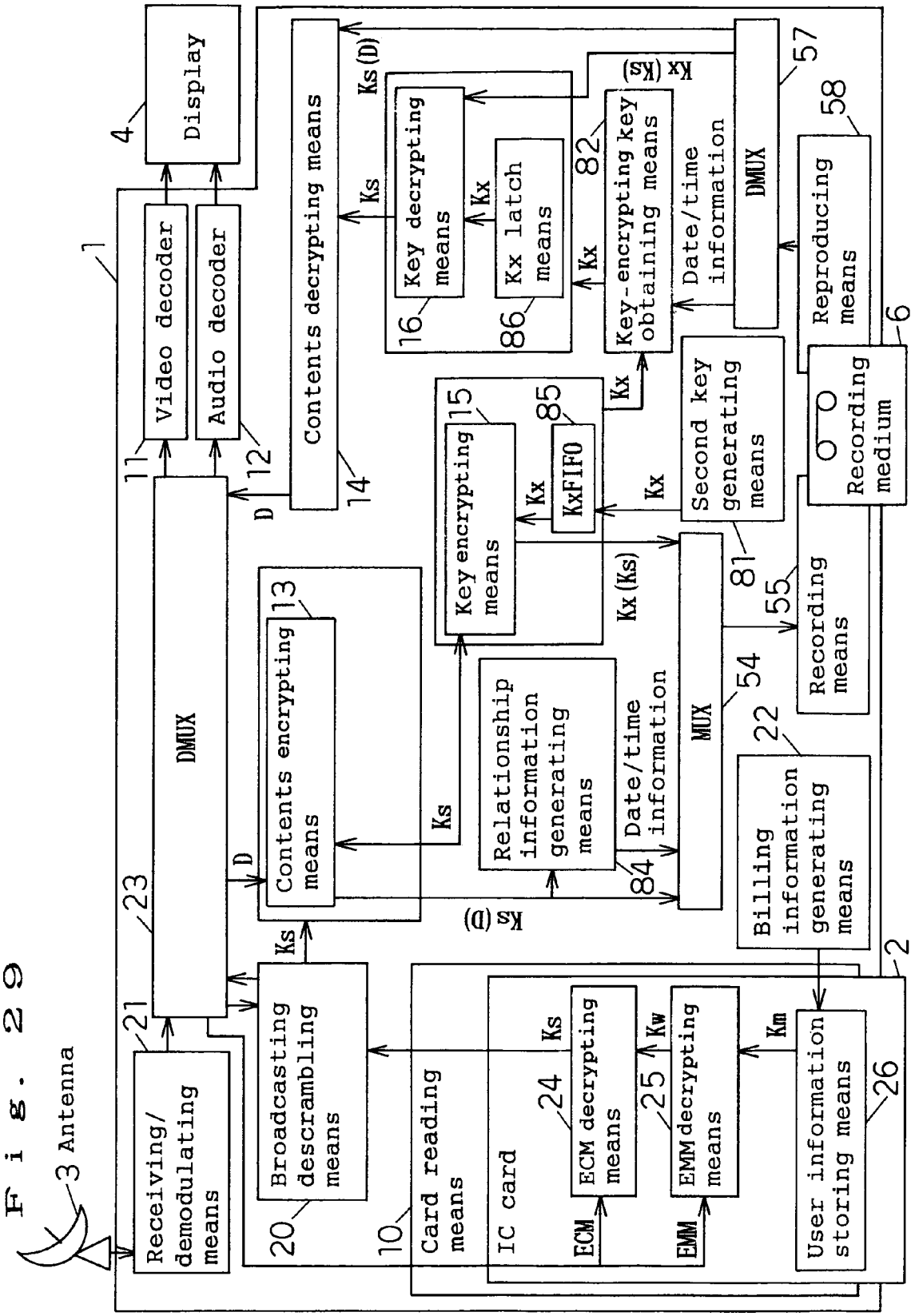
FIG. 29 is a block diagram showing a recording apparatus and a reproducing apparatus in accordance with the present invention, different from FIG. 26 or 28.

Furthermore, in the above-mentioned ninth embodiment, the first key generating means 80 generates the contents key Kco for encrypting the AV data D input by the contents encrypting means 13. However, it may be possible that the recording apparatus of the present invention is not provided with the first key generating means 80 as shown in FIG. 29, that the contents encrypting means 13 receives the broadcasting scrambling key Ks sent from a broadcasting station via the broadcasting descrambling means 20, and that the AV data D is encrypted by using the broadcasting scrambling key Ks or a key obtained by processing the broadcasting scrambling key Ks. In this case, the key encrypting means 15 receives the broadcasting scrambling key Ks or the key obtained by processing the broadcasting scrambling key Ks from the contents encrypting means 13, and decrypts it by using the key-encrypting key Kx.

Figure 30:
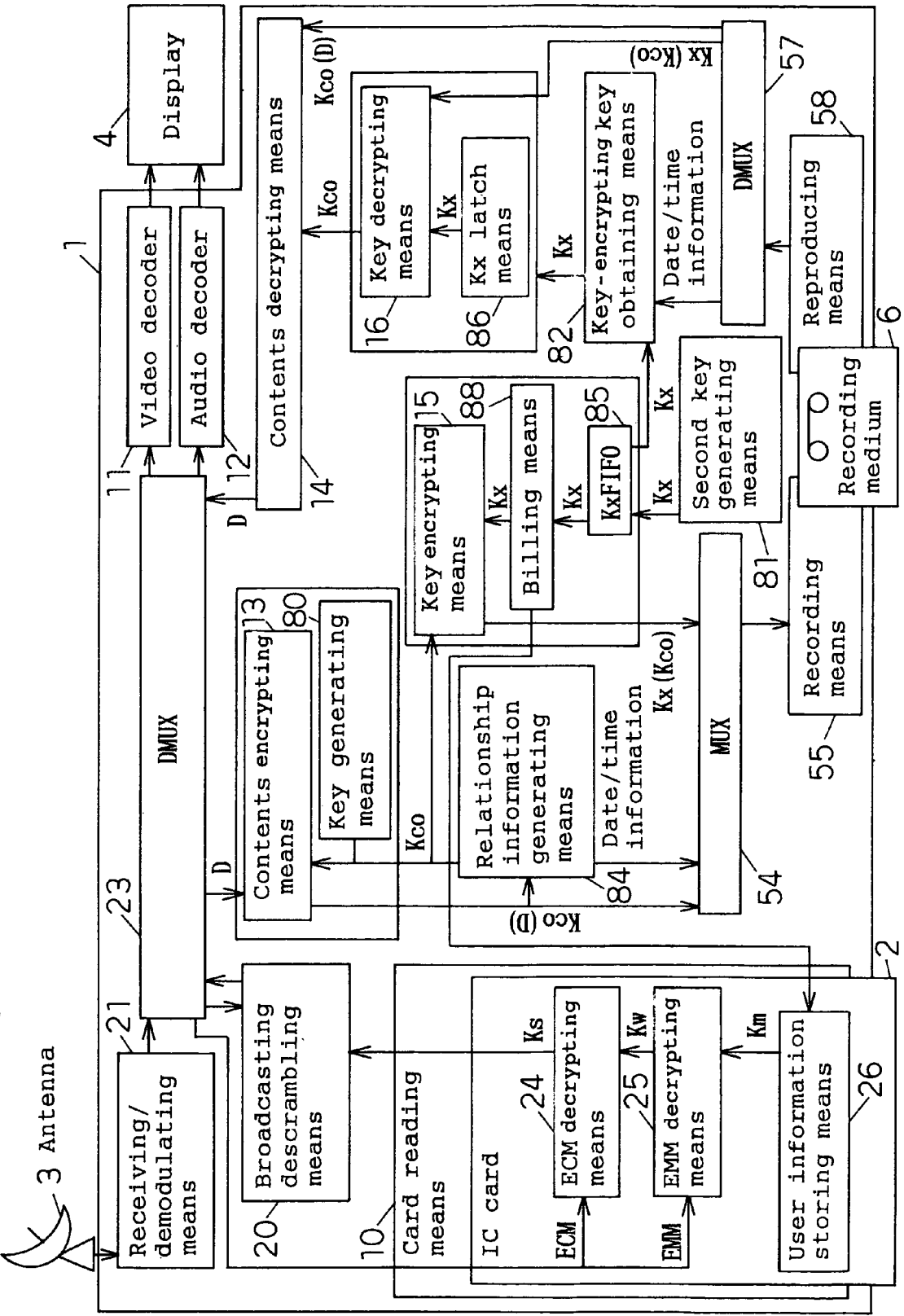
FIG. 30 is a block diagram showing a recording apparatus and a reproducing apparatus in accordance with the present invention, different from FIG. 26, 28 or 29.

Furthermore, in the above-mentioned ninth embodiment, the AV data D is encrypted by using the contents key Kco from the first key generating means 80. However, it may be possible that the recording apparatus of the present invention is not provided with the first key generating means 80 or the key encrypting means 15 as shown in FIG. 30, that the contents encrypting means 13 receives the key-encrypting key Kx from the second key generating means 81 via the KxFIFO 85, that the key-encrypting key Kx is used as the contents key Kx, and that the AV data D is encrypted by using the contents key Kx. In this case, the AV data D encrypted by using the contents key Kx, i.e., Kx (AV data) and the contents key Kx, are recorded on the recording medium 6. Moreover, in this case, the reproducing apparatus of the present invention is not provided with the key restoring means 16 as shown in FIG. 30. Accordingly, in the case of reproducing Kx (AV data), the contents-key obtaining means 83 specifies the contents key Kx corresponding thereto, and obtains it from the KxFIFO 85. Then, the contents decrypting means 14 receives Kx (AV data) from the recording medium 6 via the DMUX 57, also receives the contents key Kx from the key-encrypting key obtaining means 82 via the Kx latch means 86, and decrypts the Kx (AV data) by using the contents key Kx. For this reason, in this case, that is, the second key generating means 81 corresponds to the contents-key generating means of claims 53 and 20 of the present invention, the KxFIFO 85 corresponds to the storing means thereof, the contents encrypting means 13 corresponds to the contents encrypting means thereof, the relationship information generating means 84 corresponds to the relationship information generating means thereof, and the DMUX 23 corresponds to the recording means thereof. In addition, the contents-key obtaining means 83 corresponds to the contents-key obtaining means in claims 57 and 22 of the present invention, and the contents decrypting means 14 corresponds to the contents decrypting means thereof, respectively.

Figure 31:
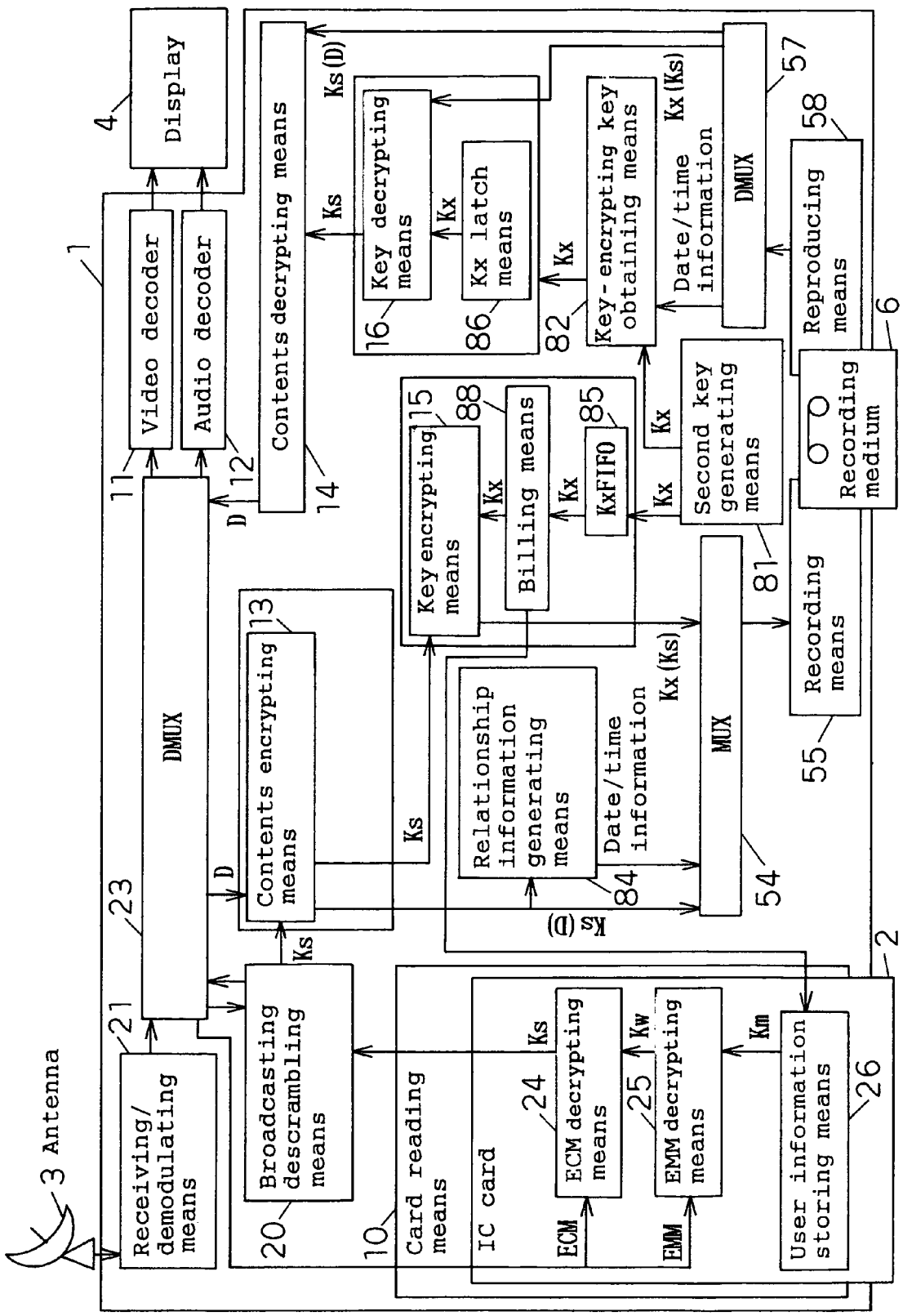
FIG. 31 is a block diagram showing a recording apparatus and a reproducing apparatus in accordance with the present invention, different from FIG. 26, 28, 29 or 30.

Furthermore, as shown in FIG. 31, it may be possible that the recording apparatus of the above-mentioned ninth embodiment is provided with a billing means 88, that in the case when the encrypted AV data Kco (D) is recorded on the recording medium 6, and when a predetermined amount of billing for the recording has been charged to the user, that is, only when a predetermined fee has been paid in advance by the user to a broadcasting station or the like, or only when the predetermined fee has been paid at least at the time of recording, the encrypted AV data Kco (D) can be recorded on the recording medium 6. Moreover, the billing means 88 may not be disposed at the position shown in FIG. 31, but may be disposed between the key encrypting means 15 and the MUX 54. Briefly speaking, when the encrypted AV data Kco (D) is recorded on the recording medium 6, the billing means 88 should only charge the predetermined amount of billing for the recording, and may be disposed at any place.

Furthermore, in the above-mentioned ninth embodiment, each key-encrypting key Kx is discarded after a lapse of one week; however, the date/time to be discarded is not limited to one week after generation, but may be one day or three days or 12 hours after generation. In short, each key-encrypting key Kx should only be discarded after a lapse of a predetermined period after generation.

Furthermore, in the above-mentioned ninth embodiment, the second key generating means 81 generates different key-encrypting keys Kx, one on everyday; however, the second key generating means 81 may generate different key-encrypting keys Kx, one in every several hours on the same day. Moreover, the key-encrypting key Kx may be generated each time the encrypted AV data Kco (D) of a predetermined program is recorded on the recording medium 6. In other words, the key-encrypting key Kx may be generated each time when recording is started and finished. In short, the second key generating means 81 should only generate the key-encrypting key Kx for encrypting the contents key Kco of the encrypted AV data Kco to be recorded.

Furthermore, in the above-mentioned ninth embodiment, the information of the date/time when the key-encrypting key Kx is generated is used as the relationship information of the present invention; however, the relationship information of the present invention may be a date/time when the contents encrypting means 13 received the AV data D, a date/time when the contents encrypting means 13 encrypted the contents of the AV data D by using the contents key Kco, a date/time when the second key generating means 81 generated the key-encrypting key Kx, a date/time when the KxFIFO 85 stored the key-encrypting key Kx, a date/time when the key encrypting means 15 encrypted the contents key Kco by using the key-encrypting key Kx, or a date/time when the MUX 54 recorded the encrypted AV data Kco (D) on the recording medium 6. Alternatively, the information may be information regarding the date/time when the above-mentioned key-encrypting key Kx was generated or the date/time when the contents encrypting means 13 received the AV data D and a date/time when the AV data is to be reproduced. In this case, the key-encrypting key Kx is obtained, based on the fact that the ordinal ranks of the key-encrypting keys Kx in the key-encrypting key Kx list of FIG. 27 are lowered every day, and by considering the difference between the two date/time values. Alternatively, the relationship information of the present invention may be the number information or the like of the key-encrypting key Kx list of FIG. 27 on the basis of the date/time when the above-mentioned key-encrypting key Kx was generated, the date/time when the contents encrypting means 13 received the AV data D and the date/time when the AV data is to be reproduced, and by considering the ordinal ranks of the key-encrypting keys Kx in the key-encrypting key Kx list of FIG. 27 are lowered every day.

Furthermore, in the above-mentioned ninth embodiment, the recording medium 6 is used as a recording medium; however, the recording medium is not limited to the recording medium 6, but may be a hard disk.

Furthermore, in the above-mentioned ninth embodiment, the first key generating means 80 generates the contents key Kco for encrypting the AV data D; however, the contents key Kco may be renewed at short intervals, for example, several tens of seconds, so that it cannot be decrypted easily.

Furthermore, before a key-encrypting key Kx is discarded or becomes unusable because a predetermined period, for example, one week, has passed after the generation of the key-encrypting key Kx, if the encrypted AV data Kco (D) corresponding to the key-encrypting key Kx has not been reproduced even once, the above-mentioned recording apparatus or the reproducing apparatus may be provided with a means for notifying the fact to the user.

INDUSTRIAL USABILITY

As disclosed by the above descriptions, by encrypting data, the present invention in accordance with claim 1 can provide a data recording/reproducing method wherein only the specific object can be reproduced and the above-mentioned encrypting-related information is less likely to leak outside. Furthermore, by encrypting data, the present invention in accordance with claim 4 can provide a data recording/reproducing system wherein only the specific object can be reproduced and the above-mentioned encrypting-related information is less likely to leak outside. Moreover, the present invention in accordance with claim 22 or 23 can provide a data recording/reproducing method and a data recording/reproducing system capable of securely carrying out billing at the time of recording and/or reproduction. In addition, the present invention in accordance with claim 30 can provide a data recording/reproducing system having less loss time at the time of reproduction.

Moreover, the present invention can provide a recording apparatus and a reproducing apparatus capable of recording AV data on a recording medium and observing limitations on an effective reproduction period or an effective number of reproductions for the AV data.

Besides, the program medium of the present invention may be a program medium, such as a CD-ROM, for storing programs for attaining all or parts of the components of the above-mentioned invention by using a computer.

What is claimed is:

1. A data recording/reproducing system comprising:
    contents encrypting means for receiving digital data and for using a contents key to generate encrypted digital data;
    a key-encrypting key generating means for generating a plurality of key-encrypting keys for a predetermined period, each of said plurality of key-encrypting keys is different from each other, for subjecting said content key to second encrypting;
    a storing means for storing said generated plurality of key-encrypting keys and for making invalid each of said key-encrypting keys in sequence, while leaving the encrypted digital data hereafter if each of said key-encrypting keys satisfies a corresponding predetermined condition respectively;
    key encrypting means for generating an encrypted contents key by subjecting said contents key to said second encrypting by using one of the plurality of key-encrypting keys;
    recording means for recording said encrypted digital data and said encrypted contents key on a recording medium;
    reproducing means for reproducing said encrypted digital data and said encrypted contents key from said recording medium;
    key decrypting means for decrypting said encrypted contents key to restore said contents key; and
    contents decrypting means for decrypting said encrypted digital data by using said contents key to obtain said digital data,
    wherein said encrypted contents key is recorded in a data area on said recording medium, from which data is not output outside, and
    said encrypted contents key is deleted, while leaving the encrypted digital data, if the encrypted contents key satisfies a predetermined condition.

2. A data recording/reproducing system in accordance with claim 1, wherein all of said means are provided for an integrated apparatus.

3. A data recording/reproducing system in accordance with claim 1, wherein said receiving means, said contents encrypting means and said contents decrypting means are provided for a tuner apparatus, and said recording means and said reproducing means are provided for a recording apparatus.

4. A data recording/reproducing system in accordance with claim 3, wherein said second encrypting is carried out by using a public key, and said encrypted contents key is decrypted by using a secret key corresponding to said public key.

5. A data recording/reproducing system in accordance with claim 4, wherein said key decrypting means is provided for said tuner apparatus.

6. A data recording/reproducing system in accordance with claim 5, wherein said public key and said secret key are keys inherent in said tuner apparatus.

7. A data recording/reproducing system in accordance with claim 5, wherein said public key and said secret key are keys inherent in the device model of said tuner apparatus.

8. A data recording/reproducing system in accordance with claim 5, wherein said tuner apparatus has a card reading means capable of reading information recorded on an IC card.

9. A data recording/reproducing system in accordance with claim 8, wherein said public key and said secret key are keys inherent in the user ID recorded on said IC card.

10. A data recording/reproducing system in accordance with claim 9, wherein in addition to said key inherent in said user ID, a public key inherent in at least another user ID is recorded on said IC card, said key encrypting means encrypts said contents key by using said public key inherent in said other user ID, in addition to said second encrypting, thereby to generate another encrypted contents key for each public key inherent in said other user ID, and said recording means records said other encrypted contents key, in addition to said encrypted contents key.

11. A data recording/reproducing system in accordance with claim 8, wherein said public key and said secret key are keys inherent in the service recorded on said IC card.

12. A data recording/reproducing system in accordance with claim 5, wherein said key encrypting means is provided for said tuner apparatus or said recording apparatus.

13. A data recording/reproducing system in accordance with claim 12, wherein, in the case when said key encrypting means is provided for said recording apparatus, said tuner apparatus has a second key encrypting means for encrypting said contents key by using a common key, and said recording apparatus has a second key decrypting means for decrypting said contents key encrypted by using said common key.

14. A data recording/reproducing system in accordance with claim 4, wherein said public key and said secret key are keys inherent in said recording apparatus, and said key encrypting means and said key decrypting means are provided for said recording apparatus.

15. A data recording/reproducing system in accordance with claim 14, wherein said tuner apparatus has a second key encrypting means for encrypting said contents key by using a common key and a second key decrypting means for decrypting said contents key encrypted by using said common key, said VTR apparatus has a third key encrypting means for encrypting said contents key by using said common key and a third key decrypting means for decrypting said contents key encrypted by using said common key, said third key decrypting means decrypts said contents key encrypted by said second key encrypting means, and said second key decrypting means decrypts said contents key encrypted by said third second key encrypting means.

16. A data recording/reproducing system in accordance with claim 3, wherein said second encrypting and said decrypting of said encrypted contents key are executed by using a common key, and said key encrypting means and said key decrypting means are provided for said tuner apparatus.

17. A data recording/reproducing system in accordance with claim 16, wherein said common key is inherent in said tuner apparatus or the device model of said tuner apparatus.

18. A data recording/reproducing system in accordance with claim 16, wherein said tuner apparatus has a card reading means capable of reading information recorded on an IC card, and said common key is inherent in the user ID recorded on said IC card or the service recorded on said IC card.

19. A data recording/reproducing system in accordance with claim 3, wherein said tuner apparatus generates and stores billing information at the time of recording by said recording medium.

20. A data recording/reproducing system in accordance with claim 19, wherein said tuner apparatus stores said billing information on an IC card.

21. A data recording/reproducing system in accordance with claim 19, wherein said tuner apparatus outputs said billing information to a service provider via communications.

22. A data recording/reproducing system in accordance with claim 3, wherein said tuner apparatus generates and stores billing information at the time of reproduction by said recording medium.

23. A data recording/reproducing system in accordance with claim 22, wherein information required to generate said billing information is recorded on said recording medium at the time of recording by said recording means, and said billing information is generated by using said required information at the time of reproduction by said recording means.

24. A data recording/reproducing system in accordance with claim 22 or 23, wherein the billing information is provided with limitation of the reproduction period of said recording medium.

25. A data recording/reproducing system in accordance with claim 22, wherein the billing information is provided with limitation of the number of reproductions of said recording medium.

26. A data recording/reproducing system in accordance with claim 1, wherein information regarding the inherence of said key subjected to said second encrypting is stored on said recording medium.

27. A data recording/reproducing system in accordance with claim 1, wherein said contents key is switched at regular or irregular intervals.

28. A data recording/reproducing system in accordance with claim 27, wherein said recording medium is reproduced so that said encrypted contents key corresponding to said contents key after switching overlaps at least a part of said encrypted digital data corresponding to said contents key before switching with respect to timing.

29. A data recording/reproducing system in accordance with claim 27 or 28, wherein said recording medium is reproduced so that said encrypted contents key corresponding to one of said contents keys overlaps said encrypted digital data corresponding thereto with respect to timing.

30. A data recording/reproducing system in accordance with claim 27, wherein, in the case when said tuner apparatus is provided, said tuner apparatus carries out said switching.

31. A data recording/reproducing system in accordance with claim 27, wherein, in the case when said recording apparatus is provided, said recording apparatus determines the reproduction timing of said encrypted contents key in response to said switching.

32. A data recording/reproducing system in accordance with claim 27, wherein said encrypted digital data and said encrypted contents key are recorded at the recording position corresponding to said reproduction timing on said recording medium.

33. A data recording/reproducing system in accordance with claim 32, wherein said switching timing is also recorded on said recording medium.

34. A data recording/reproducing system in accordance with claim 27, wherein, in the case when said tuner apparatus and said recording apparatus are provided, said recording apparatus outputs said contents key for use after switching or said encrypted contents key corresponding thereto to said tuner apparatus, before outputting said encrypted digital data corresponding to said contents key for use after switching.

35. A data recording/reproducing system according to claim 1, further including billing generator means for generating further billing of said digital data responsive to decryption of encrypted digital data using said changed contents key to obtain said digital data.

36. A recording apparatus comprising:
- a contents encrypting means for receiving digital data and a contents key for encrypting said digital data and for subjecting said digital data to first encrypting by using said contents key to generate encrypted digital data,
- a key-encrypting key generating means for generating a plurality of key-encrypting keys for a predetermined period, each of said plurality of key-encrypting keys is different from each other, for subjecting said contents key to second encrypting,
- a storing means for storing said generated plurality of key-encrypting keys and for deleting or making invalid each of said key-encrypting keys in sequence, while leaving the encrypted digital data hereafter if each of said key-encrypting keys satisfies a corresponding predetermined condition respectively,
- a key encrypting means for generating an encrypted contents key by subjecting said contents key to said second encrypting by using one of the plurality of key-encrypting keys,
- a relationship information generating means for generating the relationship information between said encrypted digital data encrypted by using said contents key and the one of the plurality of key-encrypting keys obtained by encrypting said contents key, and
- a recording means for receiving said encrypted digital data, said encrypted contents key and all or part of said relationship information and for recording them on a predetermined recording medium, wherein
- said encrypted contents key is allowed to be decrypted when said one of the plurality of key-encrypting keys is among the currently stored plurality of key-encrypting keys.

37. A recording apparatus in accordance with claim 36, wherein said corresponding predetermined condition is that more than a predetermined time has passed after said one of the plurality of key-encrypting keys was stored.

38. A recording apparatus in accordance with claim 36 or 37, wherein said relationship information is information related by a date/time when said contents encrypting means receives said digital data, a date/time when said contents encrypting means encrypts said digital data by using said contents key, a date/time when said key-encrypting key generating means generates said key-encrypting key, a date/time when said storing means stores said key-encrypting key, a date/time when said key encrypting means encrypts said contents key by using the one of the plurality of key-encrypting keys, or a date/time when said recording means records said encrypted digital data on said predetermined recording medium.

39. A recording apparatus in accordance with claim 36, wherein said corresponding predetermined condition is that the number of times one of the plurality of key-encrypting keys is used at the time of reproducing said encrypted digital data exceeds a predetermined number of times.

40. A recording apparatus in accordance with claim 36, wherein a contents key generating means for generating said contents key is provided, and said contents encrypting means receives said contents key from said contents key generating means.

41. A recording apparatus in accordance with claim 36, wherein said contents encrypting means receives said contents key from a broadcasting station and uses said contents key.

42. A recording apparatus in accordance with claim 36, wherein said relationship information is information related by a date/time when said contents encrypting means receives said digital data, a date/time when said contents encrypting means encrypts said digital data by using said contents key, a date/time when said key-encrypting key generating means generates said key-encrypting key, a date/time when said storing means stores said key-encrypting key, a date/time when said key encrypting means encrypts said contents key by using said key-encrypting key, or a date/time when said recording means records said encrypted digital data on said predetermined recording medium.

43. A recording apparatus in accordance with claim 42, wherein a contents key generating means for generating said contents key is provided, and said contents encrypting means receives said contents key from said contents key generating means.

44. A recording apparatus in accordance with claim 42, wherein said contents encrypting means receives said contents key from a broadcasting station and uses said contents key.

45. A reproducing apparatus comprising:
- key-encrypting key obtaining means for receiving said relationship information on said recording medium of said recording apparatus in accordance with claim 36, for specifying a key-encrypting key corresponding to said encrypted digital data to be reproduced on the basis of said relationship information, and for retrieving and obtaining said key-encrypting key from said storing means of said recording means,
- key decrypting means for receiving said encrypted contents key corresponding to said encrypted digital data to be reproduced, from said predetermined recording medium, for receiving said key-encrypting key, and for decrypting said encrypted contents key by using said key-encrypting key, and
- contents decrypting means for decrypting said encrypted digital data by using said contents key from said key decrypting means.

46. A recording apparatus comprising:
- a contents key generating means for generating a contents key for encrypting digital data;
- a key-encrypting key generating means for generating a plurality of key-encrypting keys for a predetermined period, each of said plurality of key-encrypting keys is different each other, for subjecting said contents key to a second encrypting;
- a storing means for storing said contents key generated by said contents key generating means and for deleting said contents key, while leaving the encrypted digital data hereafter if said contents key satisfies a predetermined condition, and
- for storing said generated plurality of key-encrypting keys and for deleting or making invalid each of said key-encrypting keys in sequence, while leaving the encrypted digital data hereafter if each of said key-encrypting keys satisfies a second corresponding predetermined condition respectively;
- wherein the predetermined condition is satisfied if the key-encrypting key was stored on a previous date that is less than a specific number of days from a current date, or if a number of reproductions of the digital data is less than a specific number of reproductions;

a first contents encrypting means for encrypting said digital data by using said contents keys;

a second contents encrypting means for generating an encrypted contents key by subjecting said contents key to said second encrypting by using one of the plurality of key-encrypting keys; and relationship information generating means for generating the relationship information between said encrypted digital data encrypted by using said contents key and said contents key, and a recording means for receiving said encrypted digital data and all or part of said relationship information, and for recording them on a predetermined recording medium.

47. A recording apparatus in accordance with claim 46, wherein said predetermined condition is that more than a predetermined time has passed after said contents key was stored.

48. A recording apparatus in accordance with claim 46 or 47, wherein said relationship information is information related by a date/time when said first contents encrypting means receives said digital data, a date/time when said first contents encrypting means encrypts said digital data by using said contents key, a date/time when said contents key generating means generates said contents key, a date/time when said storing means stores said contents key, or a date/time when said recording means records said encrypted digital data on said predetermined recording medium.

49. A recording apparatus in accordance with claim 46, wherein said predetermined condition is that the number of times said key-encrypting key is used at the time of reproducing said encrypted digital data exceeds a predetermined number of times.

50. A recording apparatus in accordance with claim 46, wherein said relationship information is information related by a date/time when said first contents encrypting means receives said digital data, a date/time when said first contents encrypting means contents-encrypts said digital data by using said contents key, a date/time when said contents key generating means generates said contents key, a date/time when said storing means stores said contents key, or a date/time when said recording means records said encrypted digital data on said predetermined recording medium.

51. A recording apparatus in accordance with one of claims 36 or 46, provided with a billing means for charging the amount of billing for recording said data at the time when said recording means records said encrypted digital data on said predetermined recording medium.

52. A recording apparatus in accordance with one of claims 36 or 46, wherein said predetermined recording medium is a video tape.

53. A recording apparatus in accordance with one of claims 36 or 46, wherein said predetermined recording medium is a hard disk.

54. A reproducing apparatus comprising:

contents-key obtaining means for receiving said relationship information on said recording medium of said recording apparatus in accordance with claim 46, for specifying a contents key corresponding to said encrypted digital data to be reproduced on the basis of said relationship information, and for retrieving and obtaining said contents key from said storing means of said recording means, and contents decrypting means for receiving said encrypted digital data from said predetermined recording medium, for receiving said contents key, and for decrypting said encrypted digital data by using said contents key.

55. A recording apparatus comprising:

contents encrypting means for receiving digital data and a contents key for encrypting said digital data and for subjecting said digital data to first encrypting by using said contents key to generate encrypted digital data;

a key-encrypting key generating means for generating a plurality of key-encrypting keys for a predetermined period, each of said plurality of key-encrypting keys is different from each other, for subjecting said contents key to second encrypting;

a storing means for storing said generated plurality of key-encrypting keys and for deleting or making invalid each of said key-encrypting keys in sequence, while leaving the encrypted digital data hereafter if each of said key-encrypting keys satisfies a corresponding predetermined condition respectively;

a key encrypting means for generating an encrypted contents key by subjecting said contents key to said second encrypting by using one of the plurality of key-encrypting keys;

a relationship information generating means for generating the relationship information between said encrypted digital data encrypted by using said contents key and the one of the plurality of key-encrypting keys obtained by encrypting said contents key, and a recording means for receiving said encrypted digital data, said encrypted contents key and all or part of said relationship information and for recording them on a predetermined recording medium, wherein said encrypted contents key is allowed to be decrypted when said one of the plurality of key-encrypting keys is among the currently stored plurality of key-encrypting keys;

a data recording/reproducing method wherein encrypted digital data obtained by subjecting digital data to first encrypting by using a contents key and encrypted contents key obtained by subjecting said contents key to second encrypting are recorded on a recording medium, wherein said encrypted digital data and said encrypted contents key, having been recorded, are reproduced, and said encrypted digital data is decrypted by using said contents key obtained by decrypting said encrypted contents key, thereby obtaining said digital data, and said encrypted contents key is recorded in a data area on said recording medium, from which data is not output outside.

* * * * *

UNITED STATES PATENT AND TRADEMARK OFFICE
CERTIFICATE OF CORRECTION

| | | |
|---|---|---|
| PATENT NO. | : 7,239,709 B1 | Page 1 of 1 |
| APPLICATION NO. | : 09/381996 | |
| DATED | : July 3, 2007 | |
| INVENTOR(S) | : Masazumi Yamada et al. | |

It is certified that error appears in the above-identified patent and that said Letters Patent is hereby corrected as shown below:

Title Page;
Page 2, Item (56) References Cited, FOREIGN PATENT DOCUMENTS
Delete "EP      794496 A1      9/1997"

Column 39
Line 2, change "keys;" to -- key; --

Signed and Sealed this

Fourth Day of December, 2007

JON W. DUDAS
*Director of the United States Patent and Trademark Office*